United States Patent [19]

Braytenbah et al.

[11] 4,053,746
[45] Oct. 11, 1977

[54] SYSTEM AND METHOD FOR OPERATING A STEAM TURBINE WITH DIGITAL COMPUTER CONTROL HAVING INTEGRATOR LIMIT

[75] Inventors: Andrew Braytenbah, Pennsauken, N.J.; Leaman Podolsky, Wilmington, Del.

[73] Assignee: Westinghouse Electric Corporation, Pittsburgh, Pa.

[21] Appl. No.: 407,361

[22] Filed: Oct. 17, 1973

Related U.S. Application Data

[63] Continuation of Ser. No. 247,851, April 26, 1972, abandoned, which is a continuation-in-part of Ser. No. 247,440, April 25, 1972, abandoned, which is a continuation-in-part of Ser. No. 246,900, April 24, 1972, abandoned.

[51] Int. Cl.$^2$ .................. H02P 9/04; G05B 15/00; F01D 17/02
[52] U.S. Cl. ........................... 364/494; 415/15; 290/40 R; 60/645; 364/300
[58] Field of Search .................. 235/151.21, 151.34, 235/151, 151.3; 415/1, 13, 15, 17; 60/73, 39.28 R, 105, 646, 645; 290/2, 40, 40.2, 40 R, 40 A, 40 C, 52; 340/172.5; 444/1

[56] References Cited

U.S. PATENT DOCUMENTS

| 3,533,236 | 10/1970 | Cottington | 290/40 X |
|---|---|---|---|
| 3,552,872 | 1/1971 | Giras et al. | 415/17 |
| 3,555,251 | 1/1971 | Shavit | 235/151 |
| 3,561,216 | 2/1971 | Moore, Jr. | 60/73 |
| 3,564,273 | 2/1971 | Cockrell | 415/17 X |
| 3,588,265 | 6/1971 | Berry | 415/17 X |
| 3,748,491 | 7/1973 | Barrigher et al. | 290/40 C X |

OTHER PUBLICATIONS

Application of the Prodac 50 System to Direct Digital Control, J. C. Belz, G. J. Kirk & P. S. Radcliffe, IEEE Intl. Conv. Rec. Part 3, 1965, pp. 102-122.
Monitoring and Automatic Control in Steam Power Stations by Process Computer, E. Doetsch & G. Hirschberg, Siemens Review XXXV (1968) No. 12, pp. 471-476.

*Primary Examiner*—Edward J. Wise
*Attorney, Agent, or Firm*—E. F. Possessky

[57] ABSTRACT

In a system and method for automatically starting, synchronizing and operating a steam turbine, proportional plus integral feedbck control utilizing digital computer systems is adapted to correspond to physical valve operation by applying integration limits. Useful for both speed and load control modes of operation, the demand signal is compared with prior values thereof, and the differential is both multiplied by a proportional gain factor, and integrated in the computer utilizing numerical integration techniques. The integrated total is kept within a desired range by applying upper and lower limits, and the limited integral is combined with the proportional factor, further limited, as desired, and appropriately scaled for use as a process variable.

26 Claims, 48 Drawing Figures

FIG. I.

TABLE 1-1. TASK PRIORITY ASSIGNMENT FIG. 9

| Level | Function | Frequency | Core Location |
|---|---|---|---|
| F | STOP/INITIALIZE | ON DEMAND | 2F40 |
| E | AUXILIARY SYNCHRONIZER | 0.1 SEC | 14BD |
| D | CONTROL | 1.0 SEC | 2730 |
| C | OPERATOR'S PANEL | ON DEMAND | 21B0 |
| B | ANALOG SCAN | 0.5 SEC | 16D0 |
| A | ATS-PERIODICS | 1.0 SEC | 4420 |
| 9 | LOGIC | ON DEMAND | 1962 |
| 8 | VISUAL DISPLAY | 1.0 SEC | 1E60 |
| 7 | DATA LINK | ON DEMAND | 3D10 |
| 6 | ATS-ANALOG CONVERSIONS | 5.0 SEC | 6960 |
| 5 | FLASH | 0.5 SEC | 15A0 |
| 4 | PROGRAMMER'S CONSOLE | ON DEMAND | 3000 |
| 3 | ATS-MESSAGE WRITER | 5.0 SEC | 6CA0 |
| 2 | ANALOG/DIGITAL TREND | 1.0 SEC | 3E70 |
| 1 | CCO TEST* | ON DEMAND | 0E80 |
| 0 | BATCH PROCESSORS** | ON DEMAND | 4000 |

*The CCO test task may be used only during maintenance and debugging periods, since this program overlays the data link program area.

**The batch processors may be used only on manual control and with the sync disabled; also, the sequence of events interrupt must be disabled since the batch processor programs overlay the ATS program area.

TABLE 1-2. CORE MAP 1—FINAL OPERATING VERSION FIG. 10

| Starting Location | Program | Size | |
|---|---|---|---|
| | | Dec | Hex |
| 0 | FAM FAST ACCESS MEMORY | 32 | 20 |
| 20 | SEQUENCE OF EVENTS INTERRUPT | 32 | 20 |
| 40 | VALVE INTERRUPT | 96 | 60 |
| A0 | ZERO TABLE | 96 | 60 |
| 100 | SRI TABLE | 32 | 20 |
| 120 | PLANTCCI SUBROUTINE | 120 | 78 |
| 198 | SPEED CHANNEL 1 INTERRUPT | 47 | 2F |
| 1C7 | SPEED CHANNEL 2 INTERRUPT | 25 | 19 |
| 1E0 | CCO IMAGE TABLE | 32 | 20 |
| 200 | MONITOR | 3162 | C5A |
| E5A | MONITOR PATCHES | 6 | 6 |
| E60 | MONITOR SPARE | 32 | 20 |
| E80 | DATA LINK-SPARE TERMINAL | 16 | 10 |
| E92 | DATA LINK-DT INTERRUPT | 40 | 28 |
| EBA | DATA LINK-CONTROL WORDS | 10 | A |
| EC4 | DATA LINK-INPUT BUFFER | 10 | A |
| ECE | DATA LINK-OUTPUT BUFFER | 50 | 32 |
| F00 | SYSTEM LIBRARY | 618 | 26A |
| 116A | BREAKER OPEN INTERRUPT | 22 | 16 |

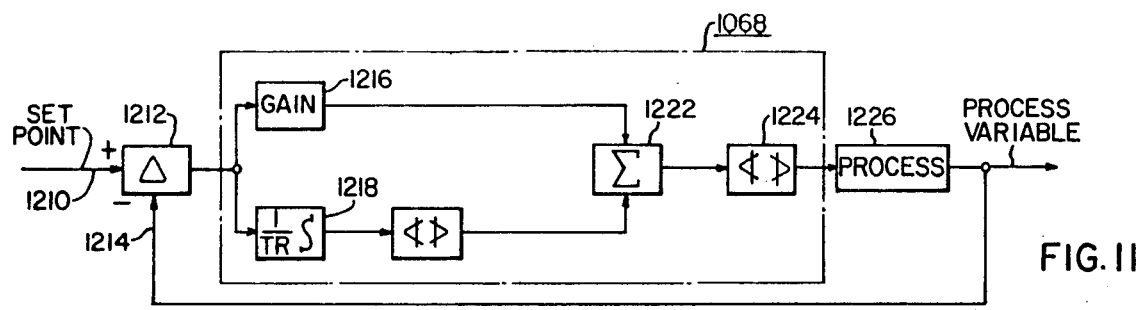
FIG. 11
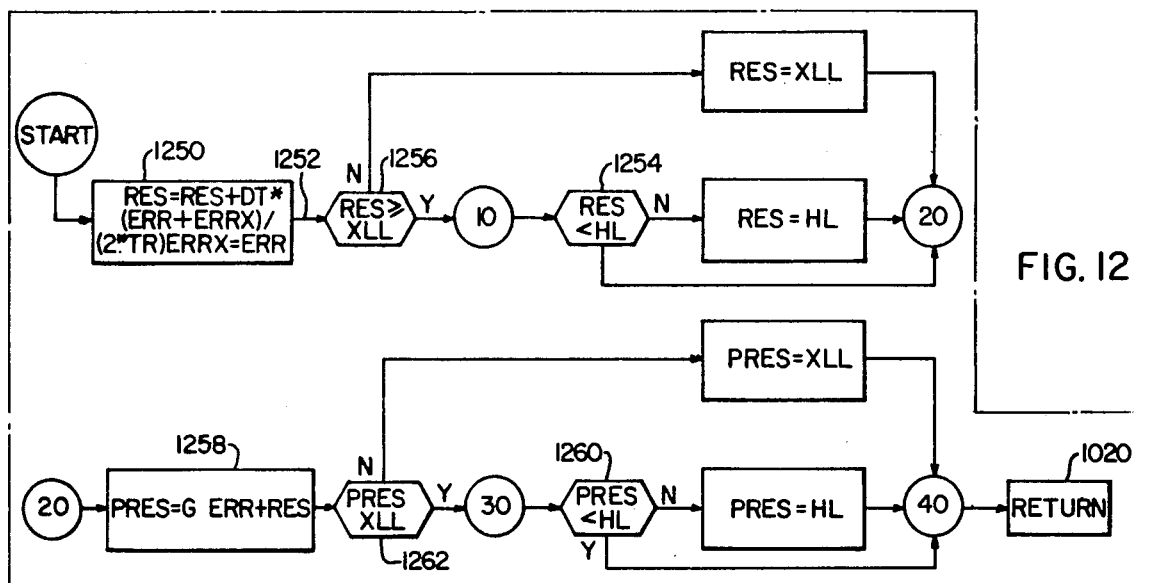
FIG. 12
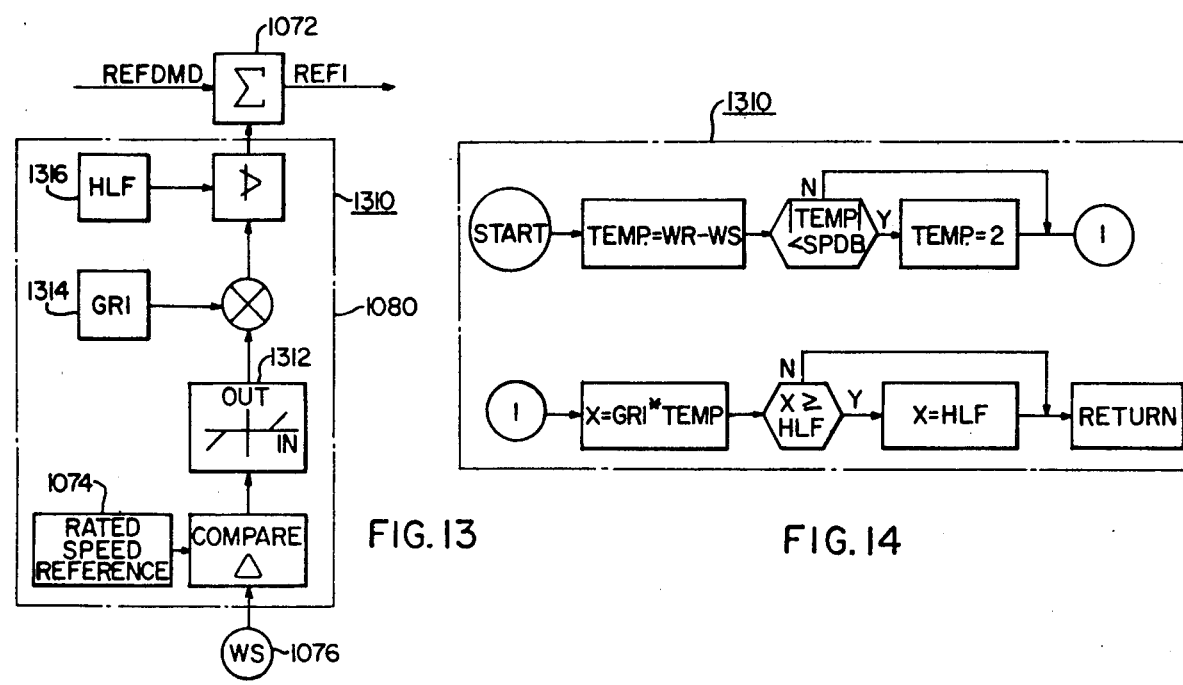
FIG. 13
FIG. 14

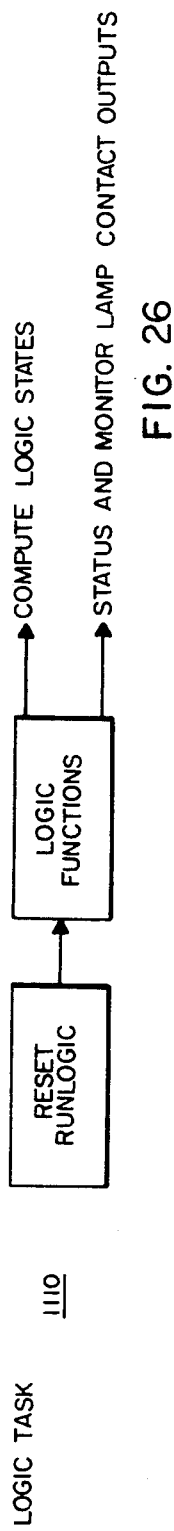

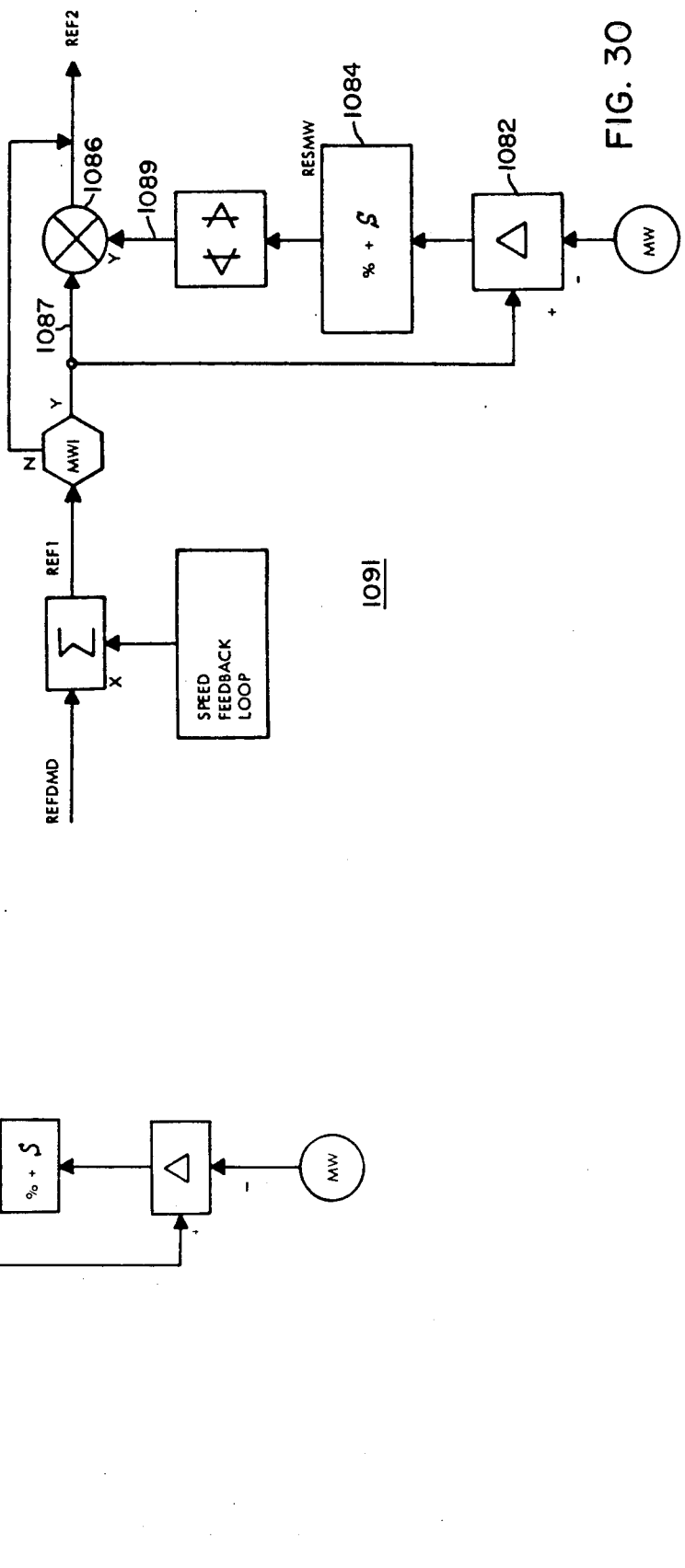
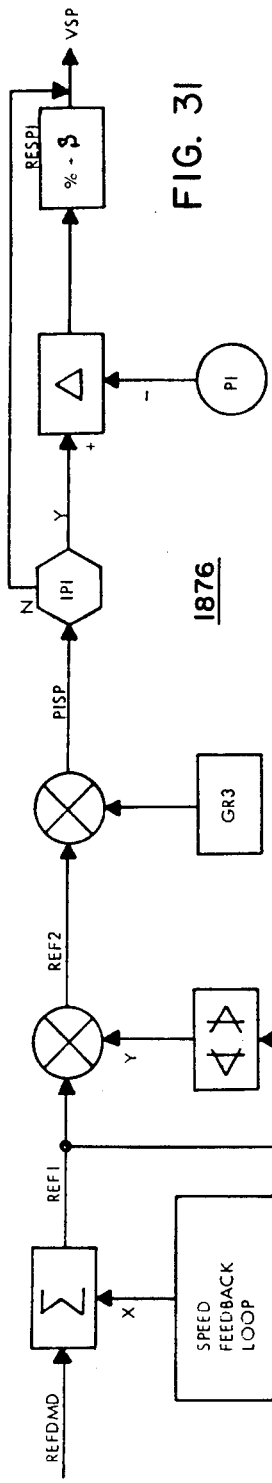
FIG. 30
FIG. 31

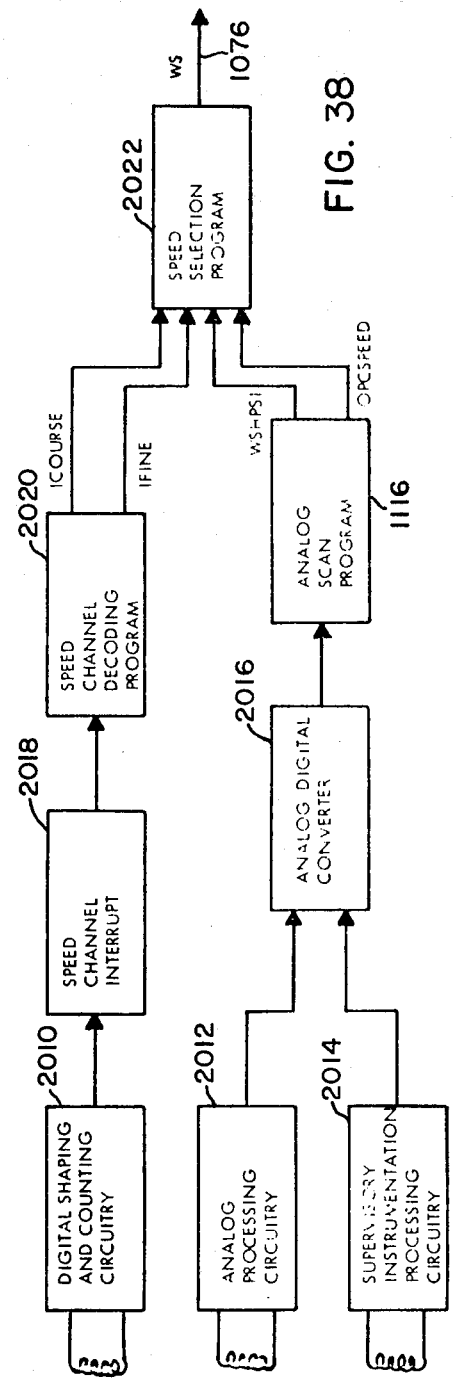

SYSTEM AND METHOD FOR OPERATING A STEAM TURBINE WITH DIGITAL COMPUTER CONTROL HAVING INTEGRATOR LIMIT

CROSS-REFERENCE TO RELATED APPLICATIONS

This application is a continuation of U.S. Application Ser. No. 247,851, abandoned, entitled "System and Method for Operating a Steam Turbine With Digital Computer Control Having Integrator Limit", filed Apr. 26, 1972. In turn, Ser. No. 247,851 was a continuation-in-part of Ser. No. 247,440, abandoned, entitled "Improved System and Method for Starting, Synchronizing and Operating a Steam Turbine with Digital Computer Control", filed by Theodore C. Giras and Robert Uram on Apr. 25, 1972 assigned to the present assignee and now abandoned. In turn Ser. No. 247,440 was a continuation-in-part of Ser. No. 246,900, abandoned, entitled "General System and Method for Starting, Synchronizing and Operating a Steam Turbine With Digital Computer Control", filed by Theodore C. Giras and Robert Uram on Apr. 24, 1972 assigned to the present assignee and now abandoned.

1. Ser. No. 722,779, entitled "Improved System and Method for Operating a Steam Turbine and an Electric Power Generating Plant" filed by Theodore C. Giras and Manfred Birnbaum on Apr. 4, 1968, assigned to the present assignee, and continued as Ser. No. 124,993 on Mar. 16, 1971, and Ser. No. 319,115, on Dec. 29, 1972.

2. Ser. No. 408,962, entitled "System and Method for Starting, Synchronizing and Operating a Steam Turbine with Digital Computer Control" filed as a continuation of Ser. No. 247,877, abandoned, which had been filed by Theodore C. Giras and Robert Uram on Apr. 26, 1972, assigned to the present assignee and hereby incorporated by reference; other related cases are set forth in Ser. No. 408,962.

BACKGROUND OF THE INVENTION

The present invention relates to the elastic fluid turbines and more particularly to systems and methods for operating steam turbines and electric power plants in which generators are operated by steam turbines.

With respect to steam turbine control, prime mover turbine control usually operates to determine turbine rotor shaft speed, turbine load, and/or turbine throttle pressure as end control system variables. In the case of large electric power plants in which throttle pressure is steam-generating system controlled, turbine control is typically directed to the megawatt amount of electric load and the frequency participation of the turbine after the turbine rotor speed has been controllably brought to the synchronous value and the generator has been connected to the electric power system.

In addition to the conventional steam turbine generating system, another type of power generating system in which steam turbine control is needed is a combined cycle generating system. The combined cycle generating system involves a combination of heat sources and energy conversion apparatus organized to produce an electric power output. For example, gas turbines can drive generators and use their exhaust gases to supply heat for steam to be used in driving a steam turbine. A separate boiler can also be included in the system to provide steam generating heat. Electric power is supplied by separate generators driven by the turbines.

The end controlled plant or plant system variables and the turbine operation are normally determined by controlled variation of the steam flow to one or more of the various stages of the particular type and particular design of the turbine in use. In prime mover turbine applications such as drum type boiler electric power plants where turbine throttle pressure is externally controlled by the boiler operation, the turbine inlet steam flow is an end controlled steam characteristic or an intermediately controlled system variable which controllably determines in turn the end control system variables, i.e., turbine speed, electric load or the turbine speed and the electric load. It is noteworthy, however, that some supplemental or protective control may be placed on the end control variable by additional downstream steam flow control such as by control of reheat valving and to that extent inlet turbine steam flow control is not strictly wholly controllably determinative of the end controlled system variables under all operating conditions.

In determining turbine operation and the end controlled system variables, turbine steam flow control has generally been achieved by controlled operation of valves disposed in the steam flow path or paths. To illustrate the nature of the turbine valve control in general and to establish simultaneously some background for subsequent description, consideration will now be directed to the system structure and the operation of a typical large electric power tandem steam turbine design for use with a fossil fuel drum-type boiler steam generating system.

Steam generated at controlled pressure may be admitted to the turbine steam chest through one or more throttle or stop valves operated by the turbine control system. Governor or control valves are arranged to supply steam inlets disposed around the periphery of a high pressure turbine section casing. The governor valves are also operated by the turbine control system to determine the flow of steam from the steam chest through the stationary nozzles or vanes and the rotor blading of the high pressure turbine section.

Torque resulting from the work performed by steam expansion causes rotor shaft rotation and reduced steam pressure. The steam is usually then directed to a reheat stage where its enthalpy is raised to a more efficient operating level. In the reheat stage, the high pressure section outlet steam is ordinarily directed to one or more reheaters associated with the primary steam generating system where heat energy is applied to the steam. In large electric power nuclear turbine plants, turbine reheater stages are usually not used and instead combined moisture separator reheaters are employed between the tandem nuclear turbine sections.

Reheated steam crosses over the next or intermediate pressure section of a large fossil fuel turbine where additional rotor torque is developed as intermediate pressure steam expands and drives the intermediate pressure turbine blading. One or more interceptor and/or reheater stop valves are usually installed in the reheat steam flow path or paths in order to cut off or reduce the flow of turbine contained steam as required to protect against turbine overspeed. Reheat and/or interceptor valve operation at best produces late corrective turbine response and accordingly is normally not used controllably as a primary determinant of turbine operation.

Additional reheat may be applied to the steam after it exits from the intermediate pressure section. In any event, steam would typically be at a pressure of about 1200 psi as it enters the next or low pressure turbine section usually provided in the large fossil fuel turbines. Additional rotor torque is accordingly developed and the vitiated steam then exhausts to a condenser.

In both the intermediate pressure and the low pressure sections, no direct steam flow control is normally applied as already suggested. Instead, steam conditions at these turbine locations are normally determined by mechanical system design subject to time delayed effects following control placed on the high pressure section steam admission conditions.

In a typical large fossil fuel turbine just described, 30% of the total steady state torque might be generated by the high pressure section and 70% might be generated by the intermediate pressure and low pressure sections. In practice, the mechanical design of the turbine system defines the number of turbine sections and their respective torque ratings as well as other structural characteristics such as the disposition of the sections of one or more shafts, the number of reheat stages, the blading and vane design, the number and form of turbine stages and steam flow paths in the sections, etc.

A variety of valve arrangements may be used for steam control in the various turbine types and designs, and hydraulically operated valve devices have generally been used for steam control in the various valving arrangements. The use of hydraulically operated valves has been predicated largely on their relatively low cost coupled with their ability to meet stroke operating power and positioning speed and accuracy requirements.

Turbine valve control and automatic turbine operation have undergone successive stages of development. With increasing plant sizes, mechanical-hydraulic controls have been largely subplanted by analog electrohydraulic controllers sometimes designated as AEH controllers. The aforementioned Giras nad Birnbaum Patent application, Ser. No. 319,115, provides a further description of the turbine control technology development and the earlier prior patent and publication art. The latter application discloses a programmed digital computer controller which generally provides improved turbine and electric power plant operation over the earlier prior art. U.S. Pat. No. 3,588,265 issued to W. Berry, entitled "System And Method For Providing Steam Turbine Operation With Improved Dynamics", and assigned to the present assignee, is also directed to a digital computer controller which provides improved automatic turbine startup and loading operations. U.S. Pat. No. 3,552,872 issued to T. Giras and T. C. Barns, Jr. entitled "Computer Positioning Control System With Manual Backup Control Especially Adapted For Operating Steam Turbine Valves", and assigned to the present assignee, discloses a digital computer controller interfaced with a manual backup controller. A general publication pertaining to turbine digital controllers has appeared in Electrical World Magazine.

At this point in the background writeup, it is noted that prior art citations are made herein in an attempt to characterize the context within which the presently disclosed subject matter has been developed. No representations are made that the cited art is the best art nor that the cited art is immune to alternative interpretations.

Generally, the earlier Berry and the earlier Giras and Birnbaum DEH turbine operating system comprise basic hardware and software elements and control loops which bear some similarity to a number of basic elements and loops described herein. However, the present disclosure involves improvements largely stemming from the combined application of principles associated with turbine technology and principles associated with the computer and control technologies in the determination of a particular detailed system arrangement and operation. Thus, the earlier DEH is largely directed to central control concepts which, although implementable with conventional know-how, open up opportunities for improvement-type developments related to the more central aspects of turbine control and operation as well as the more supportive aspects of turbine control and operation including areas such as turbine protection, remote system interfacing, accuracy and reliability, computer utilization efficiency, operator interface, maintenance and operator training.

One form of controller developer in conjunction with analog control is that of proportional plus integral operation. In such operation, the difference between a desired operating state and the corresponding present state is integrated and is separately multiplied by a proportion factor, and the two signals are combined to be used for generating control signals. Also, the combined signals are fed back and subtracted from the original demand signal. Such an approach is utilized, for example, in the aforementioned U.S. Pat. No. 3,552,872 to Giras, et al.

Upon application of the proportional plus integral feedback concept to digital computer control systems such as the DEH system, additional control problems were introduced. That is, utilization of numerical integration techniques in the computer provides possibilities of severely uncontrolled operations. For example, during time of sharply increasing or decreasing change in demand signals, corresponding positive or negative integration increments can drive the integrator output so high or low that eventually all physical correspondence with the associated control valves is lost. Beyond such point, even though no further control change occurs (i.e., further valve opening or closing), the integrator output continues to change. Then, whenever stability or reversal of direction occurs in the demand signals, the incremental change in the integrator output has no corresponding effect on the valve until eventually, if ever, it returns within the effective controllable range.

SUMMARY OF THE INVENTION

The present system supplements, expands, and improves over the prior art. In doing so, the present system includes a series of specialized programs for controlling the turbine generator system easing synchronization of the generator to the line, monitoring a great number of various and different parameter signals and allowing for great facility of operator machine cooperation. Special programs monitor the control and monitoring systems whereby the reliability, safety, and flexibility of the system are greatly increased. Information, transmission and warning systems improve the ease of operation and usefulness of the present system over the prior art.

The present system provides for both automatic startup, simple synchronization, complete control and shutdown of the turbine generator system.

It is the primary objective of this invention to provide a turbine system in combination with a control system for providing automatic control of such turbine system through all stages of operation, such control system comprising a programmed digital computer, and wherein there is provided improved means for overcoming the abovementioned control problem.

The present invention has been developed in response to this problem, and effectively provides for limits to the integrator output, such that the controller will not continue increasing or decreasing its output signal if no corresponding effect can be had on the associated steam control valves in the turbine.

In an illustrative embodiment, load or speed demand signals are compared with prior actuating control signals, and the difference therebetween is separately multiplied by a proportion factor, and integrated in the computer utilizing numerical integration techniques. The integration output is maintained in a specified range by applying upper and lower limits. The proportional and limited integration signals are combined, and thereupon processed, as desired, to achieve corresponding control signals.

BRIEF DESCRIPTION OF THE DRAWINGS

FIG. 9 shows a table of program or task priority assignments in accordance with the principles of the invention;

FIG. 10 shows the location of subroutines in accordance with the principles of the invention;

FIG. 11 shows a block diagram of a proportional-plus-reset controller program which is operable in accordance with the principles of the invention;

FIG. 12 shows a flow chart of the proportional-plus-reset subroutine (PRESET) which is operable in accordance with the principles of the invention;

FIG. 13 shows a block diagram of a proportional controller function with dead band which is operable in accordance with the principles of the invention;

FIG. 14 shows a flow chart of a speed loop (SPDLOOP) subroutine which is operable in accordance with the principles of the invention;

FIG. 26 is a simplified block diagram of a portion of the logic function which is operable in accordance with the principles of the invention;

FIG. 30 is a block diagram of a megawatt feedback loop subroutine which is operable in accordance with the principles of the invention;

FIG. 31 is a block diagram of an impulse pressure loop with megawatt loop in service which is operable in accordance with the principles of the invention;

FIG. 38 shows a block diagram of a speed instrumentation and computation interface with special speed sensing circuitry which is operable in accordance with the principles of the invention;

DESCRIPTION OF THE PREFERRED EMBODIMENT

A. POWER PLANT

Figure 1:
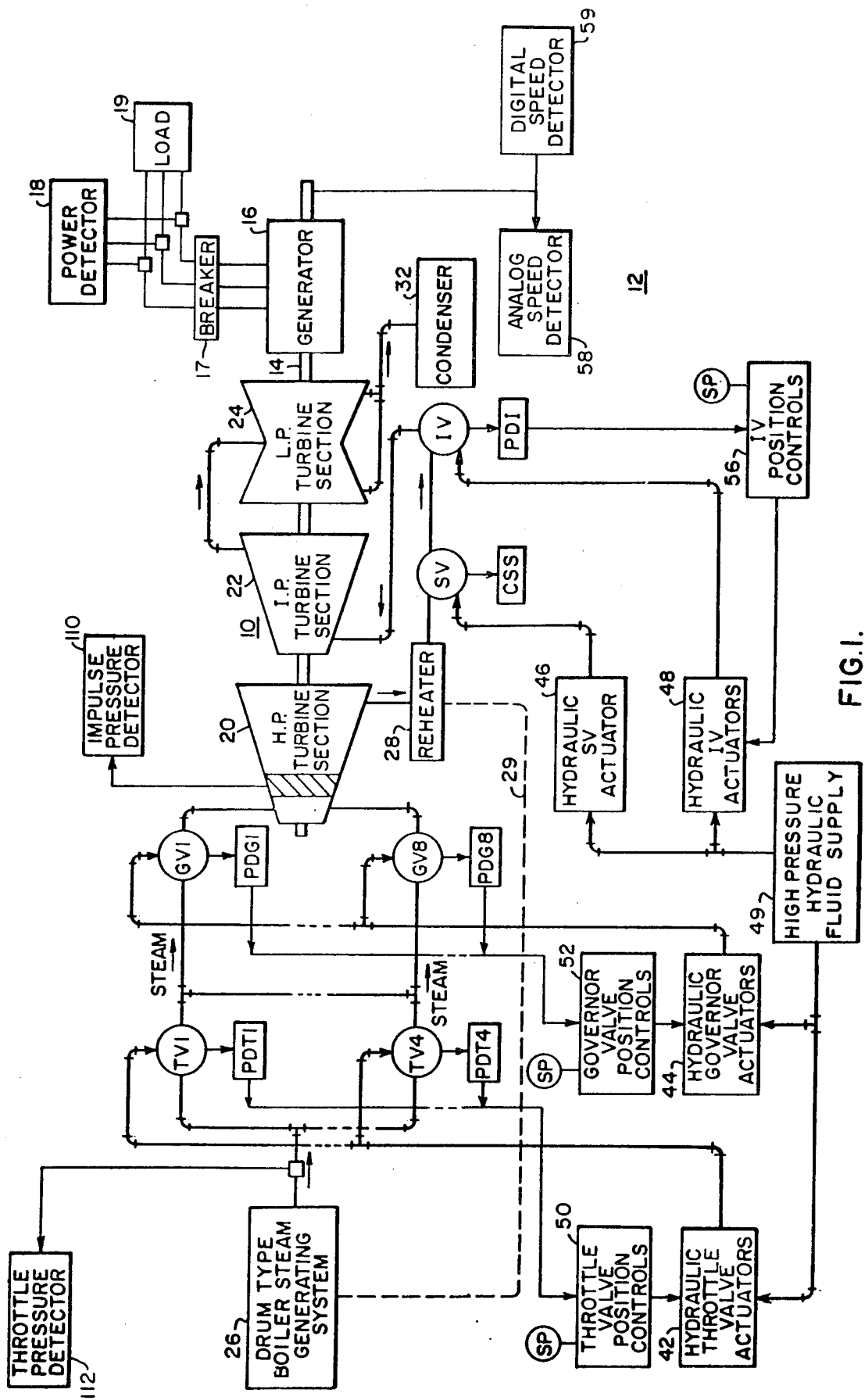
FIG. 1 shows a schematic diagram on an electric power plant including a large steam turbine and a fossil fuel fired drum type boiler and control devices which are all operable in accordance with the principles of the invention.
Figure 2:
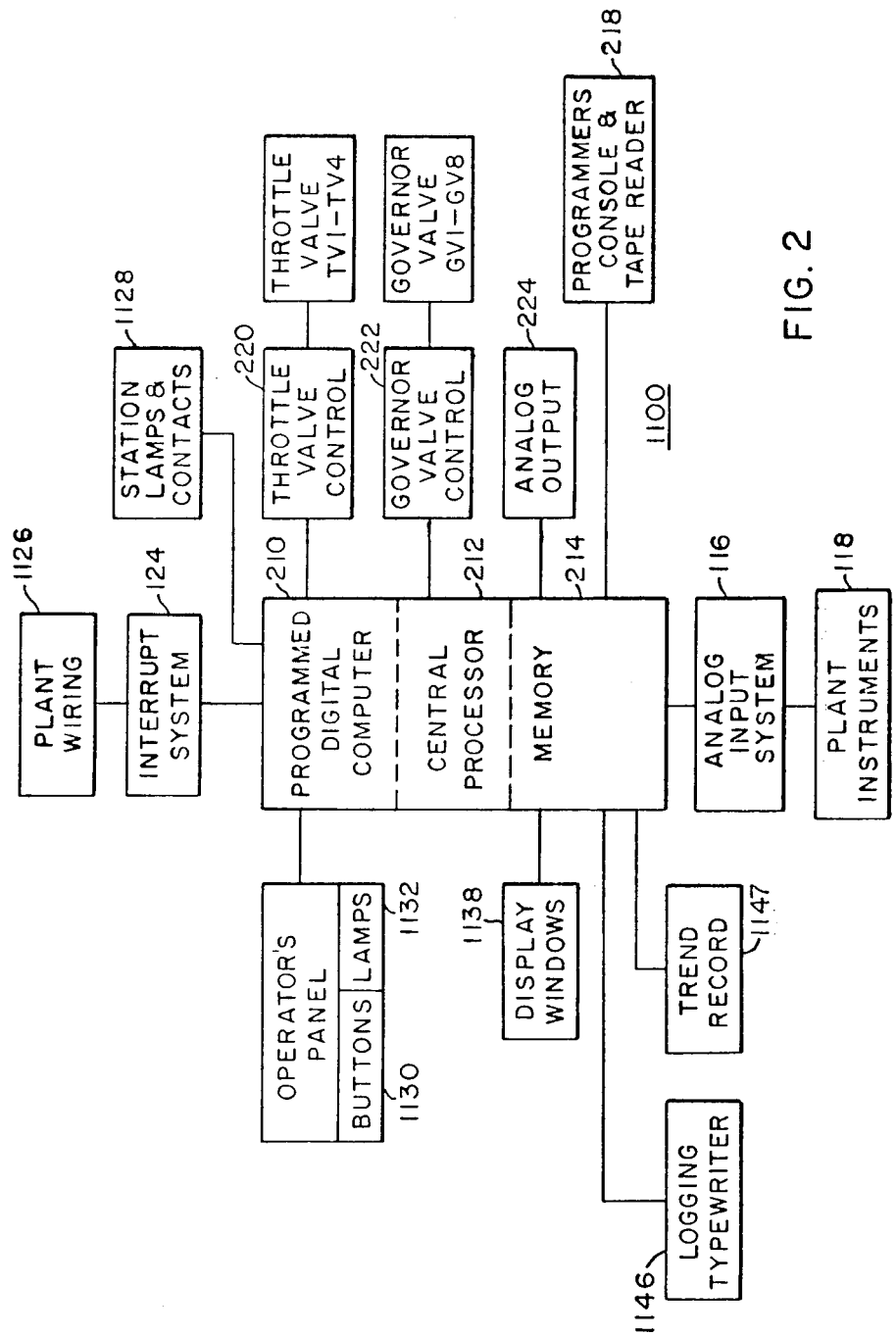
FIG. 2 shows a schematic diagram on a programmed digital computer control system operable with a steam turbine and its associated devices shown in FIG. 1 in accordance with the principles of the invention.

More specifically, there is shown in FIG. 1 a large single reheat steam turbine constructed in a well known manner and operated and controlled in an electric power plant 12 in accordance with the principles of the invention. As will become more evident through this description, other types of steam turbines can also be controlled in accordance with the principles of the invention and particularly in accordance with the broader aspects of the invention. The generalized electric power plant shown in FIG. 1 and the more general aspects of the computer control system to be described in connection with FIG. 2 are like those disclosed in the aforementioned Giras and Birnbaum patent application Ser. No. 319,115. As already indicated, the present application is directed to general improvements in turbine operation and control as well as more specific improvements related to digital computer operation and control of turbines.

The turbine 10 is provided with a single output shaft 14 which drives a conventional large alternating current generator 16 to produce three-phase electric power (or any other phase electric power) as measured by a conventional power detector 18 which measures the rate of flow of electric energy. Typically, the generator 16 is connected through one or more breakers 17 per phase to a large electric power network and when so connected causes the turbo-generator arrangement to operate at synchronous speed under steady state conditions. Under transient electric load change conditions, system frequency may be effected and affected conforming turbo-generator speed changes would result. At synchronism, power contribution of the generator 16 to the network is normally determined by the turbine steam flow which in this instance is supplied to the turbine 10 at substantially constant throttle pressure.

In this case, the turbine 10 is of the multistage axial flow type and includes a high pressure section 20, an intermediate pressure section 22, and a low pressure section 24. Each of these turbine sections may include a plurality of expansion stages provided by stationary vanes and an interacting bladed rotor connected to the shaft 14. In other applications, turbines operating in accordance with the present invention may have other forms with more or fewer sections tandemly connected to one shaft or compoundly coupled to more than one shaft.

The constant throttle pressure steam for driving the turbine 10 is developed by a steam generating system 26 which is provided in the form of a conventional drum type boiler operated by fossil fuel such as pulverized coal or natural gas. From a generalized standpoint, the present invention can also be applied to steam turbines associated with other types of steam generating systems such as nuclear reactor or once through boiler systems.

The turbine 10 in this instance is of the plural inlet front end type, and steam flow is accordingly directed to the turbine steam chest (not specifically indicated) through four throttle inlet valves TV1-TV4. Generally, the plural inlet type and other front end turbine types such as the single ended type or the end bar lift type may involve different numbers and/or arrangements of valves.

Steam is directed from the admission steam chest to the first high pressure section expansion stage through light governor inlet valves GV1-GV8 which are arranged to supply steam to inlets arcuately spaced about the turbine high pressure casing to constitute a somewhat typical governor valving arrangement for large fossil fuel turbines. Nuclear turbines might on the other hand typically utilize only four governor valves.

During start-up, the governor valves GV1-GV8 are typically all fully opened and steam flow control is provided by a full arc throttle valve operation. At some point in the start-up process, transfer is made from full arc throttle valve control to full arc or governor valve control because of throttling energy losses and/or throttling control capability. Upon transfer the throttle valves TV1-TV4 are fully opened, and the governor valves GV1-GV8 are normally operated in the single valve mode. Subsequently, the governor valves may be individually operated in a predetermined sequence usually directed to achieving thermal balance on the rotor and reduced rotor blade stressing while producing the desired turbine speed and/or load operating level. For example, in a typical governor valve control mode, governor valves GV5-GV8 may be initially closed as the governor valves GV1-GV4 are jointly operated from time to time to define positions producing the desired corresponding total steam flows. After the governor valves GV1-GV4 have reached the end of their control region, i.e., upon being fully opened, or at some overlap point prior to reaching their fully opened position, the remaining governor valves GV5-GV8 are sequentially placed in operation in numerical order to produce continued steam flow control at higher steam flow levels. This governor valve sequence of operation is based on the assumption that the governor valve controlled inlets are arcuately spaced about the 360° periphery of the turbine high pressure casing and that they are numbered consecutively around the periphery so that the inlets corresponding to the governor valves GV1 and GV8 are arcuately adjacent to each other.

The preferred turbine start-up method is to raise the turbine speed from the turning gear speed of about 2 rpm to about 80% of the synchronous speed under throttle valve control and then transfer to governor valve control and raise the turbine speed to the synchronous speed, then close the power system breakers and meet the load demand. On shutdown, similar but reverse practices or simple coastdown may be employed. Other transfer practice may be employed, but it is unlikely that transfer would be made at a loading point above 40% rated load because of throttling efficiency considerations.

After the steam has crossed past the first stage impulse blading to the first stage reaction blading of the high pressure section, it is directed to a reheater system 28 which is associated with a boiler or steam generating system 26. In practice, the reheater system 28 may typically include a pair of parallel connected reheaters coupled to the boiler 26 in heat transfer relation as indicated by the reference character 29 and associated with opposite sides of the turbine casing.

With a raised enthalpy level, the reheated steam flows from the reheater system 28 through the intermediate pressure turbine section 22 and the low pressure turbine section 24. From the latter, the vitiated steam is exhausted to a condenser 32 from which water flow is directed (not indicated) back to the boiler 26.

To control the flow of reheat steam, a stop valve SV including one or more check valves is normally open and closed only when the turbine is tripped. Interceptor valves IV (only one indicated), are also provided in the reheat steam flow path, and they are normally open and if desired they may be operated over a range of position control to provide reheat steam flow cutback modulation under turbine overspeed conditions. Further description of an appropriate overspeed protection system is presented in U.S. Pat. No. 3,643,437 issued to M. Birnbaum, A. Braytenbah and A. Richardson and assigned to the present assignee.

In the typical fossil fuel drum type boiler steam generating system, the boiler control system controls boiler operations so that steam throttle pressure is held substantially constant. In the present decription, it is therefore assumed as previously indicated that throttle pressure is an externally controlled variable upon which the turbine operation can be based. A throttle pressure detector 38 of suitable conventional design measures the throttle pressure to provide assurance of substantially constant throttle pressure supply, and, if desired as a programmed computer protective system override control function, turbine control action can be directed to throttle pressure control as well as or in place of speed and/or load control if the throttle pressure falls outside predetermined constraining safety and turbine condensation protection limits.

In general, the steady state power or load developed by a steam turbine supplied with substantially constant throttle pressure steam is determined as follows: Equation (1)

power or load $= K_P(P_i/P_O) = K_F S_F$ where $P_i =$ first stage impulse pressure
$P_O =$ throttle pressure
$K_P =$ constant of proportionality
$S_F =$ steam flow $K_F =$ constant of proportionality Where the throttle pressure is held substantially constant by external control as in the present case, the turbine load is thus proportional to the first stage impulse pressure $P_i$. The ratio $P_i/P_O$ may be used for control purposes, for example to obtain better anticipatory control of $P_i$ (i.e. turbine load) as the boiler control throttle pressure $P_O$ undergoes some variation within protective constraint limit values. However, it is preferred in the present case that the impulse pressure $P_i$ be used for feedback signalling in load control operation as subsequently more fully described, and a conventional pressure detector 40 is employed to determine the pressure $P_i$ for the assigned control usage.

Within its broad field of applicability, the invention can also be applied in nuclear reactor and other applications involving steam generating systems which produce steam without placement of relatively close steam generator control on the constancy of the turbine throttle pressure. In such cases, throttle control and operating philosophies are embodied in a form preferred for and tailored to the type of plant and turbine involved. In cases of unregulated throttle pressure supply, turbine operation may be directed with top priority to throttle pressure control or constraint and with lower priority to turbine load and/or speed control.

Respective hydraulically operated throttle valve actuators indicated by the reference character 42 are provided for the four throttle valves TV1-TV4. Similarly, respective hydraulically operated governor valve actuators indicated by the reference character 44 are provided for the eight governor valves GV1-GV8. Hydraulically operated actuators indicated by the reference characters 46 and 48 are provided for the reheat stop and interceptor valves SV and IV. A computer monitored high pressure fluid supply 50 provides the controlling fluid for actuator operation of the valves TV1-TV4, GV1-GV8, SV and IV. A computer supervised lubricating oil system (not shown) is separately provided for turbine plant lubricating requirements.

The respective actuators 42, 44, 46 and 48 are of conventional construction, and the inlet valve actuators 42 and 44 are operated by respective stabilizing position controls indicated by the reference characters 50 and 52. If desired, the interceptor valve actuators 48 can also be operated by a position control 56 although such control is not employed in the present detailed embodiment of the invention. Each position control includes a conventional analog controller (not shown in FIG. 1) which drives a suitably known actuator servo valve (not indicated) in the well known manner. The reheat stop valve actuators 46 are fully open unless the conventional trip system or other operating means causes them to close and stops the reheat steam flow.

Since the turbine power is proportional to steam flow under the assumed control condition of substantially constant throttle pressure, steam valve positions are controlled to produce control over steam flow as an intermediate variable and over turbine speed and/or load as an end control variable or variables. Actuator operation provides the steam valve positioning, and respective valve position detectors PDT1-PDT4, PDG1-PDG8 and PDI are provided to generate respective valve position feedback signals for developing position error signals to be applied to the respective position controls 50, 52 and 56. One or more contact sensors CSS provides status data for the stop valving SV. The position detectors are provided in suitable conventional form, for example, they may make conventional use of linear variable differential transformer operation in generating negative position feedback signals for algebraic summing with respect to position setpoint signals SP in developing the respective input error signals. Position controlled operation of the interceptor valving IV would typcally be provided only under a reheat steam flow cutback requirement.

The combined position control, hydraulic actuator, valve position detector element and other miscellaneous devices (not shown) form a local hydraulic electric analog valve position control for each throttle or governor inlet steam valve. The position setpoints SP are computer determined and supplied to the respective local loops and updated on a periodic basis. Setpoints SP may also be computed for the interceptor valve controls when the latter are employed. A more complete general background description of electrohydraulic steam valve positioning and hydraulic fluid supply systems for valve actuation is presented in the aforementioned Birnbaum and Noyes paper.

In the present case, the described hybrid arrangement including local loop analog electrohydraulic position control is preferred primarily because of the combined effects of control computer operating speed capabilities and computer hardware economics, i.e., the cost of manual backup analog controls is less than that for backup computer capacity at present control computer operating speeds for particular applications so far developed. Further consideration of the hybrid aspects of the turbine control system is presented subsequently herein. However, economic and fast operating backup control computer capability is expected and direct digital computer control of the hydraulic valve actuators will then likely be preferred over the digital control of local analog controls described herein.

A speed detector 58 is provided for determining the turbine shaft speed for speed control and for frequency participation control purposes. The speed detector 58 can for example be in the form of a reluctance pickup (not shown) magnetically coupled to a notched wheel (not shown) on the turbo-generator shaft 14. In the detailed embodiment subsequently described herein, a plurality of sensors are employed for speed detection. Analog and/or pulse signals produced by the speed detector 58, the electric power detector 18, the pressure detectors 38 and 40, the valve position detectors PDT1–PDT4, PDG1–PDG8 and PDI, the status contact or contacts CSS, and other sensors (not shown) and status contacts (not shown) are employed in programmed computer operation of the turbine 10 for various purposes including controlling turbine performance on an on-line real time basis and further including monitoring, sequencing, supervising, alarming, displaying and logging.

B. DEH — COMPUTER CONTROL SYSTEM

As generally illustrated in FIG. 2, a Digital Electro-Hydraulic control system (DEH) 1100 includes a programmed digital computer 210 to operate the turbine 10 and the plant 12 with improved performance and operating characteristics. The computer 210 can include conventional hardware including a central processor 212 and a memory 214. The digital computer 210 and its associated input/output interfacing equipment is a suitable digital computer system such as that sold by Westinghouse Electric Corporation under the trade name of P2000. In cases when the steam generating system 26 as well as the turbine 10 are placed under computer control, use can be made of one or more P2000 computers or alternatively a larger computer system such as that sold by Xerox Data Systems and known as the Sigma 5. Separate computers, such as P2000 computers, can be employed for the respective control functions in the controlled plant unit and interaction is achieved by interconnecting the separate computers together through data links or other means.

The digital computer used in the DEH control system 1100 is a P2000 computer which is designed for real time process control applications. The P2000 typically uses a 16 bit word length with 2's complement, a single address and fixed word length operated in a parallel mode. All the basic DEH system functions are performed with a 16,000 word (16K), 3 microsecond magnetic core memory. The integral magnetic core memory can be expanded to 65,000 words (65K).

The equipment interfacing with the computer 210 includes a contact interrupt system 124 which scans contacts representing the status of various plant and equipment conditions in plant wiring 1126. The status contacts might typically be contacts of mercury wetted relays (not shown) which operate by energization circuits (not shown) capable of sensing the predetermined conditions associated with the various system devices. Data from status contacts is used in interlock logic functioning and control for other programs, protection analog system functioning, programmed monitoring and logging and demand logging, etc.

Operator's panel buttons 1130 transmit digital information to the computer 2010. The operator's panel buttons 1130 can set a load reference, a pulse pressure, megawatt output, speed, etc.

In addition, interfacing with plant instrumentation 1118 is provided by an analog input system 1116. The analog input system 1116 samples analog signals at a predetermined rate from predetermined input channels and converts the signals sampled to digital values for entry into the computer 210. The analog signals sensed in the plant instrumentation 1118 represent parameters including the impulse chamber pressure, the megawatt power or the valve positions of the throttle valves TV1 through TV4 and the governor valves GV1 through GV8 and the interceptor valve IV, throttle pressure, steam flow, various steam temperatures, miscellaneous equipment operating temperature, generator hydrogen cooling pressure and temperature, etc. A detailed list of all parameters is provided in Appendix 1. Such parameters include process parameters which are sensed or controlled in the process (turbine or plant) and other variables which are defined for use in the programmed computer operation. Interfacing from external systems such as an automatic dispatch system is controlled through the operator's panel buttons 1130.

A conventional programmer's console and tape reader 218 is provided for various purposes including program entry into the central processor 212 and the memory 214 thereof. A logging typewriter 1146 is provided for logging printouts of various monitored parameters as well as alarms generated by an automatic turbine startup system (ATS) which includes program system blocks 1140, 1142, 1144 (FIG. 8) in the DEH control system 1100. A trend recorder 1147 continuously records predetermined parameters of the system. An interrupt system 124 is provided for controlling the input and output transfer of information between the digital computer 210 and the input/output equipment. The digital computer 210 acts on interrupt from the interrupt system 124 in accordance with an executive program. Interrupt signals from the interrupt system 124 stop the digital computer 210 by interrupting a program in operation. The interrupt signals are serviced immediately.

Output interfacing is provided by contacts 1128 for the computer 210. The contacts 1128 operate status display lamps, and they operate in conjunction with a conventional analog/output system and a valve position control output system comprising a throttle valve control system 220 and a governor valve control system 222. A manual control system is coupled to the valve position control output system 220 and is operable therewith to provide manual turbine control during computer shut-down. The throttle and governor valve control systems 220 and 222 correspond to the valve position controls 50 and 52 and the actuators 42 and 44 in FIG. 1. Generally, the manual control system is similar to those disclosed in prior U.S. Pat. No. 3,552,872 by T. Giras et al and U.S. Pat. No. 3,741,246 by A. Braytenbah, both assigned to the present assignee.

Digital output data from the computer 210 is first converted to analog signals in the analog output system 224 and then transmitted to the valve control system 220 and 222. Analog signals are also applied to auxiliary devices and systems, not shown, and interceptor valve systems, not shown.

C. SUBSYSTEMS EXTERNAL TO THE DEH COMPUTER

Figure 3:
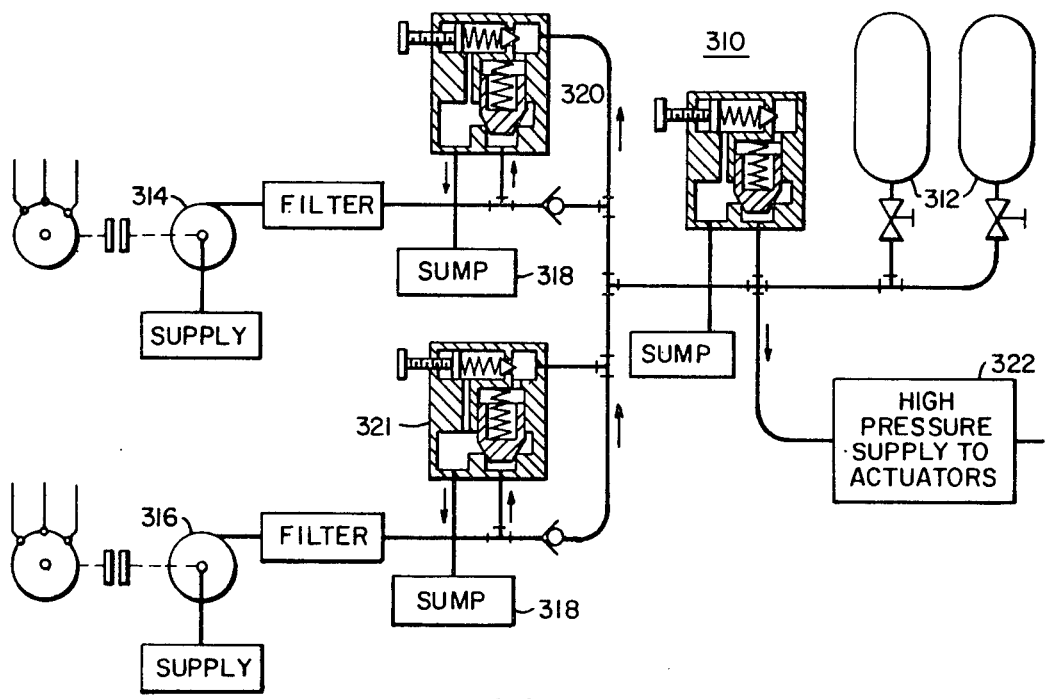
FIG. 3 shows a hydraulic system for supplying hydraulic fluid to valve actuators of the steam turbine.

At this point in the description, further consideration of certain subsystems external to the DEH computer will aid in reaching an understanding of the invention. Making reference now to FIG. 3, a high pressure HP fluid supply system 310 for use in controlled actuation of the governor valves GV1 through GV8, the throttle valves TV1 through TV4 and associated valves is shown. The high pressure fluid supply system 310 corresponds to the supply system 49 in FIG. 1 and it uses a synthetic, fire retardant phosphate ester-based fluid and operates in the range of 1500 and 1800 psi. Nitrogen charged piston type accumulators 312 maintain a flow of fluid to the actuators for the governor valves GV1-GV8, the throttle valves TV1-TV4, etc. when pumps 314 and 316 are discharging to a reservoir 318 through unloader valves 320 and 321. In addition, the accumulators 312 provide additional transient flow capacity for rapid valve movements.

Figure 4:
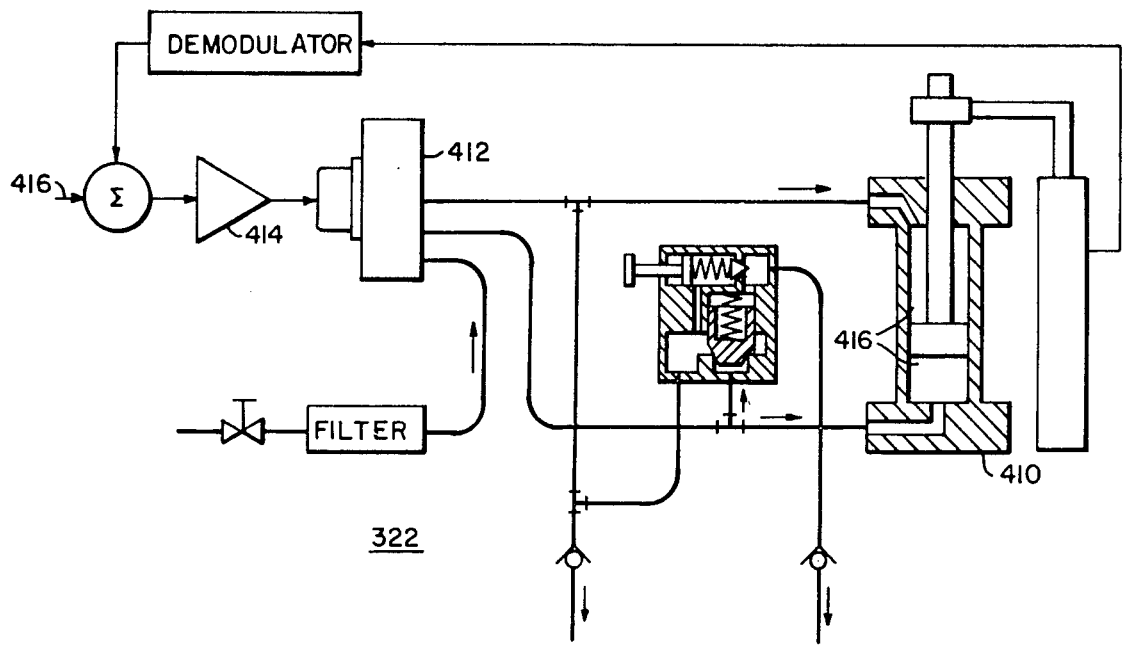
FIG. 4 shows a schematic diagram of a servo system connected to the valve actuators.

Referring now to FIG. 4, a typical electrohydraulic valve actuation system 322 is shown in greater detail for positioning a modulating type valve actuator 410 against the closing force of a large coil spring. A servo-valve 412 which is driven by a servo-amplifier 414 controls the flow of fluid therethrough. The servo-valve 412 controls the flow of fluid entering or leaving the valve actuator cylinder 416 relative to the HP fluid supply system 310. A linear voltage differential transformer LVTD generates a valve position indicating transducer voltage which is summed with a valve position demand voltage at connection 418. The summation of the two previously mentioned voltages produces a valve position error input signal to the servo amplifier 414. The linear voltage differential transformer LVTD has a linear voltage characteristic with respect to displacement thereof in the preferred embodiment. Therefore, the position of the valve actuator 410 is made proportional to the valve position demand voltage at connection 418.

Figure 5:
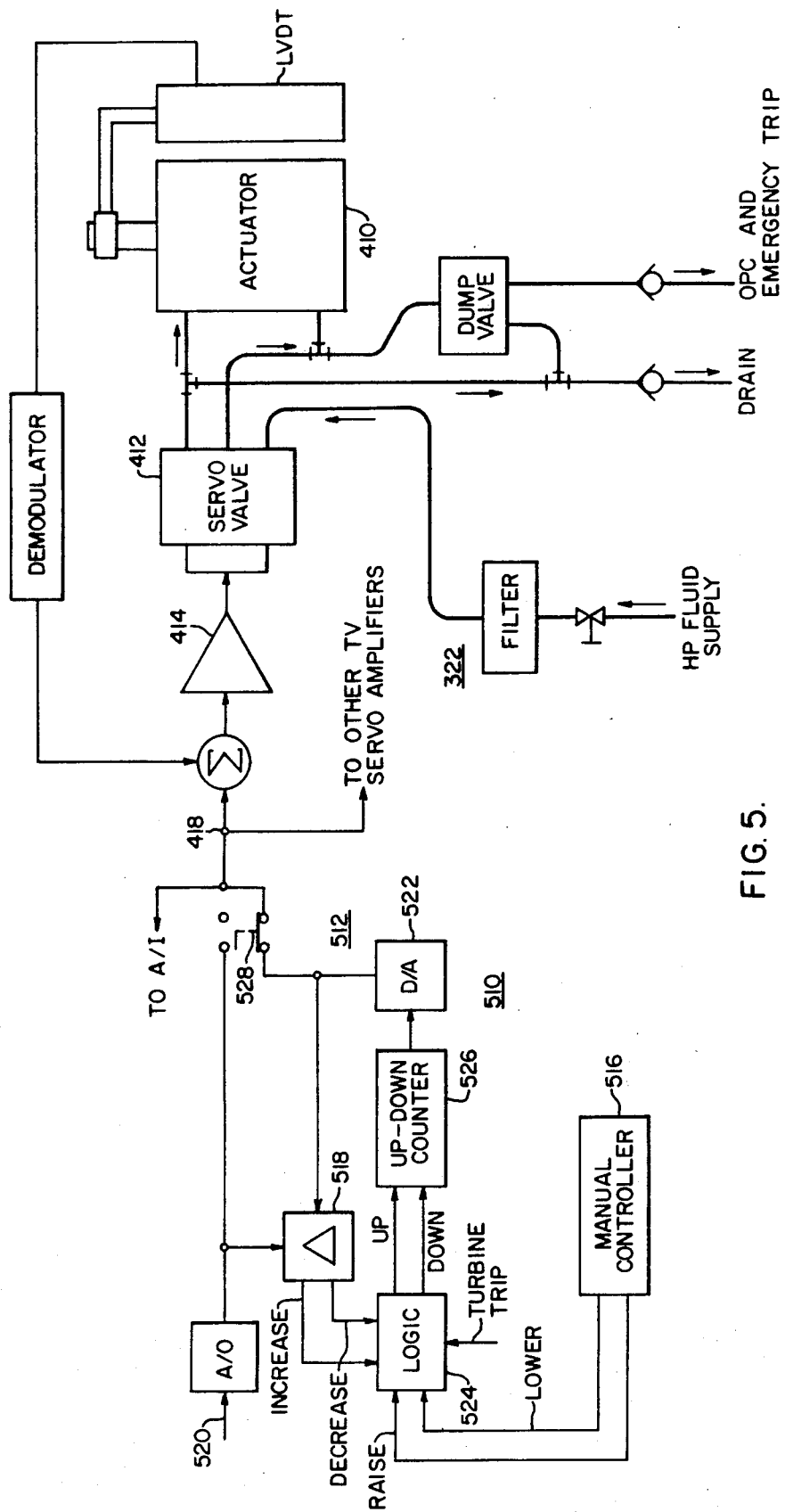
FIG. 5 shows a schematic diagram of a hybrid interface between a manual backup system and the digital computer connected with the servo system controlling the valve actuators.

Making reference now to FIG. 5, a hardwired digital-/analog system forms a part of the DEH control system 1100 (FIG. 2). Structurally, it embraces elements which are included in the blocks 50, 52, 42 and 44 of FIG. 1 as well as additional elements. A hybrid interface 510 is included as a part of the hardwired system. The hybrid interface 510 is connected to actuator system servo-amplifiers 414 for the various steam valves which in turn are connected to a manual controller 516, an overspeed protection controller, not shown, and redundant DC power supplies, not shown.

A controller shown in FIG. 5 is employed for throttle valve TV1-TV4 control in the TV control system 50 of FIG. 1. The governor valves GV1-GV8 are controlled in an analogous fashion by the GV control system 52.

While the steam turbine is controlled by the digital computer 210, the hardwired system 511 tracks single valve analog outputs 520 from the digital computer 210. A comparator 518 compares a signal from a digital-to-analog converter 522 of the manual system with the signal 520 from the digital computer 210. A signal from the comparator 518 controls a logic system 524 such that the logic system 524 runs an up-down counter 526 to the point where the output of the converter 522 is equal to the output signal 520 from the digital computer 210. Should the hardwired system 511 fail to track the signal 520 from the digital computer 210 a monitor light will flash on the operator's panel.

When the DEH control system reverts to the control of the backup manual controller 516 as a result of an operator selection or due to a contingency condition, such as loss of power on the automatic digital computer 210, or a stoppage of a function in the digital computer 210, or a loss of a speed channel in the wide range speed control all as described in greater detail infra, the input of the valve actuation system 322 (FIG. 4) is switched by switches 528 from the automatic controllers in the blocks 50, 52 (FIG. 1) or 220, 222 (FIG. 2) to the control of the manual controller 516. Bumpless transfer is thereby accomplished between the digital computer 210 and the manual controller 516.

Similarly, tracking is provided in the computer 210 for switching bumplessly from manual to automatic turbine control. As previously indicated, the presently disclosed hybrid structural arrangement of software and hardware elements is the preferred arrangement for the provision of improved turbine and plant operation and control with backup capability. However, other hybrid arrangements can be implemented within the field of application of the invention.

D. DEH PROGRAM SYSTEM

DEH Program System Organization, DEH Control Loops And Control Task Program

Figure 6:
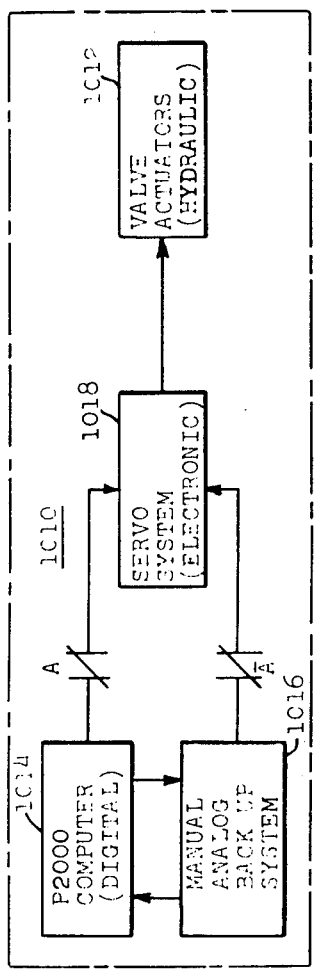
FIG. 6 shows a simplified block diagram of the digital Electro Hydraulic Control System in accordance with the principle of the invention.

With reference now to FIG. 6, an overall generalized control system of this invention is shown in block diagram form. The digital electrohydraulic (DEH) control system 1100 operates valve actuators 1012 for the turbine 10. The digital electrohydraulic control system 1100 comprises a digital computer 1014, corresponding to the digital computer 210 in FIG. 2, and it is interconnected with a hardwired analog backup control system 1016. The digital computer 1014 and the backup control system 1016 are connected to an electronic servo system 1018 corresponding to blocks 220 and 222, in FIG. 2. The digital computer control system 1014 and the analog backup system 1016 track each other during turbine operations in the event it becomes necessary or desirabe to make a bumpless transfer of control from a digital computer controlled automatic mode of operation to a manual analog backup mode or from the manual mode to the digital automatic mode.

In order to provide plant and turbine monitor and control functions and to provide operator interface functions, the DEH computer 1014 is programmed with a system of task and task support programs. The program system is organized efficiently and economically to achieve the end operating functions. Control functions are achieved by control loops which structurally include both hardware and software elements, with the software elements being included in the computer program system. Elements of the program system are considered herein to a level of detail sufficient to reach an understanding of the invention. More functional detail on various programs is presented in Appendix 2. Further, a detailed listing of a DEH system program substantially conforming to the description presented herein is presented in Appendix 3 is symbolic and machine language. Most of the listing is compiled by a P2000 compiler from instructions written in Fortran IV. A detailed dictionary of system parameters is presented in Appendix 1, and a detailed computer input/output signal list is presented in Appendix 4. Appendix 5 mainly provides additional hardware information related to the hardwired system previously considered as part of the DEH control system.

As previously discussed, a primary function of the digital electrohydraulic (DEH) system 1100 is to automatically position the turbine throttle valves TV1 through TV4 and the governor valves GV1 through GV8 at all times to maintain turbine speed and/or load. A special periodically executed program designated the CONTROL task is utilized by the P2000 computer along with other programs to be described in greater detail subsequently herein.

Figure 7:
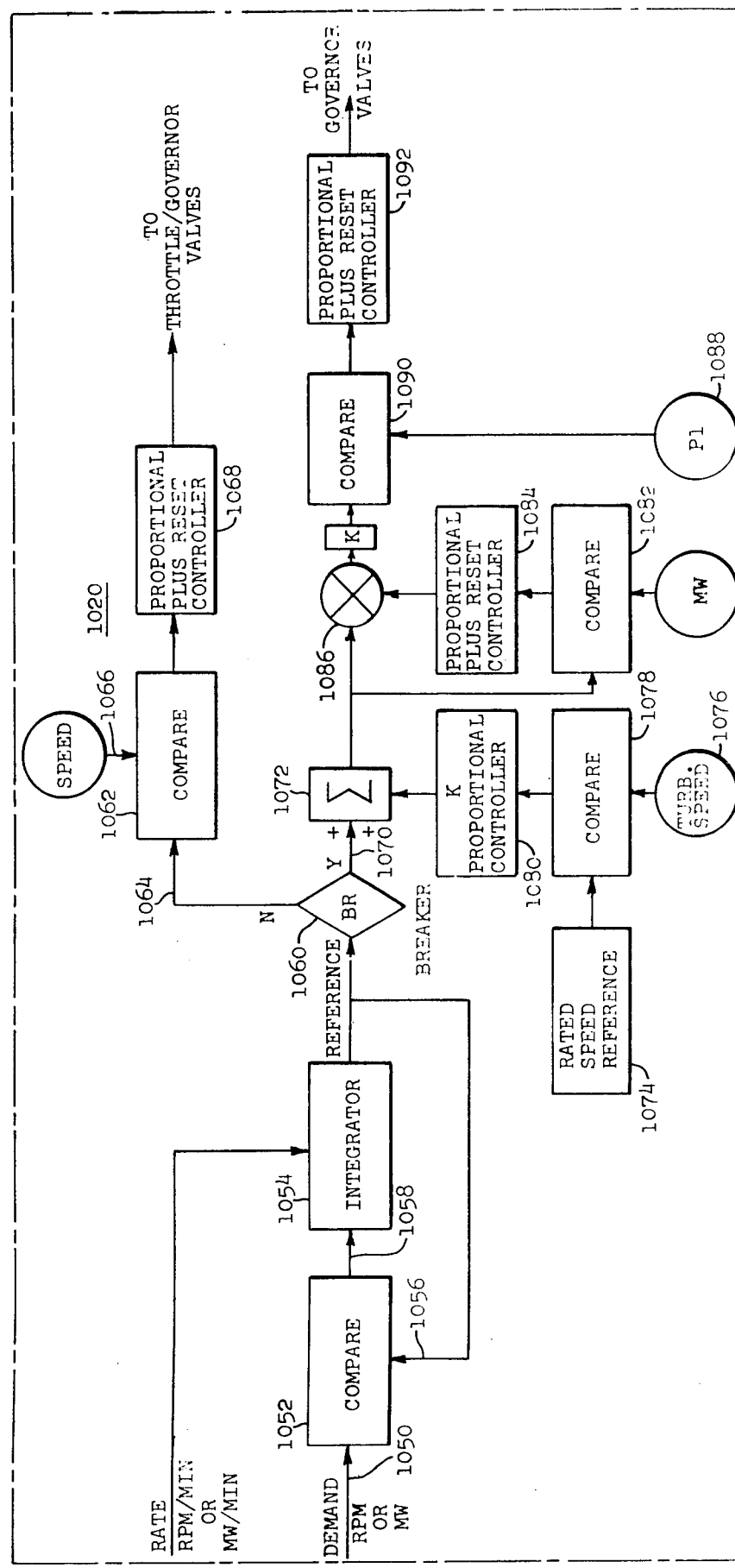
FIG. 7 shows a block diagram of a control program used in accordance with the principles of the invention.

With reference now to FIG. 7, a functional control loop diagram in its preferred form includes the CONTROL task or program 1020 which is executed in the computer 1010. Inputs representing demand and rate provide the desired turbine operating setpoints. The demand is typically either the target speed in specified revolutions per minute of the turbine systems during startup or shutdown operations of the target load in megawatts of electrical output to be produced by the generating system 16 during load operations. The demand enters the block diagram configuration of FIG. 7 at the input 1050 of a compare block 1052.

The rate input either in specified RPM per minute or specified megawatts per minute, depending upon which input is to be used in the demand function, is applied to an integrator block 1054. The rate inputs in RPM and megawatts of loading per minute are established ot limit the buildup of stresses in the rotor of the turbine-generator 10. An error output of the compare block 1052 is applied to the integrator block 1054. In generating the error output the demand value is compared with a reference corresponding to the present turbine operating setpoint in the compare block 1052. The reference value is representative of the setpoint RPM applied to the turbine system or the setpoint generator megawatts output, depending upon whether the turbine generating system is in the speed mode of operation or the load mode of operation.

The error output is applied to the integrator 1054 so that a negative error drives the integrator 1054 in one sense and a positive error drives it in the opposite sense. The polarity error normally drives the integrator 1054 until the reference and the demand are equal or if desired until they bear some other predetermined relationship with each other. The rate input to the integrator 1054 varies the rate of integration, i.e. the rate at which the reference or the turbine operating setpoint moves toward the entered demand.

Demand and rate input signals can be entered by a human operator from a keyboard. Inputs for rate and demand can also be generated or selected by automatic synchronizing equipment, by automatic dispatching system equipment external to the computer, by another computer automatic turbine startup program or by a boiler control system. The inputs for demand and rate in automatic synchronizing and boiler control modes are preferably discrete pulses. However, time control pulse widths or continuous analog input signals may also be utilized. In the automatic startup mode, the turbine acceleration is controlled as a function of detected turbine operating conditions including rotor thermal stress. Similarly, loading rate can be controlled as a function of detected turbine operating conditions.

The output from the integrator 1054 is applied to a breaker decision block 1060. The breaker decision block 1060 checks the state of the main generator circuit breaker 17 and whether speed control or load control is to be used. The breaker block 1060 them makes a decision as to the use of the reference value. The decision made by the breaker block 1060 is placed at the earliest possible point in the control task 1020 thereby reducing computational time and subsequently the duty cycle required by the control task 1020. If the main generator circuit breaker 17 is open whereby the turbine system is in wide range speed control the reference is applied to the compare block 1062 and compared with the actual turbine generator speed in a feedback type control loop. A speed error value from the compare block 1062 is fed to a proportional plus reset controller block 1068, to be described in greater detail later herein. The proportional plus reset controller 1068 provides an integrating function in the control task 1060 which reduces the speed error signal to zero. In the prior art, control systems limited to proportional controllers are unable to reduce a speed error signal to zero. During manual operation an offset in the required setpoint is no longer required in order to maintain the turbine speed at a predetermined value. Great accuracy and precision of turbine speed whereby the turbine speed is held within one RPM over tens of minutes is also accomplished. The accuracy of speed is so high that the turbine 10 can be manually synchronized to the power line without an external synchronizer typically required. An output from the proportional plus reset controller block 1068 is then processed for external actuation and positioning of the appropriate throttle and/or governor values.

If the main generator circuit breaker 17 is closed, the CONTROL task 1020 advances from the breaker block 1060 to a summer 1072 where the REFERENCE acts as a feedforward setpoint in a combined feedforward-feedback load control system. If the main generator circuit breaker 17 is closed, the turbine generator system 10 is being loaded by the electrical network connected thereto.

In the control task 1020 of the DEH system 1100 utilizes the summer 1072 to compare the reference value with the output of speed loop 1310 in order to keep the speed correction independent of load. A multiplier function has a sensitivity to varying load which is objectionable in the speed loop 1310.

During the load mode of operation the DEMAND represents the specified loading in MW of the generator 16 which is to be held at a predetermined value by the DEH system 1100. However, the actual load will be modified by any deviations in system frequency in accordance with a predetermined regulation value. To provide for frequency participation, a rated speed value in box 1074 is compared in box 1078 with a "two signal" speed value represented by box 1076. The two signal speed system provides high turbine operating reliability to be described infra herein. An output from the compare function 1078 is fed throgh a function 1080 which is similar to a proportional controller which converts the speed error value in accordance with the regulation value. The speed error from the proportional controller 1080 is combined with the feedforward megawatt reference, i.e., the speed error and the megawatt reference are summed in summation function or box 1072 to generate a combined speed compensated reference signal.

The speed compensated load reference is compared with actual megawatts in a compare box or function 1082. The resultant error is then run through a proportional plus reset controller represented by program box 1084 to generate a feedback megawatt trim.

The feedforward speed compensated reference is trimmed by the megawatt feedback error multiplicatively to correct load mismatch, i.e. they are multipled together in the feedforward turbine reference path by multiplication function 1086. Multiplication is utilized as a safety feature such that if one signal e.g. MW should fail a large value would not result which could cause an overspeed condition but instead the DEH system 1100 would switch to a manual mode. The resulting speed compensated and megawatt trimmed reference serves as an impluse pressure setpoint in an impulse pressure controller and it is compared with a feedback impulse chamber pressure representation from input 1088. The difference between the feedforward reference and the impulse pressure is developed by a comparator function 1090, and the error output therefrom functions in a feedback impluse pressure control loop. Thus, the impulse pressure error is applied to a proportional plus reset controller function 1092.

During load control the megawatt loop comprising in part flocks 1082 and 1084 may be switched out of service leaving the speed loop 1310 and an impulse pressure loop operative in the DEH system 1100.

Impulse pressure responds very quickly to changes of load and steam flow and therefore provides a signal with minimum lag which smooths the output response of the turbine generator 10 because the lag dynamics and subsequent transient response is minimized. The impulse pressure input may be switched in and out from the compare function 1090. An alternative embodiment embracing feedforward control with impulse pressure feedback trim is applicable.

Between block 1092 and the governor valves GV1-GV8 a valve characterization function for the purpose of linearizing the response of the values is interposed. The valve characterization function described in detail in Appendix III infra herein is utilized in both automatic modes and manual modes of operation of the DEH system 1100. The output of the proportional plus reset controller function 1092 is then ultimately coupled to the governor valves GV1-GV8 through electrohydraulic position control loops implemented by equipment considered elsewhere herein. The proportional plus reset controller output 1092 causes positioning of the governor valves GV1-GV8 in load control to achieve the desired megawatt demand while compensation is made for speed, megawatt and impulse pressure deviations from desired setpoints.

Figure 8:
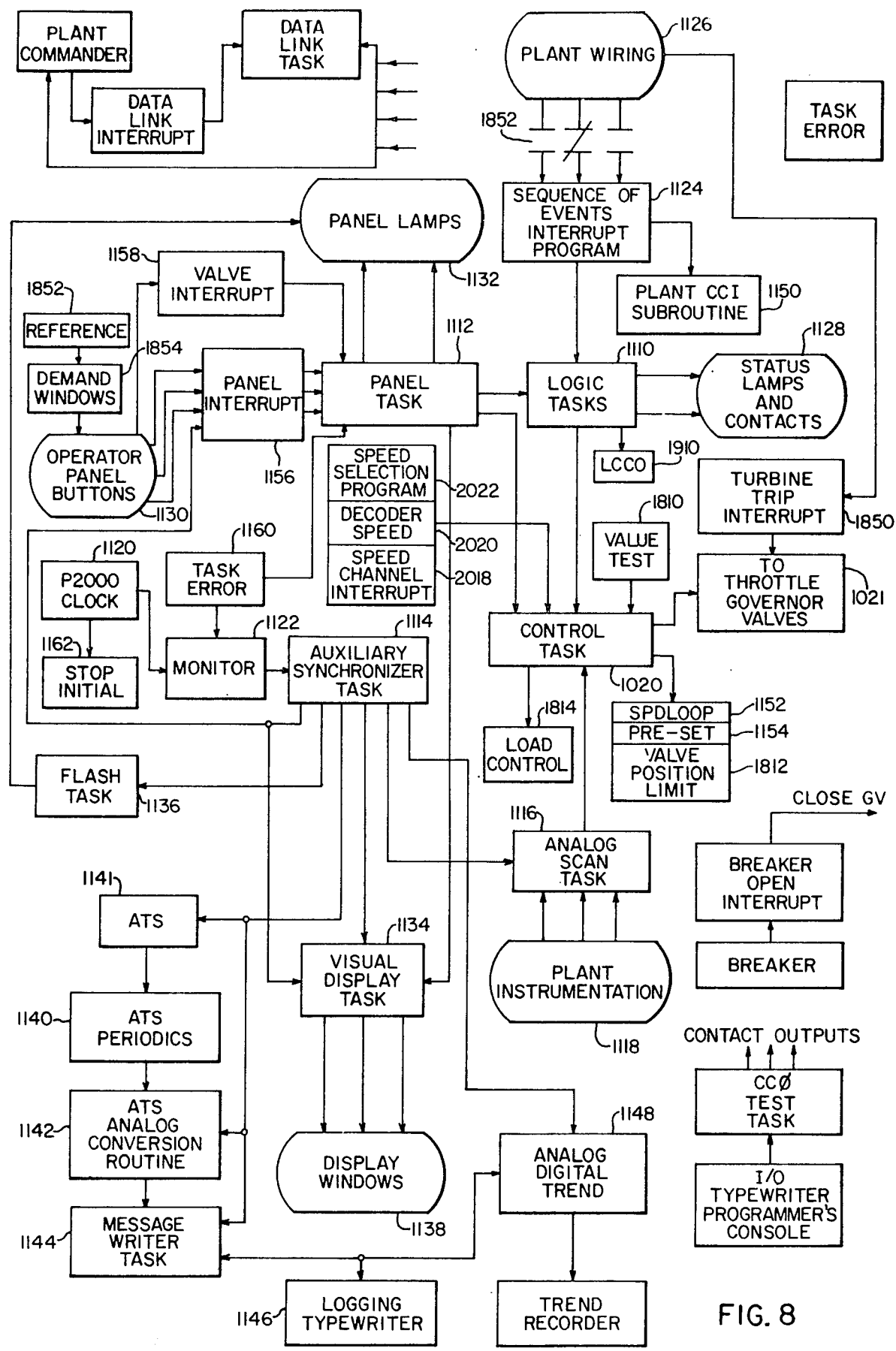
FIG. 8 shows a block diagram of the programs and subroutines of the digital Electro Hydraulic and the automatic turbine startup and monitoring program in accordance with the principles of the invention.

Making reference to FIG. 8, the control program 1020 is shown with interconnections to other programs in the program system employed in the Digital Electro Hydraulic (DEH) system 1100. The periodically executed program 1020 receives data from a logic task 1110 where mode and other decisions which affect the control program are made, a panel task 1112 where operator inputs may be determined to affect the control program, an auxiliary synchronizer program 1114 and an analog scan program 1116 which processes input process data. The analog scan task 1116 receives data from plant instrumentation 1118 external to the computer as considered elsewhere herein, in the form of pressure, temperatures, speeds, etc. and converts such data to proper form for use by other programs. Generally, the auxiliary synchronizer program 1114 measures time for certain important events and it periodically bids or runs the control and other programs. An extremely accurate clock function 1120 operates through a monitor program 1122 to run the auxiliary synchronizer program 1114.

The monitor program or executive package 1122 also provides for controlling certain input/output operations of the computer and, more generally, it schedules the use of the computer to the various programs in accordance with assigned priorities. For more detail on the P2000 computer system and its executive package, reference is made to Appendix 4. In the appendix description, the executive package is described as including analog scan and contact closure input routines, whereas these routines are considered as programs external to the executive package in this part of the disclosure.

The logic task 1110 is fed from outputs of a contact interrupt or sequence of events program 1124 which monitors contact variables in the power plant 1126. The contact parameters include those which represent breaker state, turbine auto stop, tripped/latched state interrogation data states, etc. Bids from the interrupt program 1124 are registered with and queued for execution by the executive program 1111. The control program 1110 also receives data from the panel task 1112 and transmits data to status lamps and output contacts 1128. The panel task 1112 receives data instruction based on supervision signals from the operator panel buttons 1130 and transmits data to panel lamps 1132 and to the control program 1020. The auxiliary synchronizer program 1114 synchronizes through the executive program 1111 the bidding of the control program 1020, the analog scan program 1116, a visual display task 1134 and a flash task 1136. The visual display task transmits data to display windows 1138.

The control program 1020 receives numerical quantities representing process variables from the analog scan program 1116. As already generally considered, the control program 1020 utilizes the values of the various feedback variables including turbine speed, impulse pressure and megawatt output to calculate the position of the throttle valves TV1-TV4 and governor valves GV1-GV8 in the turbine system 10, thereby controlling the megawatt load and the speed of the turbine 10.

To interface the control and logic programs efficiently, the sequence of events program 1124 normally provides for the logic task 1110 contact status updating on demand rather than periodically. The logic task 1110 computes all logical states according to predetermined conditions and transmits this data to the control program 1020 where this information is utilized in determining the positioning control action for the throttle valves TV1-TV4, and the governor valves GV1-GV8. The logic task 1110 also controls the state of various lamps and relay type contact outputs in a predetermined manner.

E. TASK PRIORITY ASSIGNMENTS

With reference now to FIG. 9, a table of program priority assignments is shown as employed in the executive monitor. A program with the highest priority is run first under executive control if two or more programs are ready to run. The stop/initializer program function has top priority and is run on startup of the computer or after the computer has been shut down momentarily and is being restarted. The control program 1020 is next in order of priority. The operator's panel program 1130, which generates control data, follows the control task 1020 in priority. The analog scan program 1116 also provides information to the control task 1020 and operates at a level of priority below that of the operator's panel 1130. The automatic turbine starting (ATS) periodic program 1140 is next in the priority list. ATS stands for automatic turbine startup and monitoring program, and is shown as a major task program 1140 of FIG. 8 for the operation of the DEH system 1100. The ATS-periodic program 1140 monitors the various temperatures, pressures, breaker states, rotational velocity, etc. during start-up and during load operation of the turbine system.

The logic task 1110, which generates control and operating mode data, follows in order of operating priority. The visual display task program 1134 follows the logic task program 1110 and makes use of outputs from the latter. A data link program for transmitting data from the DEH system to an external computer follows. An ATS-analog conversion task program 1142 for converting the parameters provided by the ATS-periodic program 1142 to usable computer data follows in order to priority. The flash task program 1136 is next, and it is followed by a programmer's console program which is used for maintenance testing and initial loading of data tapes. The next program is an ATS-message writer 1144 which provides for printout of information from the ATS analog conversion program 1142 on a suitable typewriter 1146. The next program in the priority list is an analog/digital trend which monitors parameters in the turbine system 10 and prints or plots them out for operator perusal. The remaining two programs are for debugging and special applications.

In the preferred embodiment, the stop/initialize program is given the highest priority in the table of FIG. 9 because certain initializing functions must be completed before the DEH system 1100 can run. The auxiliary synchronizer program 1114 provides timing for all programs other than the stop/initialize program while the DEH system 1100 is running. Therefore, the auxiliary synchronizer task program 1400 has the second order of priority of the programs listed. The control program 1020 follows at the third descending order of priority since the governor valves GV1 through VG8 and the throttle valves TV1 through TV4 must be controlled at all times while the DEH system 1100 is in operation.

The operator's panel program 1130 is given the next order of priority in order to enable an operator to exercise direct and instantaneous control of the DEH system 1100. The analog scan program 1116 provides input data for the control program 1020 and, therefore, is subordinate only to the initialize function, synchronizer control and operator functions.

In the preferred embodiment the ATS-periodic program 1140 is next in order of priority. During automatic turbine startup, the scanning of inputs by the ATS-periodic program 1140 is almost on the same order of priority as the inputs to the DEH system 1100. However, the ATS programm 1140 in alternative embodiments, could be reduced in its priority, without any considerable adverse effect, because of the relatively limited duty cycle problems in the ATS system.

The logic task 1110 which control the operations of some of the functions of the control task program 1020 is next in order of priority. The visual display task 1134 follows in order of priority in order to provide an operator with a visual indication of the operation of the DEH program 1100. The visual display program 1134 is placed in the relatively low eighth descending order of priority since the physical response of an operator is limited in speed to to 0.2 to 0.5 sec. as to a visual signal. The rest of the programs are in essentially descending order of importance in the preferred embodiment. In alternative embodiments of the inventions, alternate priority assignments can be employed for the described or similar programs, but the general priority listing described is preferred for the various reasons presented.

A series of interrupt programs interrupt the action of the computer and function outside the task priority assignments to process interrupts. One such program in FIG. 8 is the sequence events or contact interrupt program 1124 which suspends the operation of the computer for a very short period of time to process an interrupt. Between the operator panel buttons 1130 and the panel task program 1112 a panel interrupt program 1156 is utilized for signalling any changes in the operator's panel buttons 1130. A valve interrupt program 1158 is connected directly between the operator's panel buttons 1130 and the panel task program 1112 for operation during a valve test or in case of valve contingency situations.

Proportional plus reset controller subroutine 1154 (FIG. 11) is called by the control task program 1020 of FIG. 7 as previously described when the turbine control system is in the speed mode of control and also, for computer use efficiency, when the turbine 10 is in the load mode of control with the megawatt and impulse pressure feedback loops in service. Utilizing the proportional plus reset function 1068 during speed control provides very accurate control of the angular velocity of the turbine system.

In addition to previously described functions, the auxiliary synchronizer program 1114 is connected to and triggers the ATS periodic program 1140, the ATS analog conversion routine 1142 and the message writer 1144. The ATS program 1140 monitors a series of temperature, vibration, pressures, speed, etc. in the turbine system and also contains a routine for automatically starting the turbine system 10. The ATS analog conversion routine 1142 converts the digital computer signals from the ATS periodic program 1140 to analog or digital or hybrid form which can be typed out through the message writer task 1144 to the logging typewriter 1146 or a similar recorder.

The auxiliary synchronizer program 1114 also controls and analog/digital trend program 1148. The analog digital trend program 1148 records a set of variables in addition to the variables of the ATS periodic program 1140.

Ancillary to a series of other programs is a plant CCI subroutine 1150 where CCI stands for contact closure inputs. The plant CCI subroutine 1150 responds to changes in the state of the plant contacts as transmitted over the plant wiring 1126. Generally, the plant contacts are monitored by the CCI subroutine 1150 only when a change in contact state is detected. This scheme conserves computer duty cycle as compared to periodic CCI monitoring. However, other triggers including operator demand can be employed for a CCI scan.

As shown in FIG. 8 the control task 1020 calls ancillary thereto a speed loop task 1152 and the preset or proportional plus reset controller program 1154. Ancillary to the executive monitoring program 1122 is a task error program 1160. In conjunction with the clock program 1120 a stop/initialize program 1162 is used. Various other functions in FIG. 8 are described in greater detail infra.

1. PRESET SUBROUTINE

Making reference now to FIG. 11, a functional diagram of the proportional plus reset controller task program 1068 of FIG. 7 is shown in greater detail. The proportional plus reset controller subroutine 1068 is called by the control program 1020 of FIG. 7 when the DEH turbine control system 1100 is in the speed mode of control and also when the DEH turbine control system 1100 is in the load mode of control with the megawatt and impulse pressure feedback loops in service. As already indicated utilizing a proportional plus reset function during speed control provides very accurate control of the angular velocity of the turbine system.

The proportional plus reset controller 1068 provides an output which is composed of the sum of two parts. One part of the output is proportional to an input and the other part is an integral of the input. Therefore, instantaneous response is available as well as the capability of zero input error. A setpoint or dynamic reference from a demand source is applied to an input 1210 of a difference function 1212. The difference function 1212 compares the input and the actual controlled process value. An output from the difference function 1212 is fed to a proportional gain function 1216 and to an input of an integrator or integrating function 1218 having a reset time TR. An output from the integrator 1218 is high and low limited by the program as represented by the reset windup prevention function 1220 in order to avoid excessive integrator outputs which would occur with a reset windup.

Proportional and integral outputs from the gain function 1216 and the windup limited integrator 1218 are summed in a summing function 1222. The total output from the summing function 1222 is high and low limited by another function 1224 and fed to a process function 1226 thereby limiting the total output to a useful output range.

Making reference now to FIG. 12, a pictorial representation of a flow chart for the proportional plus reset controller program is shown. In the preferred embodiment the Preset program is designed such that a call from the control program 1030 provides a list of variables necessary to evaluate the controller 1068 output. The structure of the subroutine is indicated by the Fortran statement given below.

SUBROUTINE PRESET (ERR, ERRX, G, TR, HL, XLL, RES, PRES)

The variables in the above equation are defined as follows:

| FORTRAN Variables | English Language Equivalents |
|---|---|
| ERR | The current input |
| ERRX | The last input |
| G | The controller proportional gain |
| TR | The controller reset time |
| HL | The controller high limit |
| XLL | The controller low limit |
| RES | The controller integral output |
| PRES | The controller total output. |

Again making reference to FIG. 12, where standard FORTRAN notation is used, the Preset subroutine 1068 first evaluates the integral part of the controller output according to equation:

$$Y(N) = Y(N - 1) + (DT/2*TR) *[X(N) + X(N - 1)].$$

The subroutine 1068 next saves the current input ERR in storage location ERRX 1250 for the following call to the subroutine 1068. The controller integral output RES 1252 is then checked against the high limit 1254 and the low limit 1256 to prevent reset/windup. The proportional part of the output is computed and added to the integral part of the output integrator 1218 to form the total output PRES 1258. PRES 1258 is checked against high limit 1260 and low limit 1262 after which the proportional plus reset controller subroutine 1068 returns to the control task 1020.

As previously considered, the proportional plus reset controller subroutine 1068 is used by the control task program 1020 during three different phases of operation of the turbine system. During startup of the turbine system 10, the proportional plus reset controller subroutine program 1068 is used as a speed controller in order to regulate and hold the speed of the turbine 10 at a predetermined value or at a predetermined acceleration rate. Because of the integral function of the proportional plus reset controller subroutine program 1068 the speed of the turbine system 10 can be held to within 1 rpm. Also, in order for an operator to keep the speed of the turbine system 10 at a predetermined value, an error offset input signal typical of a purely propotional system is not required. Therefore, the reference and the controlled variable, both turbine speed in this case, will be equal. The proportional plus reset controller subroutine program 1068 is also used in the megawatt controller feedback loop and the impulse chamber pressure controller feedback loop.

During turbine startup, the quantity REFDMD is the internal speed reference while WS is the actual turbine speed. GS1 and T1 are the proportional gain and reset time, HLS and 0. are the high and low limits, RESSPD is the integral part of the output, SPDSP is the total output, and RESSPDX is the last value of the input.

In the megawatt controller during megawatt loop operation, REF1 is the megawatt set point, MW is the megawatt feedback, and GR2 is a ranging gain to convert from engineering units to per-unit form. GL2 and T2 are the proportional gain and the reset time, while HEL and LEL are high and low limits. RESMW is the integral output, Y is the total output, and RESMWX is the last input.

With impulse pressure loop operation, PISP is the set point for the impulse pressure controller, PI is the feedback and GL3 and T3 are the proportional gain and the reset time. GR4 and 0. are the high and low limits, RESPI is the integral output, VSP is the total output, and RESPIX is the last input.

RESET INTEGRATOR ALGORITHM

To perform the mathematical function of integration in a digital computer it is desirable to use numerical techniques to approximate the exact value of the integral. In the preferred embodiment, the algorithm uses the trapezoidal rule for integration and it is simple in format, requires little computer storage and is executed very rapidly. The algorithm uses one value of input past history to achieve a high degree of accuracy.

The following algorithm is used in the computer:

$$Y(N) = Y(N-1) + (DT/2*TR) [X(N) + X(N-1)].$$

Definitions of the terms in this equation follow:
- (N) — The current instant of real time
- (N−1) — The last instant of real time.
- DT — The sampling interval, or the time duration between evaluations of the integration algorithm. In the DEH Control System this is normally 1 sec.
- TR — The controller reset time in sec.
- X(N) — The current value of the input.
- X(N−1) — The last value of the input.
- Y(N) — The current value of the output.
- Y(N−1) — The last value of the output.

To use the integrator algorithm, the DEH control system is organized so that the parameters DT and TR, the input variables X(N) and X(N−1), and the output variables Y(N) and Y(N−1) are in known areas of COMMON storage. The CONTROL task computes the current value of X(N) and calls the PRESET subroutine. The PRESET subroutine evaluates the current value of Y(N) according to the integrator algorithm and stores the value for use by all other parts of the DEH system.

2. SPEED LOOP SUBROUTINE

Making reference now to FIG. 13, a speed loop program 1310 which functionally is part of the arrangement shown in FIG. 7 is shown in greater detail. The speed loop (SPDLOOP) program 1310 normally computes data required in the functioning of the speed feedback loop in the load control comprising as shown in FIG. 7 the rated speed reference 1074, the actual turbine speed 1076, the compare function 1078, the proportional controller 1080 and the summing function 1072. During the load control the speed feedback loop adjusts the load reference (and thus the governor valves) to correct for any turbine speed deviation from rated speed. The speed feedback loop uses a proportional controller to accomplish this function. The speed loop subroutine 1310 is called upon to perform speed control loop functions by the control program 1020. In FIG. 13, the functioning of the proportional controller 1080 is shown in detail. The error output from the compare function 1078 is fed through a deadband function 1312. A proportionality constant (GR1) 1314 and a high limit function (HLF) 1316 are included in the composition.

The speed loop (SPDLOOP) subroutine is called by the control task during the load control mode and when switching occurs betweend actual speed signals. Subroutine form reduces the requirement for memory storage space thereby reducing the computer expense required for operation of the DEH system 1100.

The deadband function 1312 provides for bypassing small noise variations in the speed error generated by the compare function 1078 so as to prevent turbine speed changes which would otherwise occur. Systems without a deadband continuously respond to small variations which are random in nature resulting in undue stress in the turbine 10 and unnecessary, time and duty cycle consuming operation of the control system. A continuous hunting about the rated speed due to the gain of the system would occur without the deadband 1312. The speed regulation gain GR1 at 1314 is set to yield rated megawatt output power speed correction for a predetermined turbine speed error. The high limit function HLS at 1316 provides for a maximum speed correction factor.

The turbine speed 1076 is derived from three transducers. The turbine digital speed transducer arrangement is that disclosed in greater element and system implementation detail in the aforementioned Reuther Application Ser. No. 412,513. Briefly, in the preferred embodiment for determining the speed of the turbine, the system comprises three independent speed signals. These speed signals consist of a very accurate digital signal generated by special electronic circuitry from a magnetic pickup, an accurate analog signal generated by a second independent magnetic pickup, and a supervisory analog instrument signal from a third independent pickup. The DEH system compares these signals and through logical decisions selects the proper signal to use for speed control or speed compensated load control. This selection process switches the signal used by the DEH control system 1100 from the digital channel signal to the accurate analog channel signal or vice versa under predetermined dynamic conditions. In order to hold the governor valves at a fixed position during this speed signal switching the control program 1020 uses the speed loop subroutine 1310 and performs a computation to maintain a bumpless speed signal transfer.

Making reference to FIG. 14, the speed loop (SPDLOOP) subroutine flow chart 1310 is shown in greater detail. Two FORTRAN statements signify the operations of the speed loop subroutine program flow chart 1310. These statements are:

CALL SPDLOOP
REF1 = REFDMD + X

Variables in the flow chart 1310 are defined as follows:

| FORTRAN Variables | English Language Equivalent |
|---|---|
| REFMD | Load reference |
| WR | The turbine rated speed |
| REF1 | Corrected load reference |
| WS | The actual turbine speed |
| TEMP | Temporary storage location variable |

| FORTRAN Variables | English Language Equivalent |
|---|---|
| SPDB | The speed deadband |
| GR1 | The speed regulation gain (normally set to yield rated megawatt speed correction for a 180 rpm speed error) |
| X | Speed correction factor |
| HLF | The high limit function |

3. PLANT CONTACT CLOSURE INPUT (PLANTCCI) SUBROUTINE PROGRAM

A plant contact closure input subroutine 1150 as shown in FIG. 8 scans all the contact inputs tied to the computer through the plant wiring 1126 and sets logic data images of these in designated areas within the memory 214 of the computer 210.

Figure 15:
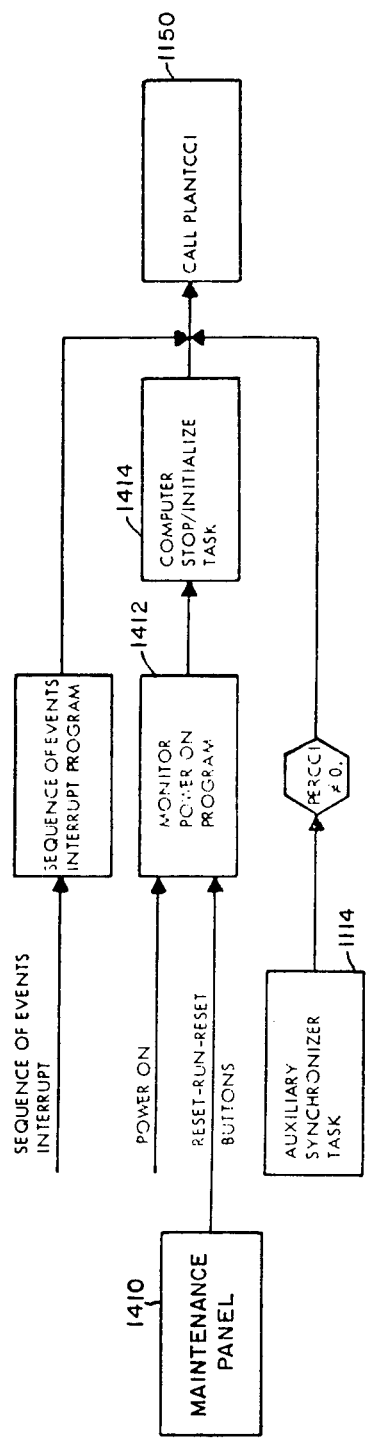
FIG. 15 shows a block diagram of a subroutine for scanning contact close inputs of the Digital Electro Hydraulic System which is operable in accordsnce with the principles of the invention.

Various situations call for the PLANTCCI subroutine. The most common case represents a basic design feature of the DEH system; that is, the situation in which a change of state of any contact input triggers a sequence of events interrupt. A corresponding interrupt program then calls the PLANTCCI subroutine to do a scan of all contact inputs and to update the computer contact image table. Thus (under normal conditions) a contact scan is carried out only when necessary. A block diagram illustrating the operation of the plant contact closure input subroutine 1150 is shown in FIG. 15. The plant contact closure input subroutine 1150 is also utilized when power to the computer 210 is turned on or when the computer buttons reset-run-reset are pressed on a maintenance panel 1410. Under these circumstances, a special monitor power-on routine 1412 is called upon. This program executes the computer STOP/INITIALIZE task 1414 described previously, which in turn calls the plant contact closure input subroutine 1150 for performance of the initializing procedure.

The operator can also call the plant contact closure input subroutine 1150 through the auxiliary synchronizer program 1114, if desired, whereby a periodic scan of the entire computer CCI system is implemented for checking the state of any one or group of relays in the CCI system.

This call is contigent upon the entry of a non-zero value for the constant PERCCI from the DEH Operator's Panel keyboard.

4. AUXILIARY SYNCHRONIZER PROGRAM

Figure 16:
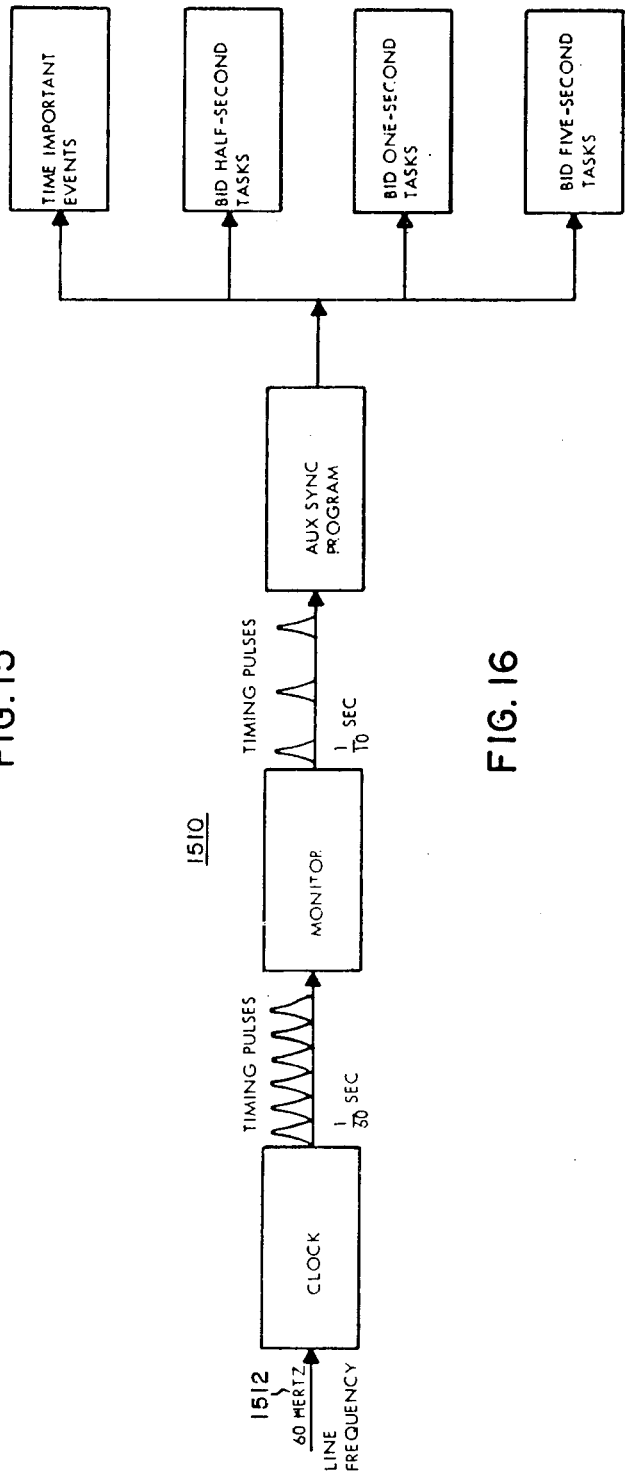
FIG. 16 shows a block diagram of an auxiliary synchronizer computer program which is operable in accordance with the principles of the invention.

With reference to FIG. 16, the block diagram shows an overall scheme which illustrates the operation of the auxiliary synchronizer program 1510. The auxiliary synchronizer program 1510 has two functions. It performs accurate counting to determine the time duration of important events to be described in more detail and it synchronizes the bidding for execution of all periodic programs in the digital electrohydraulic system 1100 on a predetermined schedule.

6. SEQUENCE OF EVENTS INTERRUPT

Figure 17:
FIG. 17 is a block diagram of a contact input scan program with a sequence of events interrupt program therein which is operable in accordance with the principles of the invention.
Figure 18:
FIG. 18 is a flow chart of the sequence of events interrupt program which is operable in accordance with the principles of the invention.

The sequence of events interrupt program 1124 is shown in block form in FIG. 17. Once the PLANTCCI subroutine identifies the plant condition that changed state and activated the sequence of events program 1124 the execution of an appropriate function program may be initiated in accordance with the task priorities. Contact inputs scanned by the CCI subroutine are set forth in the input/output signal list in Appendix 4.

7. BREAKER OPEN INTERRUPT PROGRAM

Referring now to FIG. 1, if the breaker 17 opens thereby removing electrical load 19 from the generator 16, the turbine system 10 will begin to accelerate. The acceleration will overspeed the turbine generator system 10 and damage the turbine generator system 10 if it is not checked. In order to restrict turbine overspeed when the breaker 17 opens, an independent hydraulic overspeed protection system shown in Ser. No. 189,322 by Fiegbein and Csanady also acts directly under predetermined conditions to close the governor valves GV1–GV8 and the throttle valves TV1–TV4 by dumping the hydraulic fluid in the valve actuators thereby giving additional protection to the turbine system 10. When the hydraulic overspeed protection system reacts to a breaker open operation (i.e. a full load rejection), the turbine steam valves are directly and immediately closed and the DEH system functions on a following basis to update its valve position outputs to call for valve closure. When a partial load rejection occurs, i.e. the breaker remains closed, a control strategy like that described in the aforementioned Bernbaum, Braytenbah and Richardson U.S. Pat. No. 3,552,872 is effected by the DEH system.

8. TASK ERROR PROGRAM

A task error program 1810 shown in FIG. 8 has supervisory control over all the other programs in the DEH system 1100. If any program is not functioning properly in correspondence to certain predefined error conditions, the task error program 1810 will switch the DEH system 1100 to manual control thereby preventing any accident, overload, underload, overspeed, or underspeed from happening.

An example of the usual operation of the P2000 Monitor in this particular case, i.e. in the DEH system. would be when a turbine operating program such as the panel task 1112 calls to use an input/output system such as the panel lamp program 1132. The panel task 1112 calls the monitor program 1122 with a set of arguments describing the function to be performed. The monitor program 1122 then carries out the request and returns to the panel task program 1112 at the completion of the function. However, if the monitor program 1122 finds erroneous information in the arguments or data passed along by the panel task 1112 then the input/output request for the panel lamp 1132 is ignored and the panel task 1112 is disabled. A monitor reference manual, TP043, of the Computer and Instrumentation Division of the Westinghouse Electric Corporation describes in detail all possible error conditions.

Figure 19:
FIG. 19 is a block diagram of error action with a task error program which is operable in accordance with the principles of the invention.

FIG. 19 shows a block diagram of the task error program 1810. High safety and high reliability of operation of the DEH system 1100 are assured by the linking of the task error program 1810 to other DEH programs.

9. TURBINE TRIP INTERRUPT PROGRAM

Figure 20:
FIG. 20 is a block diagram of a turbine trip interrupt program which is operable in accordance with the principles of the invention.

In FIG. 8, a turbine trip interrupt program 1850 is shown coupled to the plant wiring 1126 and to the throttle valves TV1–TV4 and the governor valves GV1–GV8 1021. If the turbine system 10 reaches a trip condition, a latch open contact 1852 changes state and indicates a trip to the turbine trip interrupt program 1850 by means of an interrupt signal. By closing all the valves in the turbine system 10, dangerous turbine overspeed and other conditions are avoided. A block diagram of the turbine trip interrupt system 1850 is shown in FIG. 20.

10. PANEL INTERRUPT PROGRAM

Figure 21:
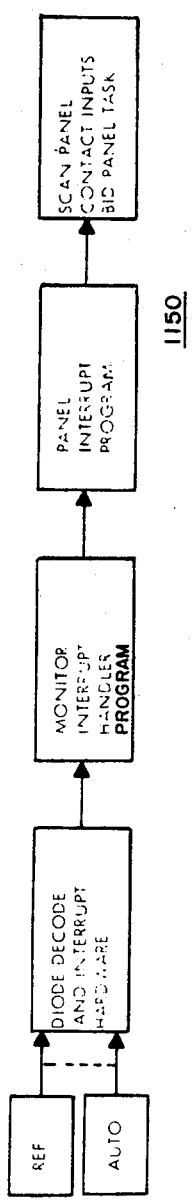
FIG. 21 is a block diagram of a panel interrupt program which is operable in accordance with the principles of the invention.
Figure 22:
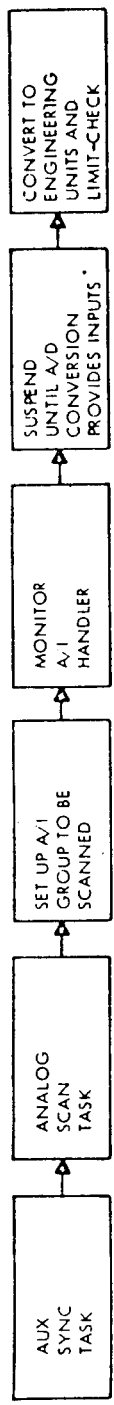
FIG. 22 is a block diagram of an analog scan system which is operable in accordance with the principles of the invention.
Figure 23:
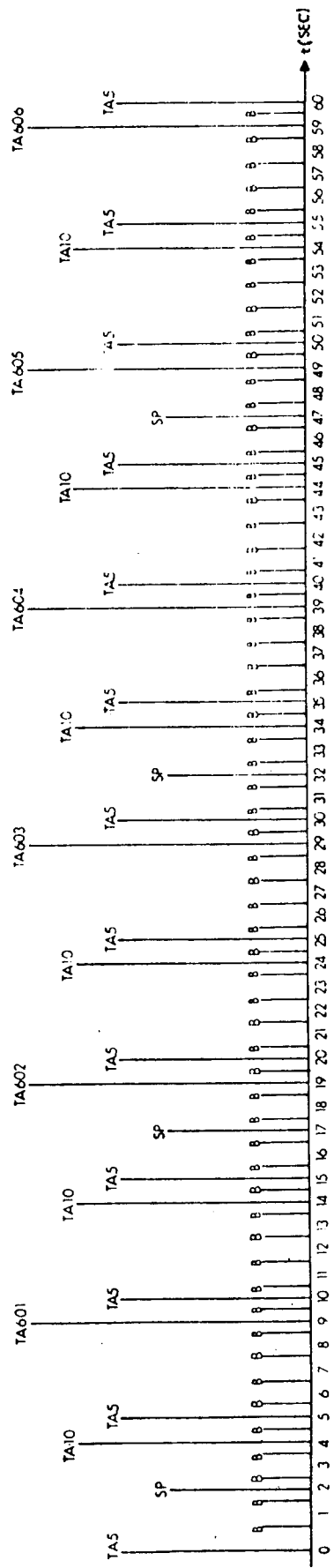
FIG. 23 is a timing chart of the various programs and functions within the Digital Electro Hydraulic System which is operable in accordance with the principles of the invention.

A block diagram of the panel interrupt program 1156 is shown in FIG. 21.

11. VALVE TEST, VALVE POSITION LIMIT

Certain valve testing and limiting functions have been a traditional turbine control feature over the years to provide assurance of the emergency performance of valves and to give the operator a final override on the control valve position. Thus, on line testing of throttle valves periodically will detect potential malfunctions of the throttle valve mechanism which could be dangerous if not corrected. In addition, valve position limiting of the governor valves during on line operation provides a manual means of limiting steam flow from the Operator's Panel.

In the DEH control system these two important functions are initiated by appropriate pushbuttons on the panel. As long as the operator presses one of these pushbuttons, the proper action is carried out by the CONTROL program. When the operator releases any of these pushbuttons, this generates a special interrupt to terminate the action which has been performed.

Referring again to FIG. 8, a valve test program 1810 and a valve position limit program 1812 are subroutines of the control task program 1020. The valve test program 1810 tests the operation of any predetermined valve or valves such as the throttle valves TV1 through TV4 by the operator pressing a valve test button on the operator's panel 1130. The valve position limit program 1812 of the control task 1020 operates when an operator presses either of the two buttons, valve position limit lower 1816 or valve position limit raise.

Upon the release of the valve test button the valve position limit lower button 1818 or the valve position limit raise button 1818 by an operator, the valve interrupt program 1158 shown in FIG. 8, is run by the monitor program 1122. The monitor program 1122 runs the valve interrupt program 1158 and thereby resets various flags and counters thus signaling to the control task 1020 that the action is to cease.

12. STOP/INITIALIZER PROGRAM

In FIG. 8, a stop/initializer program 1162 is shown ancillary to the clock program 1120. Should the DEH system 1100 have a power failure or be turned off, the stop/initializer program 1162, which has the highest priority (FIG. 9) of any program in the DEH system 1100, starts to run. Within the time that the voltages of the power supplies, not shown, decay to an unusable limit, the stop/initializer program 1162 sets the DEH system 1100 into a known state for the impending stop. Upon restarting, the stop/initializer program 1162 resets the system to the known state, i.e. it sets all contact and analog outputs to the throttle valves TV1 through TV4 and the governor valves GV1 through GV8 shown in box 1021 at reset position; all internal counters and logic states are reset; certain systems counters are set to starting values; a scan of all contact inputs from the plant wiring 1126 is carried out and the logic program 1110 is executed to align the DEH system 1100 to existing plant conditions. Finally, the controller reset lamp 1820 on the operator's panel 1130 is turned on and the DEH system 1100 is ready to restart.

13. VISUAL DISPLAY PROGRAM

The visual display program 1134 as shown in FIG. 8 is connected with the panel interrupt program 1156 and the auxiliary synchronizer program 1114. The visual display program 1134 controls the display windows 1138 with a reference window 1852 and a demand window 1854. By pressing an appropriate button a reference value will be displayed in the reference window 1852 and a demand value will be displayed in the demand window 1854. Similarly, for example, if a valve position limit display button is pressed a valve position limit valve will be displayed in the reference window 1852 and the corresponding valve variable being limited is displayed in the demand window 1854. Upon pressing the load rate button 1858 the load rate will be displayed in the reference window 1852. In addition, a keyboard 1860 has the capability through an appropriate program to select virtually any parameter or constant in the DEH system 1100 and display that parameter in the reference window 1852 and the demand window 1854.

14. ANALOG SCAN PROGRAM

The analog scan program 1116, shown in FIG. 8 periodically scans all analog inputs to the DEH system 1100 for control and monitoring purposes. The function of the analog scan program 1116 is performed in two parts. The first part of the analog scan program 1116 comprises the scanning of a first group of analog inputs. Values of scanned inputs are converted to engineering units and the values are checked against predetermined limits as required for computations in the DEH computer.

The second part of the function of the analog scan program 1116 comprises the scanning of the analog inputs required for the automatic turbine startup program as shown in FIG. 8. The automatic turbine startup program is shown in FIG. 8 as the ATS periodic program 1140, the ATS analog conversion routine 1142 and the ATS message writer program 1144.

15. LOGIC TASK

Figure 25:
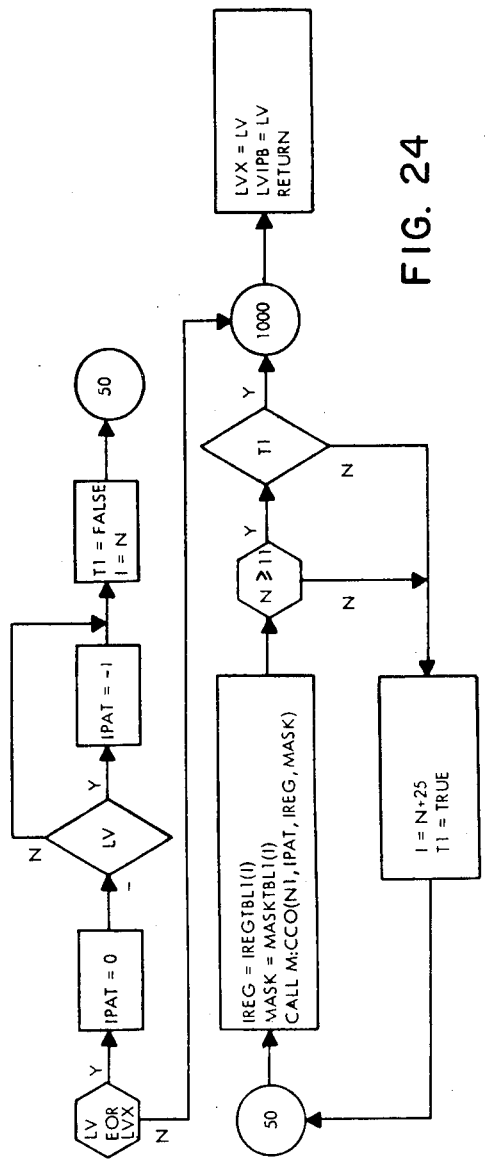
FIG. 25 is a block diagram of conditions which cause initiation of a logic program which is operable in accordance with the principles of the invention.
Figure 24:
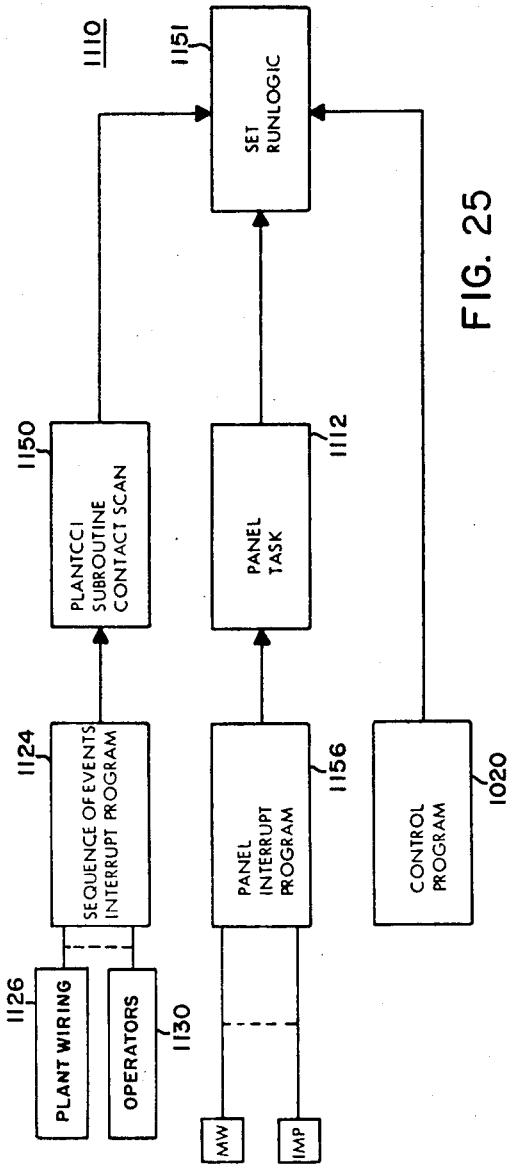
FIG. 24 is a flow chart of a logic contact closure output subroutine which is operable in accordance with the principles of the invention.
Figure 27:
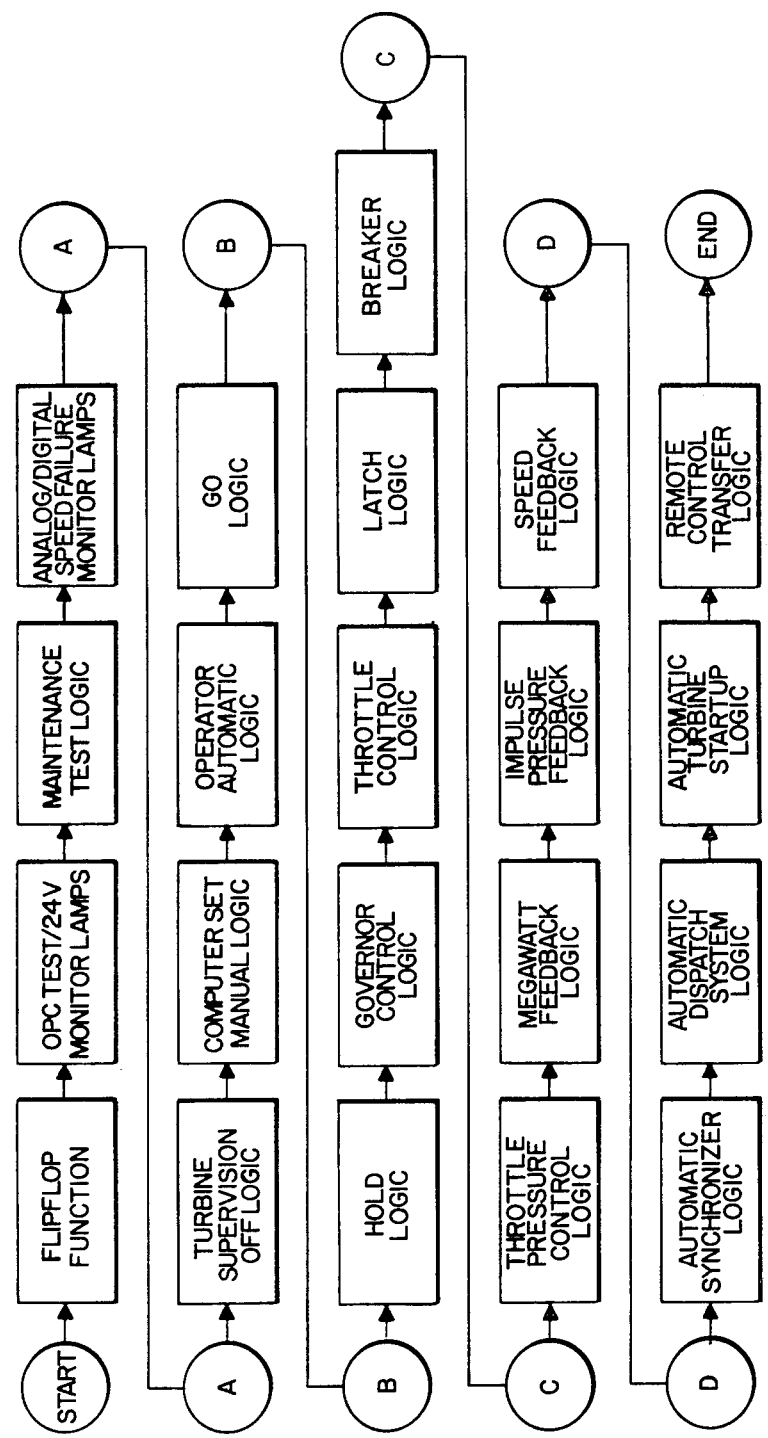
FIG. 27 is a block diagram of the logic program which is operable in accordance with the principles of the invention.

Referring now to FIGS. 24 and 25, a block diagram representing the operation of the logic task 1110 is shown. A contact input from the plant wiring 1126 triggers the sequence of events or interrupt program 1124 which calls upon the plant contact closure input subroutine 1150 which in turn requests that the logic program 1110 be executed by the setting of a flag called RUNLOGIC 1151 in the logic program 1110. The logic program 1110 is also run by the panel interrupt program 1156 which calls upon the panel task program 1112 to run the logic program 1110 in response to panel button operations. The control task program 1020 in performing its various computations and decisions will sometimes request the logic program 1110 to run in order to update conditions in the control system. In FIG. 26, the functioning of the logic program 1110 is shown. FIG. 27 shows a more explicit block diagram of the logic program 1110.

The logic program 1110 controls a series of tests which determine the readiness and operability of the DEH system 1100. One of these tests is that for the overspeed protection controller which is part of the analog backup portion of the hardwired system 1016 shown in FIG. 6. Generally, the logic program 1110 is structured from a plurality of subroutines which provide the varying logic functions for other programs in the DEH program system, and the various logic subroutines are all sequentially executed each time the logic program is run.

TURBINE SUPERVISION OFF LOGIC

The state of the main circuit breaker which connects the generator to the power system determines a primary control strategy of the DEH system. When the breaker is open, the DEH system is on speed control and thus positions the throttle and governor valves to maintain speed demand as requested by the operator, an automatic startup program, or an automatic synchronizer. When the breaker is closed, the DEH system is on load control and thus positions the governor valves to maintain load demand as requested by the operator or by an automatic dispatching system.

The function of the breaker logic program is to detect changes in the state of the main breaker and take the appropriate action. When the breaker opens, it is necessary to reset the breaker flip-flop to place the DEH control system on speed control; in addition, both the REFERENCE and DEMAND are set to synchronous speed, and the speed integral controller is reset to zero. The control system will then position the governor valves to maintain synchronous speed. When the breaker closes and the unit is synchronized to the line, the breaker logic program must set the breaker flip-flop to place the DEH system on load control; in addition both the REFERENCE and DEMAND are set to pick up an initial megawatt load so that the turbine does not tend to motor. The control system will then position the governor valves to maintain this initial load.

BREAKER LOGIC

Referring again to FIG. 1, upon synchronization of the turbine system 10 with a power grid, not shown, the governor valves GV1 through GV8 must allow sufficient steam to flow through the turbine system 10 to overcome turbine system losses. Otherwise, upon synchronization of the generator 16 with other generators in the power grid by closing the breakers 17, the turbine system 10 would as already indicated have a tendency to motor. The DEH control system 1100, in order to prevent motoring and subsequent damage to the low pressure turbine section 24, automatically opens the governor valves GV1 through GV8 such that a predetermined load is picked up by the generator 16 upon synchronization.

Figure 28:
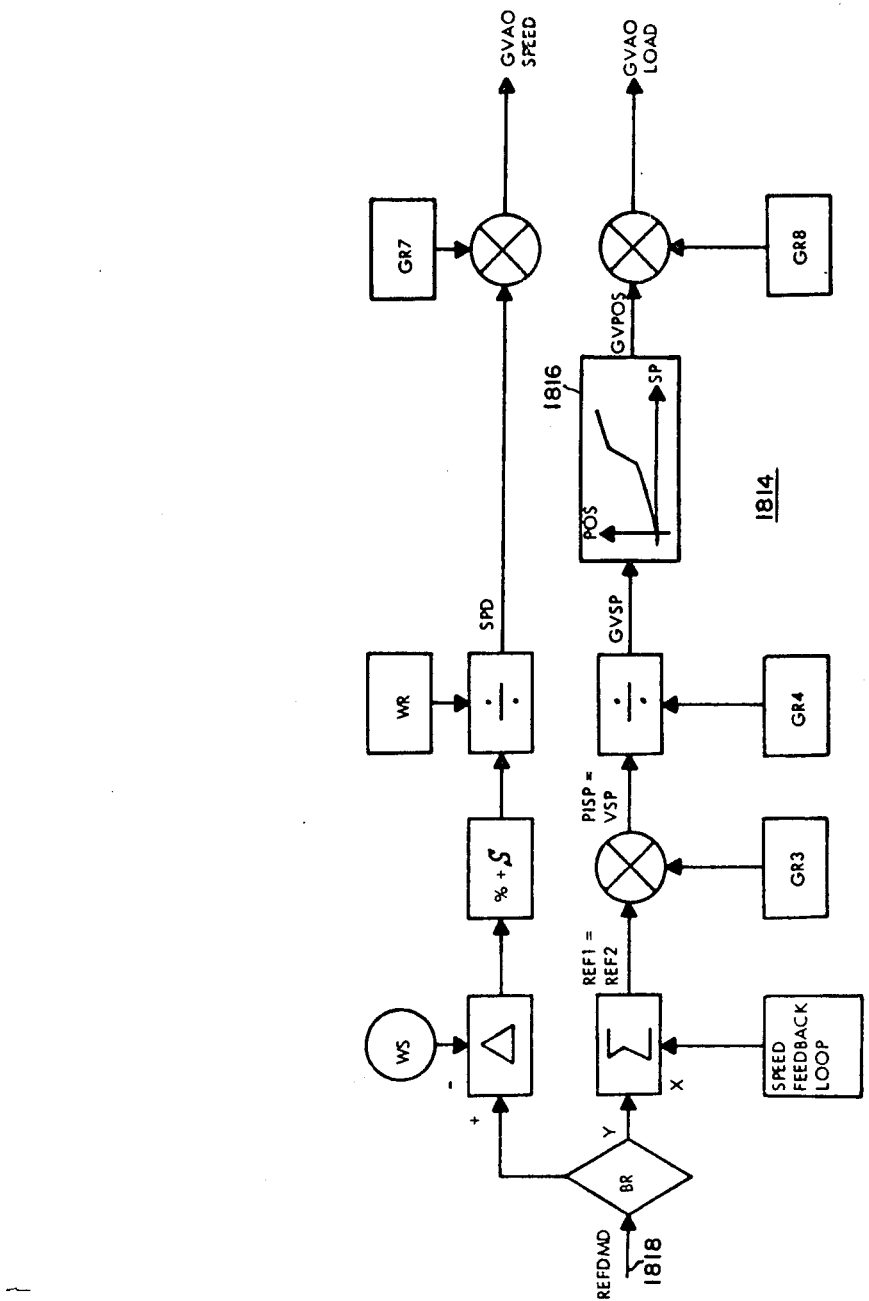
FIG. 28 is a block diagram of a load control system which is operable in accordance with the principles of the invention.
Figure 29:
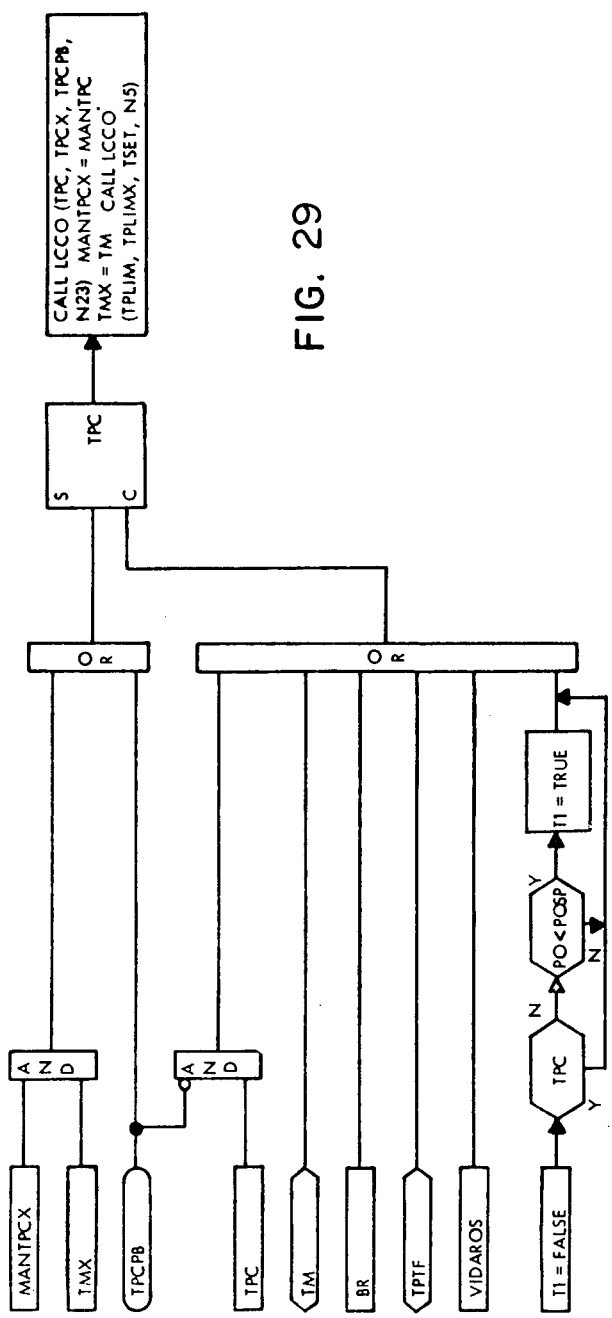
FIG. 29 is a flow chart of a logic pressure control logic subroutine which is operable in accordance with the principles of the invention.
Figure 32:
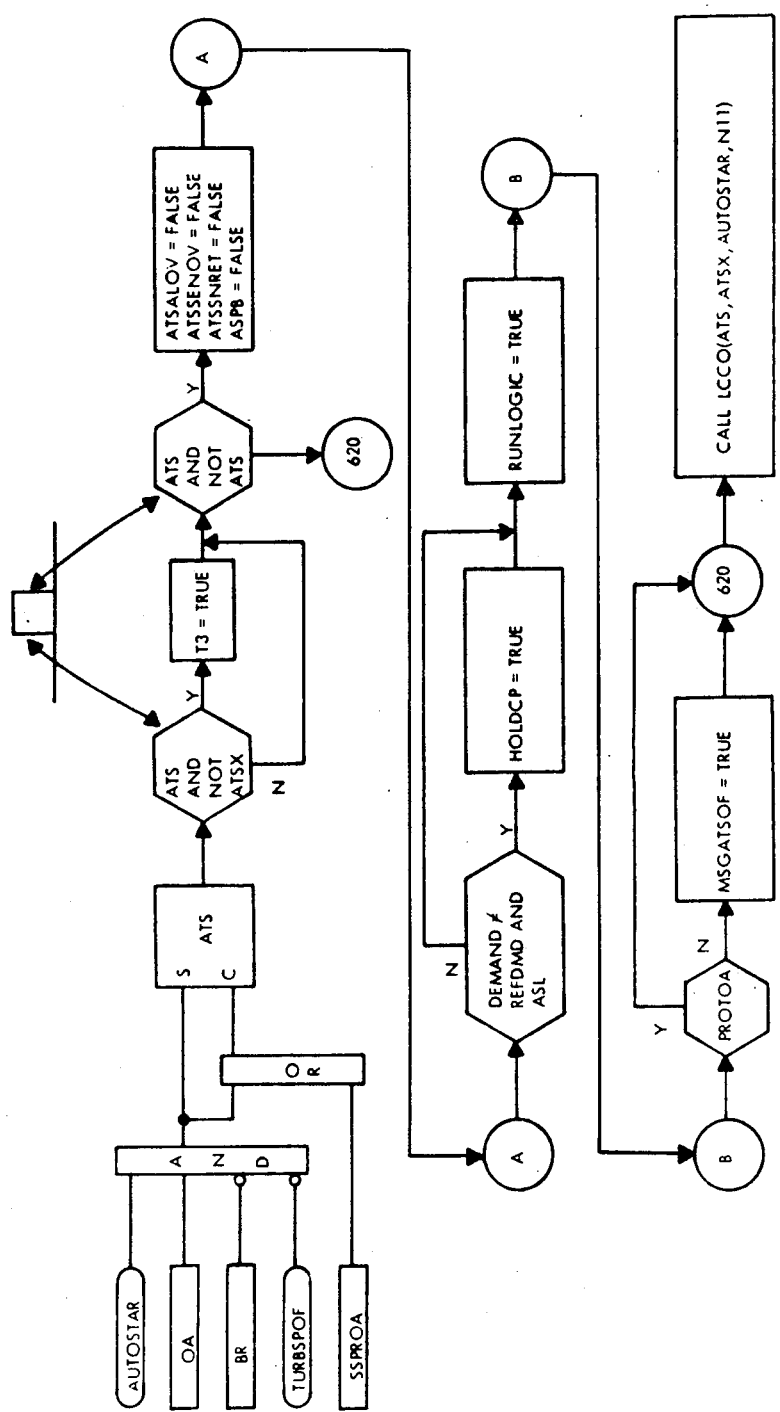
FIG. 32 is a flow chart of an automatic turbine startup program which is operable in accordance with the principles of the invention.

The value of the initial megawatt pickup is defined as MWINIT upon synchronization is entered from the keyboard and is typically set at about 5% of the rating of the turbine-generator 10. In the load control system 1814, as shown in FIG. 28, the actual megawatt pickup is modified by a factor which is the ratio of the rated throttle pressure to the existing throttle pressure at synchronization. This factor is utilized by the DEH system 1100 in maintaining approximately the same initial megawatt load pickup whether the turbine system 10 is synchronized at rated throttle pressure or at some lower or even higher throttle pressure.

MEGAWATT FEEDBACK LOGIC

Megawatt feedback is one of the two major loops used on turbine load control to maintain the governor valves at the correct position. The other feedback is impulse pressure; between these two loops it is possible to adapt the computer outputs to account for valve non-linearities and to assure that the megawatt setting in the reference window is actually being supplied by the turbine/generator.

The megawatt feedback logic places the megawatt loop in service on request from an operator's panel pushbutton, providing all permissive conditions are satisfied, and removes the loop from service from the operator's panel pushbutton or when any condition exists which requires removing the megawatt feedback. Placing the loop in service or removing it is done bumplessly, so that the governor valves remain at the same position. In addition, the REFERENCE and DEMAND values are automatically adjusted to agree with the new state of the DEH control system.

Referring to FIG. 30, a block diagram of the megawatt feedback loop is shown in greater detail than in FIG. 7. It should be noted that the speed compensated reference 1087, at the input of multiplication function 1086, is multiplied by the megawatt compensation 1089. The multiplication of the signals instead of a differencing provides an additional safety feature since the loss of either of the signals 1087 or 1089 will produce a zero output rather than a runaway condition.

IMPULSE PRESSURE FEEDBACK LOGIC

Impulse pressure feedback is the other of the two major loops used in the turbine load control to maintain the governor valves at the correct position. The impulse pressure feedback logic places the impulse pressure feedback loop in service on request from an operator's panel pushbutton, providing all permissive conditions are satisfied, and removes the loop from service on request from the operator or when any condition exists which requires removing impulse pressure feedback. Placing the loop in service or removing it is done automatically and bumplessly, so that the governor valves remain at the same position.

The impulse pressure feedback logic is shown in greater detail in FIG. 31. With a digital computer, bumpless transfer is achieved without the use of elaborate external circuitry because of the digital computational nature of the machine. A value can be computed instantaneously and inserted in the integrator 1218 of the proportional plus reset controller subroutine 1068 as shown in FIG. 11. In the preferred embodiment of the Digital Electro-Hydraulic control system 1100, the proportional plus reset controller 1168 is utilized by the following functions: the megawatt feedback loop 1091, the impulse pressure feedback loop 1816 and the speed feedback loop made up of the rated speed reference 1074, the compare function 1076 and the actual turbine speed function 1076.

17. CONTROL PROGRAM

Figure 33:
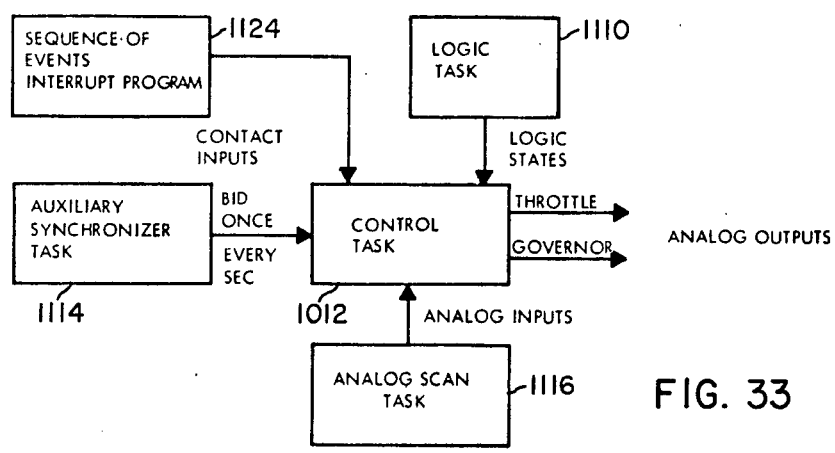
FIG. 33 is a block diagram showing a control task interface which is operable in accordance with the principles of the invention.
Figure 34:
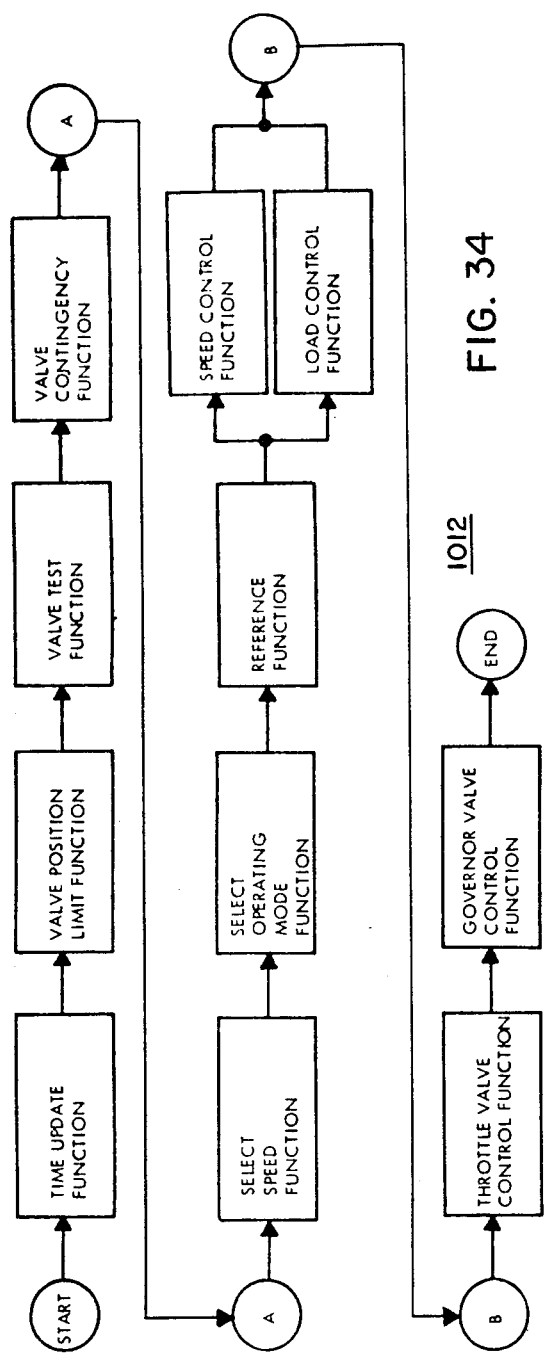
FIG. 34 is a block diagram showing a control program which is operable in accordance with the principles of the invention.
Figure 37:
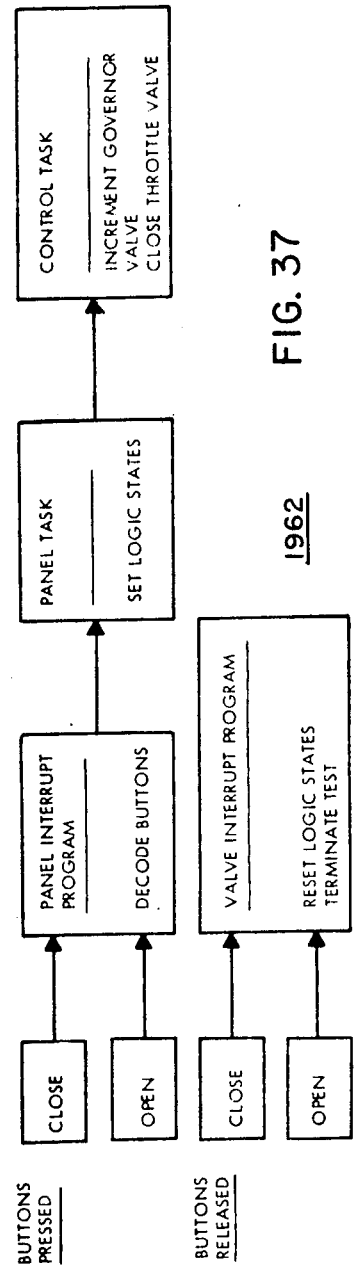
FIG. 37 shows an interaction between the DEH program and a valve test function which is operable in accordance with the principles of the invention.

The control program 1012 and related programs are shown in greater detail in FIG. 33. In the computer program system, the control program 1012 is interconnected with the analog scan program 1116, the auxiliary sync program 1114, the sequence of events interrupt program 1124 and the logic task 1110. FIG. 34 whows a block diagram of the control program 1012. The control program 1012 accepts data from the analog scan program 1116, the sequence of events interrupt program 1124 and is controlled in certain respects by the logic program 1110 and the auxiliary synchronizing program 1114. The control program 1012, upon receiving appropriate inputs, computes the throttle valve TV1 TV4 and the governor valve GV1–GV8 outputs needed to satisfy speed or load demand.

The control program 1012 of the DEH control system 1100 functions, in the preferred embodiment, under three modes of DEH system control. The modes are manual, where the valves GV1-GV8 and TV1-TV4 are positioned manually through the hardwired control system and the DEH control computer tracks in preparation for an automatic mode of control. The second mode of control is the operator automatic mode, where the valves GV1-GV8 and TV1-TV4 are positioned automatically by the DEH computer in response to a demand signal entered from the keyboard 1130. The third mode of control is remote automatic mode, where the valves GV1-GV8 and TV1-TV4 are positioned automatically as in the operator automatic mode but use the automatic turbine startup program 1141 or an automatic synchronizer or an automatic dispatch system for setting the demand value.

VALVE POSITION LIMIT FUNCTION SUBROUTINE

Figure 35:
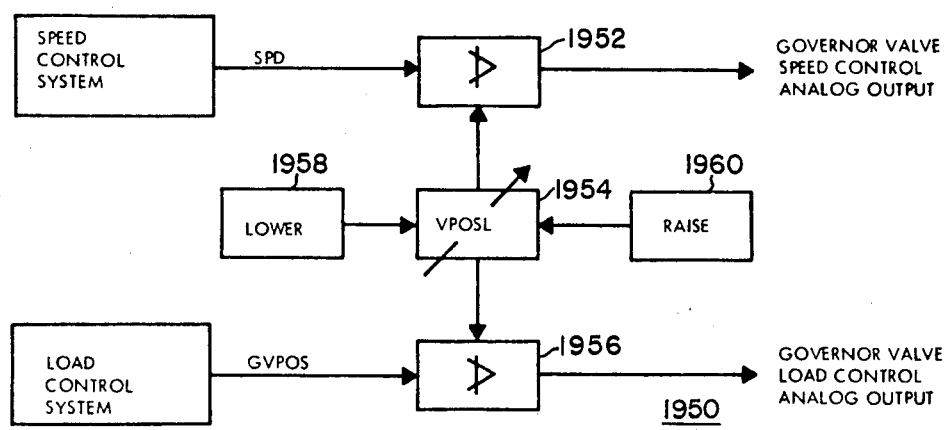
FIG. 35 is a block diagram showing a valve position limit function which is operable in accordance with the principles of the invention.
Figure 36:
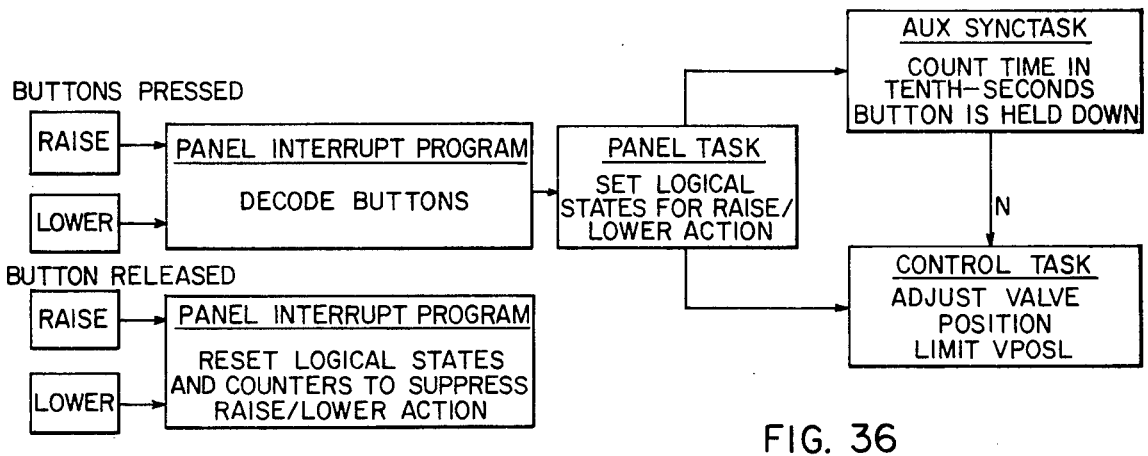
FIG. 36 is a block diagram showing a valve position limit adjustment function which is operable in accordance with the principles of the invention.

Referring now to FIGS. 35 and 36, a block diagram of the valve position limit function subroutine 1950 is shown in detail. A speed control signal is limited by limit function 1952 which is controlled by the valve position limit function 1954 (VPOSL); similary the governor valve speed signal (GVPOS) signal is limited by limiting function 1956. The valve position limit function 1954 may be raised by a raise function 1960 and lowered by a lower function 1958.

SPEED SELECTOR FUNCTION

Referring now to FIG. 38, a block diagram of the DEH speed instrumentation and computation interface is shown. A digital counting and shaping circuit 2010 described in the copending Ruether application Serial No. 412,513, referred to supra, generates the highly accurate digital signal. The digital shaping and counting circuitry 2010 includes a magnetic pickup, a shaping and counting circuit which passes the data to the DEH computer in the form of a digital numerical value. The second or analog speed signal is generated by high accuracy analog processing circuitry 2012. The third or supervisory signal is generated by analog supervisory instrumentation processing circuitry 2014 and transmitted to an analog to digital converter 2016 with the signal from the high grade analog processing circuitry 2012.

The digital signal from the digital shaping and counting circuitry 2010 passes through a speed channel interrupt 2018 to a speed channel decoding program 2020 as shown in FIG. 38. In this speed counting program 2020 an output quantity designated ICOURSE is the low range course value used from about 0 to 1600 rpm, while the IFINE quantity is the high range fine value used between about 1600 to 4500 rpm.

An analog to digital converter 2016 makes both the high precision analog signals from the analog processing circuitry 2012 and the supervisory circuitry 2014 available to the analog scan program 1116 which in turn provides the represented speed values available to the speed selection program 2022. The speed selection program 2022 compares the digital speed value and the high grade analog speed value with the supervisory analog speed value in order to determine whether both the digital value and the high grade analog value are accurate or whether there is any discrepancy between the two. The supervisory speed value is generally not accurate enough for speed control. Therefore, the speed selection program 2022 makes use of the supervisory speed value to determine which of the high grade speed values is accurate if they are not equal.

The digital speed value from the digital shaping and counting circuitry 2010 is used as the reference WS at 1076 if it is found to be accurate enough for control purposes. The high grade analog speed value from the analog processing circuitry 2012 is utilized if the digital speed value is not accurate enough for control purposes. If either of the high grade signals becomes unreliable, appropriate monitor lamps on the control panel 1130 alert an operator to this fact.

If both the high grade analog and the high grade digital speed values become unreliable and if the DEH system 1100 is on wide range speed control then a transfer takes place to the manual mode of control. However, if the turbine system 10 is on load control, the DEH system 1100 opens the speed feedback loop bumplessly and continues on automatic control with the remaining feedback loops intact.

SELECT OPERATING MODE FUNCTION

Input demand values of speed, load, rate of change of speed, and rate of change of load are fed to the DEH control system 1100 from various sources and transferred bumplessly from one source to another. Each of these sources has its own independent mode of operation and provides a demand or rate signal to the control program 1020. The control task 1020 responds to the input demand signals and generates outputs which ultimately move the throttle valves TV1 through TV4 and/or the governor valves GV1 through GV8.

With the breaker 17 open and the turbine 10 in speed control, the following modes of operation may be selected:

1. Automatic synchronizer mode — pulse type contact input for adjusting the turbine speed reference and speed demand and moving the turbine 10 to synchronizing speed and phase.

2. Automatic turbine startup program mode — provides turbine speed demand and rate.

3. Operator automatic mode — speed, demand and rate of change of speed entered from the keyboard 1860 on the operator's panel 1130.

4. Maintenance test mode — speed demand and rate of change of speed are entered by an operator from the keyboard on the operator's control panel 1130 while the DEH system 1100 is being used as a simulator or trainer.

5. Manual tracking mode — the speed demand and rate of change of speed are internally computed by the DEH system 1100 and set to track the manual analog back-up system 1016 as shown in FIG. 6 in preparation for a bumpless transfer to the operator automatic mode of control.

With the breaker 17 closed and the turbine 10 in the level mode control, the following modes of operation may be selected:

1. Throttle pressure limiting mode a contingent mode in which the turbine load reference is run back or decreased at a predetermined rate to a predetermined minimum value as long as a predetermined condition exists.

2. Run-back mode — a contingency mode in which the load reference is run back or decreased at a predetermined rate as long as a predetermined condition exists.

3. Automatic dispatch system mode — pulse type contact inputs are supplied from an automatic dispatch system to adjust turbine load reference and demand when the automatic dispatch system button on the operator's panel 1130 is depressed.

4. Operator automatic mode — the load demand and the load rate are entered from the keyboard 1830 on the control panel 1130.

5. Maintenance test mode — load demand and load rate are entered from the keyboard of the control panel 1130 while the DEH system 1100 is being used as a simulator or trainer.

6. Manual tracking mode — the load demand and rate are internally computed by the DEH system 1100 and set to track the manual analog back-up system 1016 preparatory to a bumpless transfer to the operator automatic mode of control.

Figure 40:
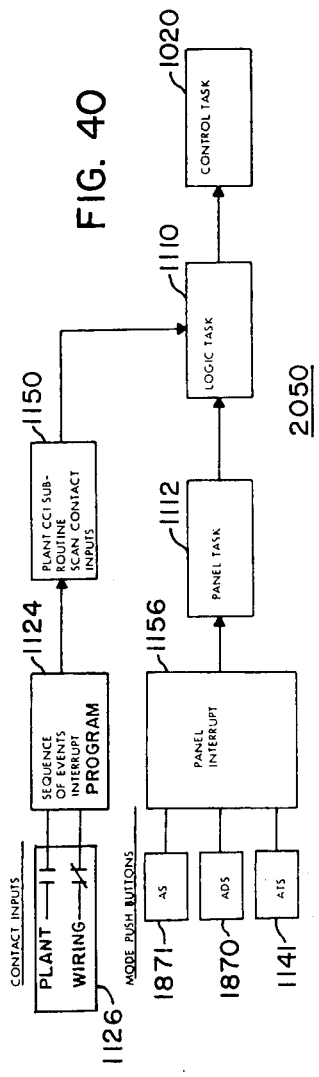
FIG. 40 shows a block diagram of an operating mode selection function which is operable in accordance with the principles of the invention.

Referring now to FIG. 40, a block diagram is shown illustrating the select operating mode function 2050. Contact inputs from plant wiring 1126 activate the sequence of events interrupt program 1124 which calls the plant input subroutine 1150, to scan the plant wiring 1126 for contact inputs. Mode pushbuttons such as automatic turbine startup 1141, automatic dispatch system 1170 and automatic synchronizer 1871 activate the panel interrupt program 1156 which calls the panel program 1112 for classification and which in turn calls upon the logic program 1110 to compute the logic states involved. The logic program 1110 calls the control program 1020 to select the operating mode in that program.

Figure 41:
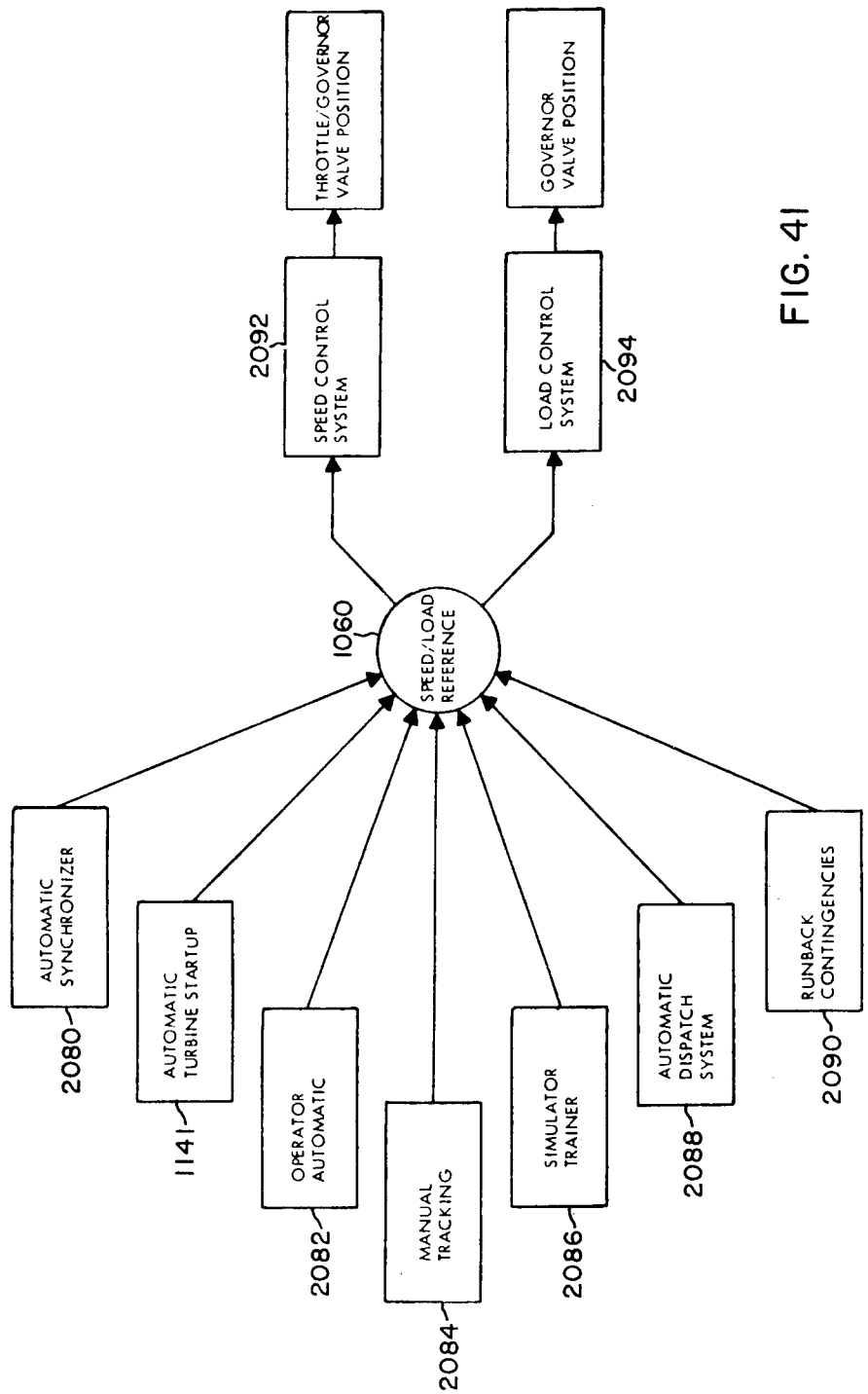
FIG. 41 shows a symbolic diagram of the use of a speed/load reference function which is operable in accordance with the principles of the invention.
Figure 42:
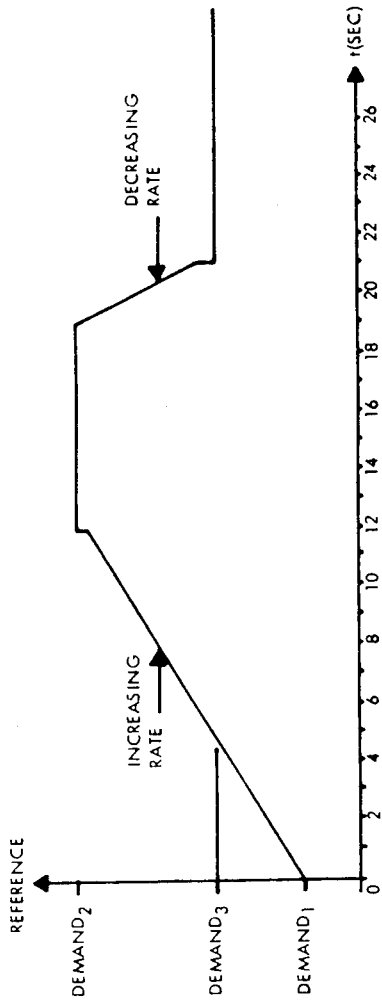
FIG. 42 shows a speed/load reference graph which is operable in accordance with the principles of the invention.

The decision breaker function 1060, of FIG. 7, is identical to the speed/load reference function 1060, of FIG. 41. A software speed control subsystem 2092 of FIG. 41, corresponds to the compare function 1062, the speed reference 1066 and the proportional plus reset controller function 1068, of FIG. 7. The software load control subsystem 1094, of FIG. 41, corresponds to the rated speed reference 1074, the turbine speed 1076, the compare function 1078, the proportional controller 1080, the summing function 1972, the compare function 1082, the proportional plus reset controller function 1084, the multiplication function 1086, the compare function 1090, the impulse pressure transducer 1088 and the proportional plus reset controller 1092, of FIG. 7. The speed/load reference 1060 is controlled by, depending upon the mode, and automatic synchronizer 1080, the automatic turbine starter program 1141, and operator automatic mode 1082, a manual tracking mode 2084, a simulator/trainer 2086, an automatic dispatch system 2088, or a run-back contingency load 2090. Each of these modes increments the speed/load reference function 1060 at a selected rate to meet a selected demand. A typical demand/reference rate is shown in FIG. 42 drawn as a function of time.

SPEED CONTROL FUNCTION

Figure 43:
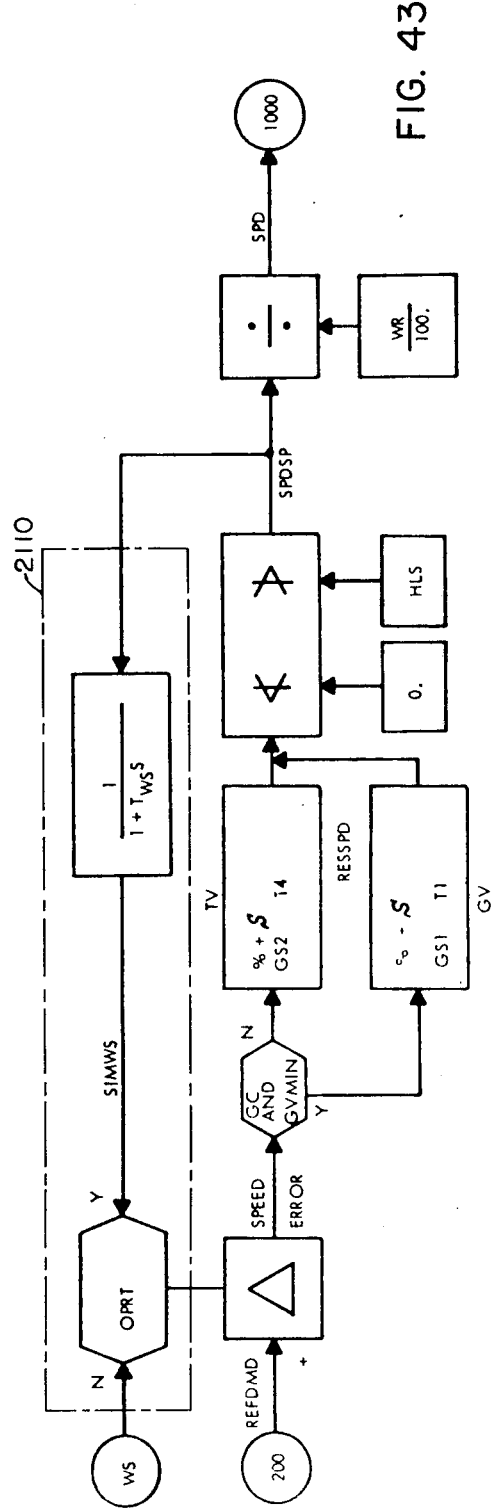
FIG. 43 is a block diagram showing a speed control function which is operable in accordance with the principles of the invention.

The speed control function positions the throttle and governor valves to achieve the existing speed reference with optimum dynamic and steady state response. This is accomplished by using individual proportional-plus-reset controllers for throttle and governor valve speed control, as shown in FIG. 43. The speed error between the turbine speed reference and actual speed drives the appropriate controller, which then reacts by positioning the proper valves to reduce the speed error to zero. The speed controller outputs are low-limit checked against zero and high-limit checked against the quantity HLS, which is a keyboard-entered constant set at 4200 rpm. This prevents the controllers from reaching a reset-windup condition which may inadvertently occur in odd circumstances. The speed controller output is then suitably ranged from 0 to 100 percent and sent downstream as the quantity SPD in the CONTROL task to the THROTTLE and GOVERNOR VALVE programs.

LOAD CONTROL FUNCTION

Figure 45:
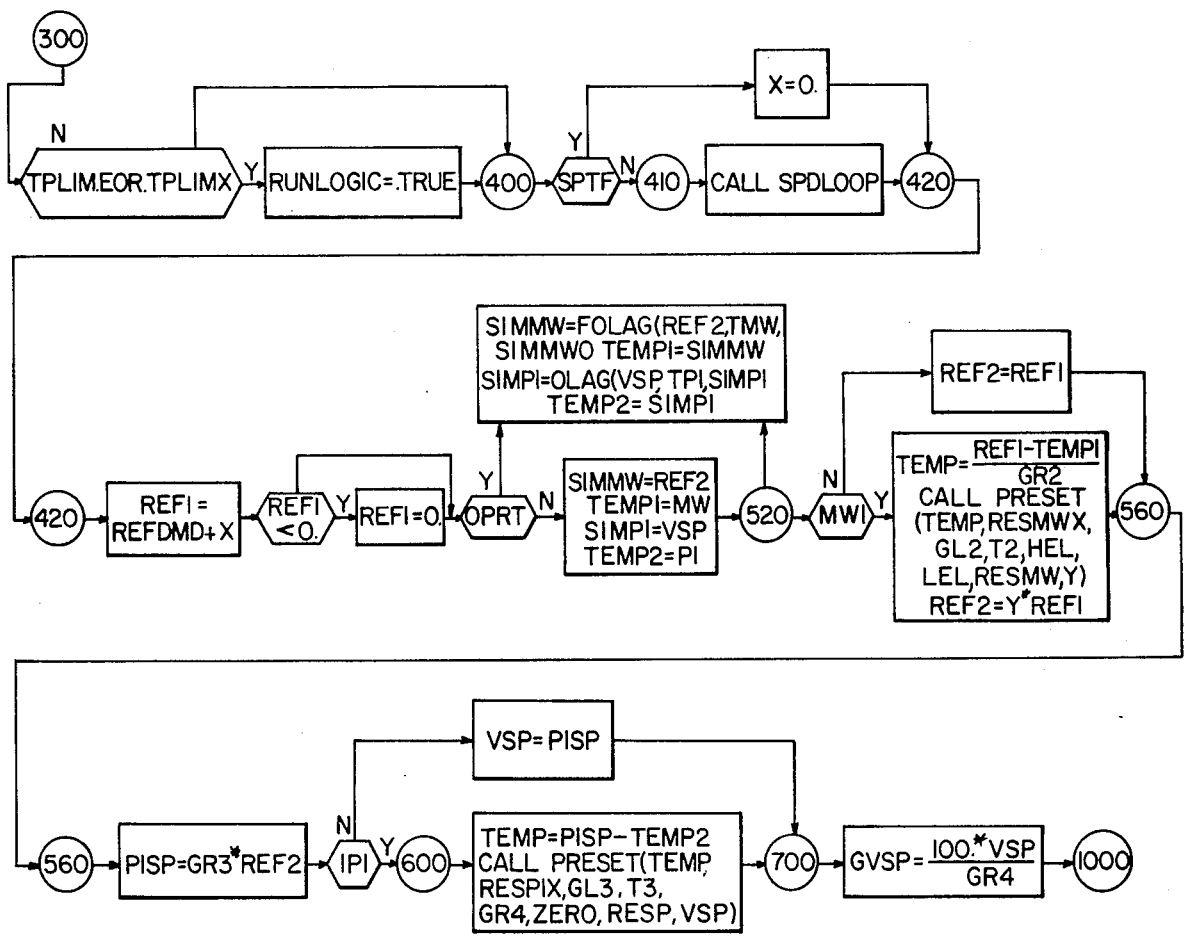
FIG. 45 includes a flow chart of the load control system which is operable in accordance with the principles of the invention.
Figure 39A:
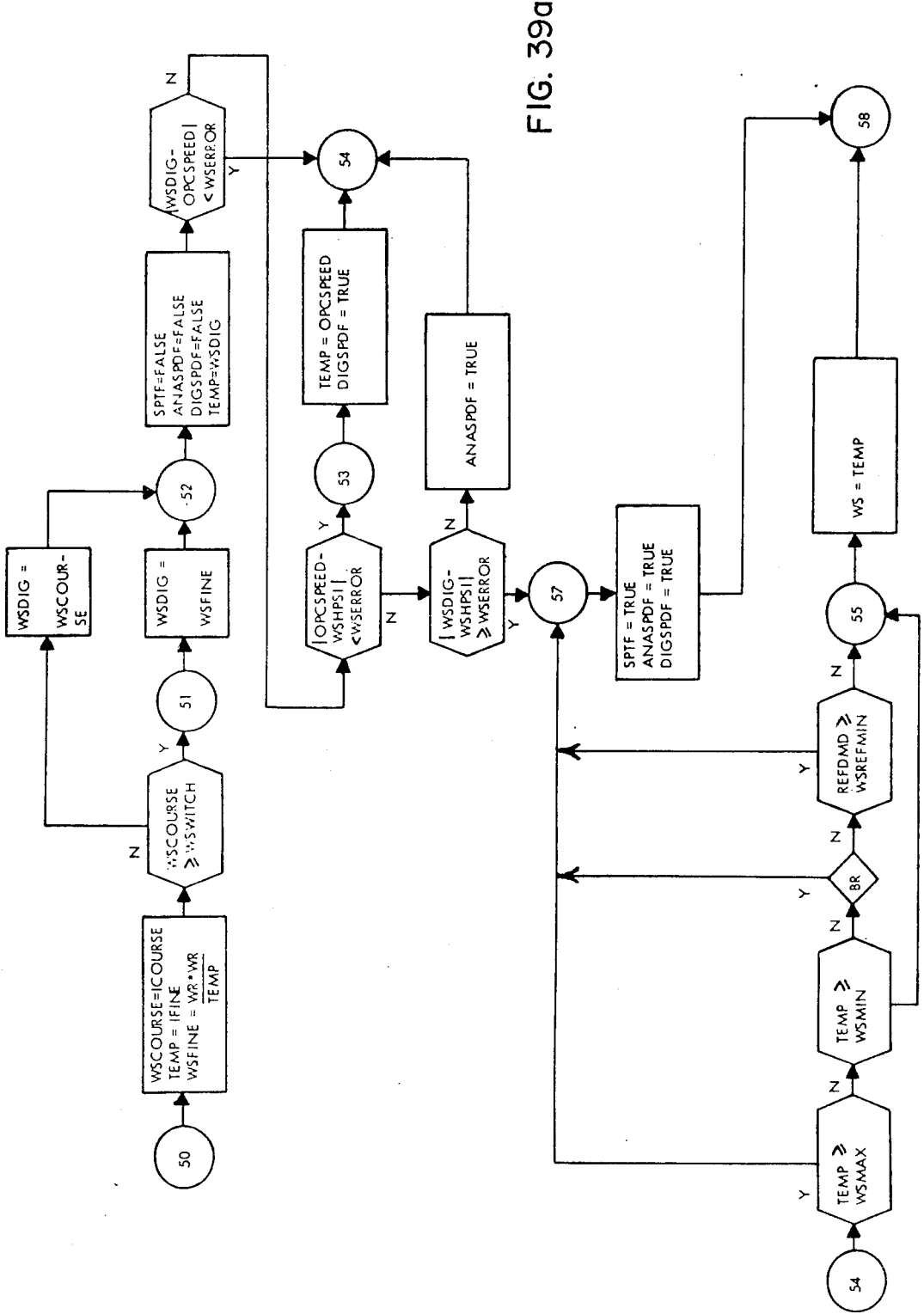
FIGS. 39a and 39b show flow charts of a speed selection function which is operable in accordance with the principles of the invention.
Figure 39B:
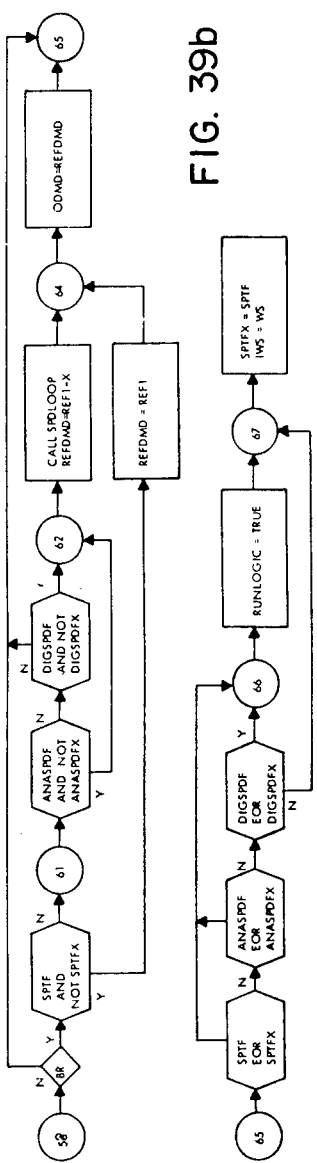
Figure 44:
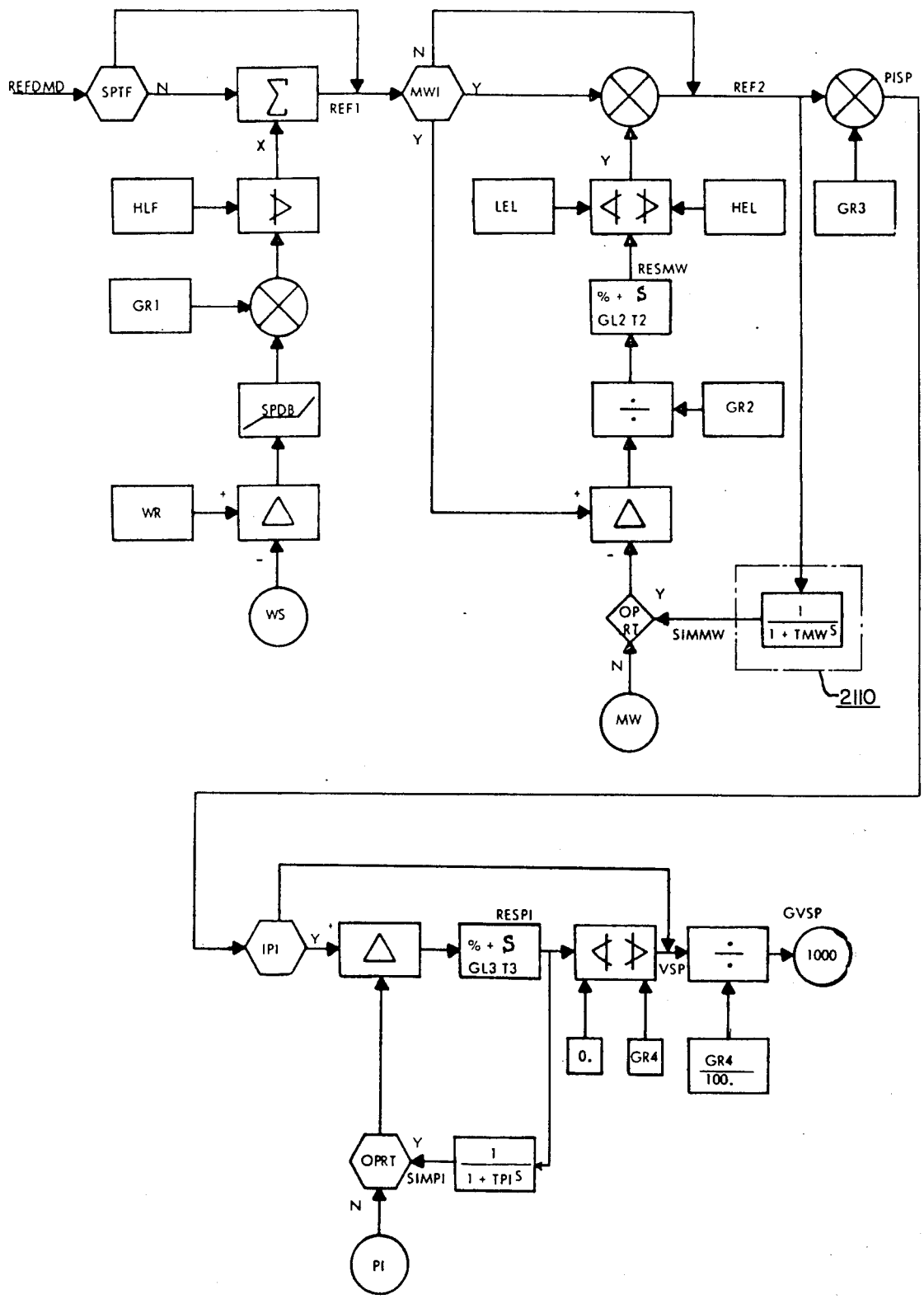
FIG. 44 shows a block diagram of the load control system which is operable in accordance with the principles of the invention.

The load control function positions the governor valves to achieve the existing load reference with optimum dynamic and steady state response. This is accomplished with a feedforward-feedback control system strategy designed to stabilize interactions between the major turbine-generator variables: impulse chamber pressure, megawatts, shaft speed and valve position. FIGS. 44 and 45 show the control system which satisfies these objectives.

The main feedforward path is represented by the turbine load reference value (REFDMD), which is computed by the operating mode selection function described earlier. The feedforward variable (REFDMD) is compensated with two feedback trim factors to account for frequency (speed) participation and megawatt mismatch. The speed compensation is provided by a proportional feedback loop in which the droop regulation gain (GR1) is adjusted to yield rated megawatts correction for a 180 rpm speed error. This speed feedback factor (X) is then summed with the turbine load reference (REFDMD) to produce the speed-corrected load reference (REF1).

A special feature which has been incorporated in the speed feedback loop is a software speed-deadband; this non-linear function filters out high-frequency low-amplitude noise on the speed input signal, thus keeping the load control system from responding to such meaningless information. The width of the speed deadband may be adjusted from the keyboard by setting the appropriate value into the constant SPDB. Another special feature of the speed deadband is the method of implementing this function is comparison with most standard control systems. The common way to incorporate the speed deadband in previous systems is to allow speed errors greater than the width of the deadband to enter the control system completely. This has been found to shock many systems into oscillatory conditions which may have undesirable effects. In the DEH Control System the speed error, when it is larger than the deadband, is smoothly entered into the speed compensation factor by a linear relationship. Thus, the shock effect of a sudden speed error is removed completely.

The megawatt feedback loop provides a trim correction signal which is applied to the speed-compensated load reference (REF1) in a product form to yield the speed-and-megawatt corrected load reference (REF2). An additional highly desirable feature of megawatt feedback in the DEH system is that with it the reference and demand display windows on the Operator's Panel are calibrated in actual megawatts when the loop is in service. A proportional-plus-reset controller is used to reduce megawatt error to zero, with the loop providing a feedback factor (Y) which floats around unity (1.0) in performing its corrective action. As usual, high and low limits are provided to prevent reset windup and to bound the range of megawatt compensation.

The load reference (REF2), now corrected for speed and megawatt errors, becomes the set point for the impulse pressure cascade feedback loop or the direct demand for valve position, depending on whether the impulse pressure loop is in or out of service. REF2 is multiplied by a ranging gain (GR3) to convert to impulse pressure set point (PISP) in psi. If the loop is in service, then a proportional-plus-reset controller is implemented to drive the impulse pressure error to zero; as always, high and low limits restrict the range of variation of the controller to eliminate the possibility of reset windup. The final governor valve set point (VSP), whether it is generated by the feedback loop or directly from the load reference (REF2), is then converted into a percent valve demand (GVSP) by suitable ranging and is sent downstream in the control task to the THROTTLE and GOVERNOR VALVE programs.

The load control function block diagram shown in FIGS. 44 and 45 is an expansion of the load control, shown in FIG. 7, incorporating the speed loop subroutine and proportional control.

THROTTLE VALVE CONTROL FUNCTION

Figure 46:
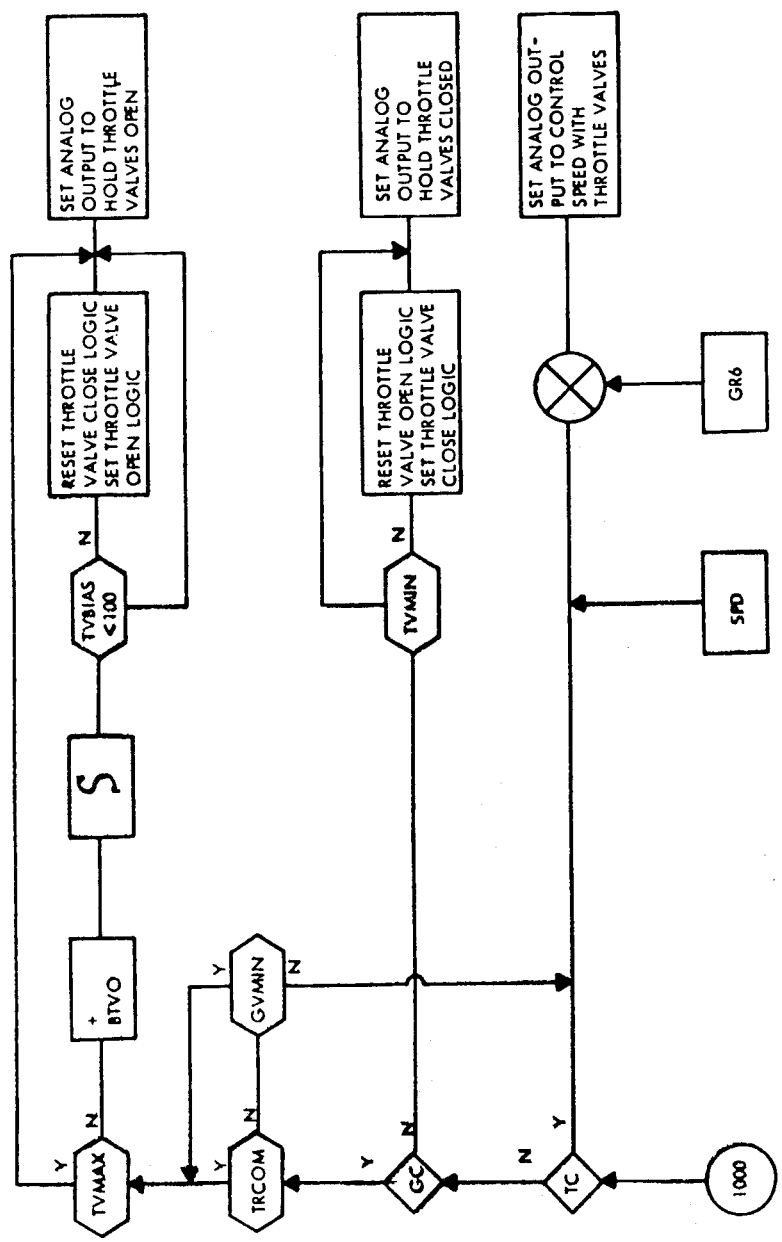
FIG. 46 shows a block diagram of the throttle valve control function which is operable in accordance with the principles of the invention.

The throttle valve control function (FIG. 46) computes the correct value of the throttle valve analog output at all times. When the DEH system is an automatic control, this analog output actually positions the throttle valves; when the DEH system is on manual control, this analog output tracks the backup system preparatory to transfer to automatic control.

To accomplish its objective, the throttle valve control function must interrogate various turbine logical and numerical states, and proceed to act on the outcome of these decisions. There are five distinct situations which must be detected by these logical and numerical interrogations. A brief description of these follow; refer to Figure for the method of performing these tests and the major actions taken.
  1. The turbine is unlatched and in neither throttle nor governor valve control. During this time the throttle valves are held closed by the throttle valve control function.
  2. The turbine is latched and in positive throttle valve control while the DEH system is in wide-range speed control. During this time the throttle valve control function accepts the output of the speed controller (SPD) and positions the throttle valves accordingly.
  3. The DEH system is in a transition period, transferring from throttle to governor valves during wide-range speed control. For this interval of time, the throttle valves are still in positive control and the throttle valve control function continues to accept the speed controller output (SPD) and positions the throttle valves accordingly.
  4. The DEH system remains in the transition period of transferring from throttle to governor valve control, but now the governor valves are in positive control. During this time the throttle valve control function drives the throttle valves to the wide-open position with a throttle valve bias integrator (TVBIAS), which as a constant input (BTVO) incrementing the integrator.
  5. The transistion period is over and the transfer from throttle to governor valve control is complete; the turbine is now on either wide-range speed control or on load control after having been synchronized with the power system. During this time the throttle valve control function keeps the throttle valves wide open.

GOVERNOR VALVE CONTROL FUNCTION

Figure 47:
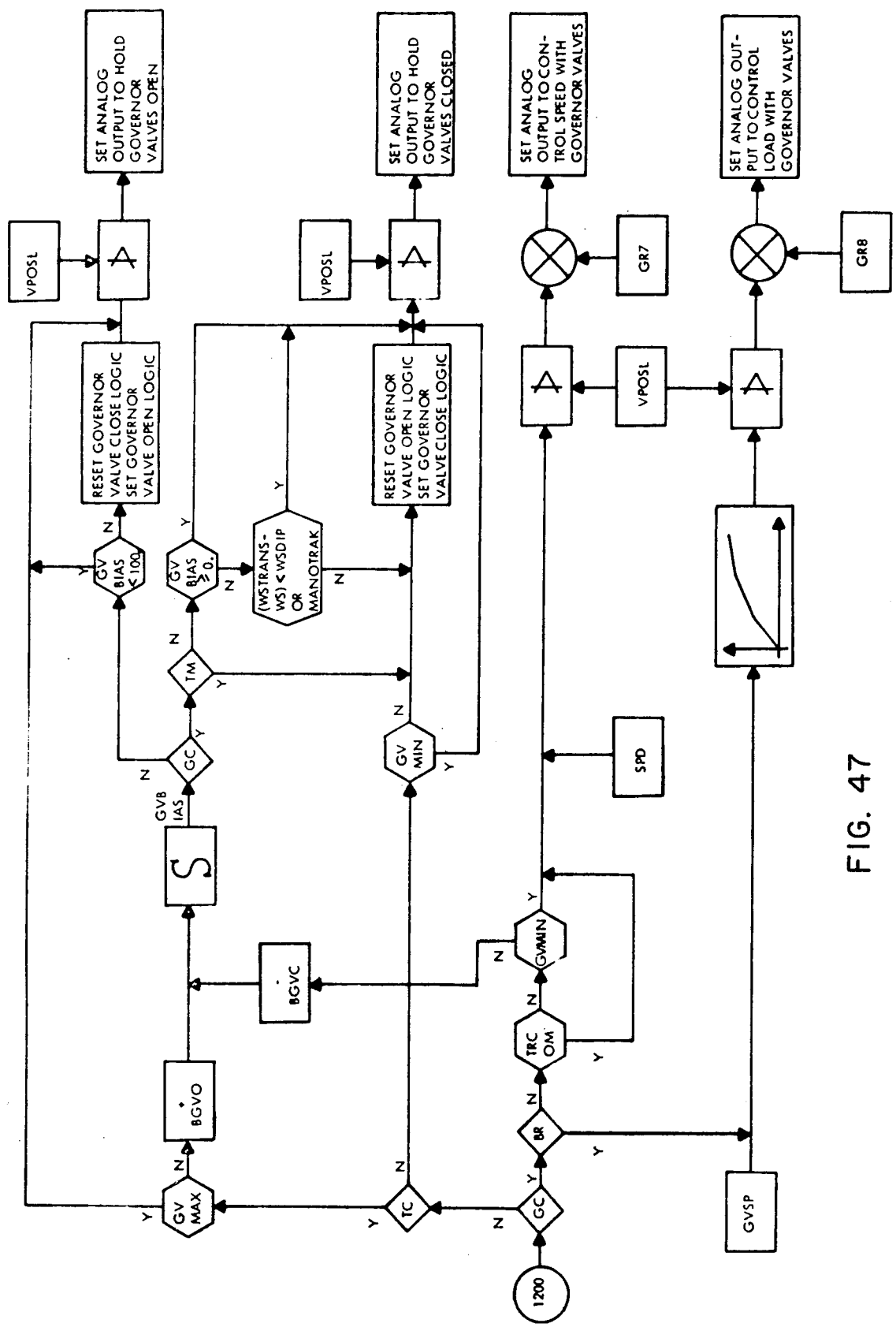
FIG. 47 shows a mixed block diagram of a governor control function program which is operable in accordance with the principles of the invention.

The governor valve control function (FIG. 47) computes the correct value for the governor valve analog output at all times. When the DEH system is on automatic control, this analog output actually positions the governor valves; when the DEH system is on manual control, this analog output tracks the backup system preparatory to transfer to automatic control.

To accomplish its objective, the governor valve control function must interrogate various turbine logical states and proceed to act on the outcome of these decisions. There are five distinct situations which must be detected by these logical interrogations. A brief description of these follows; refer to Figure for the method of performing these tests and the major action taken.
  1. The turbine is unlatched and in neither throttle nor governor control. During this time the governor valves are held closed by the governor valve control function.
  2. The turbine is latched and in positive throttle valve control while the DEH system is in wide-range speed control. During this time the governor valve control function drives the governor valves wide open with a governor valve bias integrator (GVBIAS).
  3. The DEH system is in a transition period, transferring from throttle valve to governor valve control during wide-range speed operation. For this interval of time, the governor valve control function drives the governor valves to the closed position with the governor valves to the closed position with the governor valve bias integrator (GVBIAS). The governor valve control function then waits for a decrease in turbine speed and for the Analog Backup System to track the computer outputs.
  4. The DEH system remains in the transition period but now the governor valves are in positive control during wide-range speed operation. During this time the governor valve control function accepts the outputs of the speed controller (SPD) and positions the governor valves accordingly.
  5. The main generator circuit breaker is closed and the DEH system is in load control. During this time the governor valve control function accepts the output of the load control system (GVSP) and positions the governor valves accordingly.

TURBINE OPERATION SIMULATION

In order to allow operators to become proficient in the operation of the DEH system 1100 without risking damage to a multimillion dollar turbine-generator system 10 a simulation subroutine 2110, in FIG. 43, is provided during speed control. A similar subroutine 2111 (FIG. 44) is provided for simulation of the turbine-generator system dynamics during load control.

H. SUMMARY

Improved turbine and electric power plant operation is realized through the disclosed turbine startup, synchronizing, and load control systems and methods. Improved turbine and plant operation and management also results from the disclosed turbine monitoring and operator interface systems and methods. The improvements stem from advances in functional performances, operating efficiency, operating economy, manufacturing design and operating flexibility and operating convenience.

The present system supplements, expands and improves over the prior art. In doing so, the present system includes specialized programs for suppressing noise in the reference, demand and sensed parameter signals of the turbine-generator system; the programs are broken down into a series of master task programs and other programs for better utilization of the digital computer; a special program which monitors all of the programs and detects computing, addressing and transmitting errors therein increases the reliability, safety and flexibility of the system. Panel monitoring, information transmission and warning systems greatly increase the usefulness, ease-of-operation and inherent reliability of the present system. A breaker open interrupt program indicating the loss of load connected to the generator prevents any overspeed condition from becoming serious. A stop and initialization program automatically readies the digital computer for immediate service after any computer or turbine stop or loss of power thereto, either instantaneous or long term. A logic program in the present system provides the capability for maintenance testing of logic functions; monitoring analog and digital speed failure; increasing turbine supervision capabilities, expanding manual control capabilities of the computer allowing an operator to work in conjunction with the automatic operation of the turbine generator system with the digital computer. The logic program also including hold and suspend systems; governor and throttle valves control interlock systems; turbine latching logic programs; breaker logic programs; throttle pressure control logic programs; megawatt feedback logic; impulse pressure feedback logic; speed feedback logic; automatic synchronizer logic; automatic dispatch system logic; automatic turbine startup logic and remote transfer logic.

The control program of the present system includes the capability of time updating any function in the computer; limiting the position of predetermined valves in the turbine system; testing any valve in the system, checking for contingency conditions such as inoperativeness of any program or hardware; being able to select various speed control functions and various hardware therein for high reliability; selecting a series of operating modes in both load and speed modes of operation, providing speed and load reference functions with flexibility to change these during operation, switching between the speed control function and the load control functions during the automatic operation of the DEH system providing governor valve control functions and peripheral functions, such as, lags and nonlinear characterization of characteristics in the turbine-generator system.

The present system also has an elaborate programming system for better communications between an operator and the digital computer through use of special panel task program. The panel programs include a button-decoding program, a control switching system, a display system for displaying a vast number of system parameters of the turbine generator system, a system for changing during operation most parameters and constants in the digital computer with great ease and rapidity, a capability to select a great number of operating modes, a system for checking the status of predetermined valves in the system and display devices therefor, a testing system for predetermined valves in the system, a limiting provision for limiting the position of predetermined valves in the system. In addition the panel programs provide for the control of automatic turbine startup programs; the control of the digital computing system through the use of a series of manual buttons, switches, toggles, etc.; the program capability of monitoring keyboard activity for failsafe and improper operation thereby preventing operator mistakes from resulting in improper signals and signaling means for warning an operator of any improper commands or mistakes in his operation of the keyboard, panels etc.

APPENDIX 1

Glossary of Variable and Parameter Designations for Flowcharts, etc. —Alphabetical Listing

| NAME | TYPE | CORE LOC. | KEYBOARD ADR. | AREA | FUNCTION |
|---|---|---|---|---|---|
| A11X | | 0F20 | | LIBRARY | FLOATING ADD FUNCTION |
| ABS | | 0F0D | | LIBRARY | ABSOLUTE VALUE FUNCTION |
| ADS | L | 1357 | 1472 | ZETA | LOGICAL STATE |
| ADSDEC | L | 138C | 1525 | ZETA | LOGICAL STATE |
| ADSDWN | L | 118C | 1013 | ALPHA | CONTACT INPUT |
| ADSDWNX | L | 1370 | 1497 | ZETA | LOGICAL STATE |
| ADSINC | L | 138B | 1524 | ZETA | LOGICAL STATE |
| ADSMAXT | R | 12A0 | 3145 | DELTA | KEYBOARD-ENTERED CONSTANT |
| ADSPB | L | 13D6 | 1599 | THETA | OPERATORS PANEL BUTTON STATE |
| ADSPERM | L | 118D | 1014 | ALPHA | CONTACT INPUT |
| ADSRATE | R | 127C | 3127 | DELTA | KEYBOARD-ENTERED CONSTANT |
| ADSUP | L | 118B | 1012 | ALPHA | CONTACT INPUT |
| ADSUPX | L | 136F | 1496 | ZETA | LOGICAL STATE |
| ADSX | L | 137D | 1510 | ZETA | LOGICAL STATE |
| AIDBMW | R | 1286 | 3132 | DELTA | KEYBOARD-ENTERED CONSTANT |
| AIDBPI | R | 1288 | 3133 | DELTA | KEYBOARD-ENTERED CONSTANT |
| AIFAILMW | L | 138F | 1528 | ZETA | LOGICAL STATE |
| AIFAILMX | L | 1391 | 1530 | ZETA | LOGICAL STATE |
| AIFAILPI | L | 1390 | 1529 | ZETA | LOGICAL STATE |
| AIFAILPX | L | 1392 | 1531 | ZETA | LOGICAL STATE |
| ALPHA | | 1180 | | ALPHA | LABELED COMMON |
| ANASPDF | L | 1396 | 1535 | ZETA | LOGICAL STATE |

| NAME | TYPE | CORE LOC. | KEYBOARD ADR. | AREA | FUNCTION |
|---|---|---|---|---|---|
| ANASPDFX | L | 1397 | 1536 | ZETA | LOGICAL STATE |
| ARF |  | 3A82 |  | LIBRARY | FORMATTED ARGUMENT TRANSFER |
| AS | L | 1356 | 1471 | ZETA | LOGICAL STATE |
| ASDEC | L | 138E | 1527 | ZETA | LOGICAL STATE |
| ASDOWN | L | 1187 | 1008 | ALPHA | CONTACT INPUT |
| ASDOWNX | L | 1362 | 1483 | ZETA | LOGICAL STATE |
| ASINC | L | 138D | 1526 | ZETA | LOGICAL STATE |
| ASL | L | 1190 | 1017 | ALPHA | CONTACT INPUT |
| ASLX | L | 135F | 1480 | ZETA | LOGICAL STATE |
| ASPB | L | 13D5 | 1598 | THETA | OPERATORS PANEL BUTTON STATE |
| ASPERM | L | 1188 | 1009 | ALPHA | CONTACT INPUT |
| ASUP | L | 1186 | 1007 | ALPHA | CONTACT INPUT |
| ASUPX | L | 1361 | 1482 | ZETA | LOGICAL STATE |
| ASX | L | 137C | 1509 | ZETA | LOGICAL STATE |
| ATS | L | 1389 | 1522 | ZETA | LOGICAL STATE |
| ATSSCAN | R | 129A | 3142 | DELTA | KEYBOARD-ENTERED CONSTANT |
| ATSX | L | 138A | 1523 | ZETA | LOGICAL STATE |
| AUTOSTAR | L | 13D0 | 1593 | THETA | OPERATORS PANEL BUTTON STATE |
| BETA |  | 11AA |  | BETA | LABELED COMMON |
| BGVC | R | 1246 | 3100 | DELTA | KEYBOARD-ENTERED CONSTANT |
| BGV0 | R | 1244 | 3099 | DELTA | KEYBOARD-ENTERED CONSTANT |
| BINT(1) | R | 12CC | 3167 | DELTA | KEYBOARD-ENTERED CONSTANT |
| BINT(2) | R | 12CE | 3168 | DELTA | KEYBOARD-ENTERED CONSTANT |
| BINT(3) | R | 12D0 | 3169 | DELTA | KEYBOARD-ENTERED CONSTANT |
| BINT(4) | R | 12D2 | 3170 | DELTA | KEYBOARD-ENTERED CONSTANT |
| BINT(5) | R | 12D4 | 3171 | DELTA | KEYBOARD-ENTERED CONSTANT |
| BR | L | 1363 | 1484 | ZETA | LOGICAL STATE |
| BRX | L | 1364 | 1485 | ZETA | LOGICAL STATE |
| BTVC | R | 1252 | 3106 | DELTA | KEYBOARD-ENTERED CONSTANT |
| BTV0 | R | 1242 | 3098 | DELTA | KEYBOARD-ENTERED CONSTANT |
| C01X |  | 10B7 |  | LIBRARY | INTEGER TO REAL FUNCTION |
| C02: |  | 10B2 |  | LIBRARY | INTEGER TO REAL CONVERSION |
| C10X |  | 108A |  | LIBRARY | REAL TO INTEGER FUNCTION |
| C20: |  | 108A |  | LIBRARY | REAL TO INTEGER CONVERSION |
| CADSDOWN | L | 136C | 1493 | ZETA | LOGICAL STATE |
| CADSUP | L | 136B | 1492 | ZETA | LOGICAL STATE |
| CCOMANOTRAK | L | 13B7 | 1568 | ETA | FLASHING FLAG |
| CCOREADY | L | 13B8 | 1569 | ETA | FLASHING FLAG |
| CCOREFHL | L | 13B5 | 1566 | ETA | FLASHING FLAG |
| CCOREFLL | L | 13B4 | 1565 | ETA | FLASHING FLAG |
| CCOVPLIM | L | 13B6 | 1567 | ETA | FLASHING FLAG |
| COLDMD | R | 132A | 4214 | EPSILON | COMPUTED VARIABLE |
| COLRATE | R | 1328 | 4213 | EPSILON | COMPUTED VARIABLE |
| CLOSEDB | R | 1240 | 3097 | DELTA | KEYBOARD-ENTERED CONSTANT |
| CLOSEPB | L | 13DA | 1603 | THETA | OPERATORS PANEL BUTTON STATE |
| CM1 |  | 0F00 |  | LIBRARY | REAL NEGATION FUNCTION |
| CM2 |  | 0F00 |  | LIBRARY | REAL NEGATION FUNCTION |
| CM3 |  | 0F00 |  | LIBRARY | REAL NEGATION FUNCTION |
| CRESETPB | L | 13C4 | 1581 | THETA | OPERATORS PANEL BUTTON STATE |
| D11X |  | 0FA2 |  | LIBRARY | FLOATING DIVIDE FUNCTION |
| DADR | L | 11B7 | 1056 | BETA | FLAG |
| DATENTRY | L | 11B3 | 1052 | BETA | FLAG |
| DBTRKL | R | 125E | 3112 | DELTA | KEYBOARD-ENTERED CONSTANT |
| DBTRKREF | R | 12A6 | 3148 | DELTA | KEYBOARD-ENTERED CONSTANT |
| DBTRKS | R | 1260 | 3113 | DELTA | KEYBOARD-ENTERED CONSTANT |
| DEC: |  | 3AC7 |  | LIBRARY | INITIATE DECODE - FORMATTER |
| DECPT | L | 11B5 | 1054 | BETA | FLAG |
| DELTA |  | 1210 |  | DELTA | LABELED COMMON |
| DEMAND | R | 12F4 | 4187 | EPSILON | COMPUTED VARIABLE |
| DIGSPDF | L | 1394 | 1533 | ZETA | LOGICAL STATE |
| DIGSPDFX | L | 1395 | 1534 | ZETA | LOGICAL STATE |
| DLINK | L | 13D3 | 1596 | THETA | OPERATORS PANEL BUTTON STATE |

| NAME | TYPE | CORE LOC. | KEYBOARD ADR. | AREA | FUNCTION |
|---|---|---|---|---|---|
| ENC: |  | 3AC3 |  | LIBRARY | INITIATE ENCODE - FORMATTER |
| EPSILON |  | 12E0 |  | EPSILON | LABELED COMMON |
| ETA |  | 13A0 |  | ETA | LABELED COMMON |
| EXIT |  | 09B2 |  | MONITOR | PROGRAM EXIT HANDLER |
| FF |  |  |  | LOGIC TASK | FLIPFLOP FUNCTION |
| FLGWRD | I | 11AC | 2045 | BETA | FLAG |
| FOLAG |  |  |  | CONTROL TASK | FIRST ORDER LAG FUNCTION |
| GAMMA |  | 11E0 |  | GAMMA | LABELED COMMON |
| GC | L | 1350 | 1465 | ZETA | LOGICAL STATE |
| GCX | L | 1381 | 1514 | ZETA | LOGICAL STATE |
| GL2 | R | 1232 | 3090 | DELTA | KEYBOARD-ENTERED CONSTANT |
| GL3 | R | 1234 | 3091 | DELTA | KEYBOARD-ENTERED CONSTANT |
| GO | L | 1359 | 1474 | ZETA | LOGICAL STATE |
| GOHOLDOF | L | 137B | 1508 | ZETA | LOGICAL STATE |
| GOPB | L | 13CB | 1588 | THETA | OPERATORS PANEL BUTTON STATE |
| GOT: |  | 10D7 |  | LIBRARY | COMPUTED GO TO FUNCTION |
| GOX | L | 135A | 1475 | ZETA | LOGICAL STATE |
| GR1 | R | 1262 | 3114 | DELTA | KEYBOARD-ENTERED CONSTANT |
| GR2 | R | 1264 | 3115 | DELTA | KEYBOARD-ENTERED CONSTANT |
| GR3 | R | 1266 | 3116 | DELTA | KEYBOARD-ENTERED CONSTANT |
| GR4 | R | 1268 | 3117 | DELTA | KEYBOARD-ENTERED CONSTANT |
| GR5 | R | 126A | 3118 | DELTA | KEYBOARD-ENTERED CONSTANT |
| GR6 | R | 126C | 3119 | DELTA | KEYBOARD-ENTERED CONSTANT |
| GR7 | R | 126E | 3120 | DELTA | KEYBOARD-ENTERED CONSTANT |
| GR8 | R | 1270 | 3121 | DELTA | KEYBOARD-ENTERED CONSTANT |
| GR9 | R | 1272 | 3122 | DELTA | KEYBOARD-ENTERED CONSTANT |
| GR10 | R | 1274 | 3123 | DELTA | KEYBOARD-ENTERED CONSTANT |
| GS1 | R | 122E | 3088 | DELTA | KEYBOARD-ENTERED CONSTANT |
| GS2 | R | 128A | 3134 | DELTA | KEYBOARD-ENTERED CONSTANT |
| GV | L | 13CE | 1591 | THETA | OPERATORS PANEL BUTTON STATE |
| GVBIAS | R | 130C | 4199 | EPSILON | COMPUTED VARIABLE |
| GVCONT | L | 13A7 | 1552 | ETA | FLASHING FLAG |
| GVDB | R | 1278 | 3125 | DELTA | KEYBOARD-ENTERED CONSTANT |
| GVINIT | R | 128E | 3136 | DELTA | KEYBOARD-ENTERED CONSTANT |
| GVMAX | L | 137A | 1507 | ZETA | LOGICAL STATE |
| GVMIN | L | 1379 | 1506 | ZETA | LOGICAL STATE |
| GVPOS | R | 1136 | 4220 | EPSILON | COMPUTED VARIABLE |
| GVSP | R | 130A | 4198 | EPSILON | COMPUTED VARIABLE |
| GVSPMIN | R | 124E | 3104 | DELTA | KEYBOARD-ENTERED CONSTANT |
| HEL | R | 122A | 3086 | DELTA | KEYBOARD-ENTERED CONSTANT |
| HLF | R | 1228 | 3085 | DELTA | KEYBOARD-ENTERED CONSTANT |
| HLL | R | 12E8 | 4181 | EPSILON | COMPUTED VARIABLE |
| HLLMAX | R | 1218 | 3077 | DELTA | KEYBOARD-ENTERED CONSTANT |
| HLS | R | 1226 | 3084 | DELTA | KEYBOARD-ENTERED CONSTANT |
| HOLD | L | 135C | 1477 | ZETA | LOGICAL STATE |
| HOLDCP | L | 1358 | 1473 | ZETA | LOGICAL STATE |
| HOLDPB | L | 13CA | 1587 | THETA | OPERATORS PANEL BUTTON STATE |
| HOLDX | L | 135D | 1478 | ZETA | LOGICAL STATE |
| IADSDOWN | I | 11B9 | 2058 | BETA | COUNTER |
| IADSUP | I | 11B8 | 2057 | BETA | COUNTER |
| ICC01 | I | 11BD | 2062 | BETA | COUNTER |
| ICC02 | I | 11BE | 2063 | BETA | COUNTER |
| ICOUNTER(1) | I | 11C8 | 2073 | BETA | COUNTER |
| ICOUNTER(2) | I | 11C9 | 2074 | BETA | COUNTER |
| ICOUNTER(3) | I | 11CA | 2075 | BETA | COUNTER |
| ICOUNTER(4) | I | 11CB | 2076 | BETA | COUNTER |
| ICOUNTER(5) | I | 11CC | 2077 | BETA | COUNTER |
| ICOURSE | I | 11BF | 2064 | BETA | COUNTER |

| NAME | TYPE | CORE LOC. | KEYBOARD ADR. | AREA | FUNCTION |
|---|---|---|---|---|---|
| IDPT | I | 11B6 | 2055 | BETA | COUNTER |
| IDUTY | I | 11C6 | 2071 | BETA | COUNTER |
| IFINE | I | 11C0 | 2065 | BETA | COUNTER |
| IGV1SS | I | 11FE | 2127 | GAMMA | ANALOG INPUT |
| IGV2SS | I | 11FF | 2128 | GAMMA | ANALOG INPUT |
| IGV3SS | I | 1200 | 2129 | GAMMA | ANALOG INPUT |
| IGV4SS | I | 1201 | 2130 | GAMMA | ANALOG INPUT |
| IGV5SS | I | 1202 | 2131 | GAMMA | ANALOG INPUT |
| IGV6SS | I | 1203 | 2132 | GAMMA | ANALOG INPUT |
| IGV7SS | I | 1204 | 2133 | GAMMA | ANALOG INPUT |
| IGV8SS | I | 1205 | 2134 | GAMMA | ANALOG INPUT |
| IGVA0 | I | 11F5 | 2118 | GAMMA | ANALOG INPUT |
| IGVCOM | I | 11F6 | 2119 | GAMMA | ANALOG INPUT |
| IGVMAN | I | 11F4 | 2117 | GAMMA | ANALOG INPUT |
| INDEX1 | I | 11AE | 2047 | BETA | COUNTER |
| INDEX2 | I | 11AF | 2048 | BETA | COUNTER |
| INDEX3 | I | 11B2 | 2051 | BETA | COUNTER |
| INDEX11 | I | | | PANEL TASK | COUNTER |
| INTSCAN | I | 11C5 | 2070 | BETA | COUNTER |
| INVREQ | L | 13A8 | 1553 | ETA | FLASHING FLAG |
| INVREQX | L | 13B2 | 1563 | ETA | FLASHING FLAG |
| IOLDCT | I | 11C1 | 2066 | BETA | COUNTER |
| IPB | I | 11AA | 2043 | BETA | COUNTER |
| IPBX | I | 11AB | 2044 | BETA | COUNTER |
| IPI | L | 136D | 1494 | ZETA | LOGICAL STATE |
| IPIPB | L | 13C1 | 1578 | THETA | OPERATORS PANEL BUTTON STATE |
| IPIX | L | 136E | 1495 | ZETA | LOGICAL STATE |
| ISCAN | I | 11C2 | 2067 | BETA | COUNTER |
| ISICOUNT | I | 11BA | 2059 | BETA | COUNTER |
| ISPCOUNT | I | 11B4 | 2053 | BETA | COUNTER |
| ITESTA0 | I | 1206 | 2135 | GAMMA | ANALOG INPUT |
| ITF | I | 11BC | 2061 | BETA | FLAG |
| ITIME | I | 11CD | 2078 | BETA | COUNTER |
| ITV1SS | I | 11FA | 2123 | GAMMA | ANALOG INPUT |
| ITV2SS | I | 11FB | 2124 | GAMMA | ANALOG INPUT |
| ITV3SS | I | 11FC | 2125 | GAMMA | ANALOG INPUT |
| ITV4SS | I | 11FD | 2126 | GAMMA | ANALOG INPUT |
| ITVA0 | I | 11F8 | 2121 | GAMMA | ANALOG INPUT |
| ITVCOM | I | 11F9 | 2122 | GAMMA | ANALOG INPUT |
| ITVMAN | I | 11F7 | 2120 | GAMMA | ANALOG INPUT |
| IVPL | I | 11BB | 2060 | BETA | COUNTER |
| IWINDOW | I | 11B0 | 2049 | BETA | COUNTER |
| | | | | | |
| LCC0 | | 18C0 | | LOGIC TASK | PANEL/STATUS CC0 SUBROUTINE |
| LDBX | | 1071 | | LIBRARY | LOAD BIT FUNCTION |
| LEL | R | 122C | 3087 | DELTA | KEYBOARD-ENTERED CONSTANT |
| LLL | R | 12E6 | 4180 | EPSILON | COMPUTED VARIABLE |
| LLLBP | L | 1366 | 1487 | ZETA | LOGICAL STATE |
| LLLMIN | R | 1216 | 3076 | DELTA | KEYBOARD-ENTERED CONSTANT |
| LLX | L | 1367 | 1488 | ZETA | LOGICAL STATE |
| | | | | | |
| KEYENTRY | L | 11B1 | 1050 | BETA | FLAG |
| | | | | | |
| M11X | | 0F9F | | LIBRARY | FLOATING MULTIPLY FUNCTION |
| M:AB | | 09B8 | | MONITOR | TASK ABLE HANDLER |
| M:ANI | | 0579 | | MONITOR | ANALOG INPUT HANDLER |
| M:CCO | | 07F7 | | MONITOR | CONTACT OUTPUT HANDLER |
| M:DA | | 09AC | | MONITOR | TASK DISABLE HANDLER |
| M:HT | | 090C | | MONITOR | TASK HALT HANDLER |
| M:IN | | 09CD | | MONITOR | TASK INITIATE (BID) HANDLER |
| M:SPNADJ | | 0681 | | MONITOR | VIDAR SPAN/ADJUST HANDLER |
| M:TD | | 08F6 | | MONITOR | TIME DELAY HANDLER |

| NAME | TYPE | CORE LOC. | KEYBOARD ADR. | AREA | FUNCTION |
|---|---|---|---|---|---|
| MANSTRAK | L | 13A3 | 1548 | ETA | FLASHING FLAG |
| MANSTRAKX | L | 13AD | 1558 | ETA | FLASHING FLAG |
| MANTPC | L | 1184 | 1005 | ALPHA | CONTACT INPUT |
| MANTPCX | L | 139C | 1541 | ZETA | LOGICAL STATE |
| MGB | L | 1185 | 1006 | ALPHA | CONTACT INPUT |
| MGBX | L | 1360 | 1481 | ZETA | LOGICAL STATE |
| MON24V | L | 1195 | 1022 | ALPHA | CONTACT INPUT |
| MON24VX | L | 1377 | 1504 | ZETA | LOGICAL STATE |
| MONOPCT | L | 1194 | 1021 | ALPHA | CONTACT INPUT |
| MW | R | 11E0 | 4049 | GAMMA | ANALOG INPUT |
| MWI | L | 1371 | 1498 | ZETA | LOGICAL STATE |
| MWINIT | R | 124A | 3102 | DELTA | KEYBOARD-ENTERED CONSTANT |
| MWIPB | L | 13C3 | 1580 | THETA | OPERATORS PANEL BUTTON STATE |
| MWIX | L | 1372 | 1499 | ZETA | LOGICAL STATE |
| MWMAX | R | 1292 | 3138 | DELTA | KEYBOARD-ENTERED CONSTANT |
| MWTF | L | 1183 | 1004 | ALPHA | CONTACT INPUT |
| NDF | | 3A67 | | LIBRARY | TERMINATE FORMATTED RECORD |
| NOMINS | I | 11C7 | 2072 | BETA | COUNTER |
| NSYNC1 | I | 11C3 | 2068 | BETA | COUNTER |
| NSYNC2 | I | 11C4 | 2069 | BETA | COUNTER |
| NVTEST | I | 11AD | 2046 | BETA | COUNTER |
| OA | L | 1354 | 1469 | ZETA | LOGICAL STATE |
| OACCRATE | R | 12E2 | 4178 | EPSILON | COMPUTED VARIABLE |
| OALITE | L | 137E | 1511 | ZETA | LOGICAL STATE |
| OALITEX | L | 1387 | 1520 | ZETA | LOGICAL STATE |
| OARATMAX | R | 1212 | 3074 | DELTA | KEYBOARD-ENTERED CONSTANT |
| OAX | L | 1355 | 1470 | ZETA | LOGICAL STATE |
| ODMD | R | 12E0 | 4177 | EPSILON | COMPUTED VARIABLE |
| ODMDLMAX | R | 1210 | 3073 | DELTA | KEYBOARD-ENTERED CONSTANT |
| OFFSET(1) | R | 1450 | 3361 | LAMBDA | KEYBOARD-ENTERED CONSTANT |
| OFFSET(2) | R | 1452 | 3362 | LAMBDA | KEYBOARD-ENTERED CONSTANT |
| OFFSET(3) | R | 1454 | 3363 | LAMBDA | KEYBOARD-ENTERED CONSTANT |
| OLDGVCON | L | 1381 | 1562 | ETA | FLASHING FLAG |
| OLDREFHL | L | 13AB | 1556 | ETA | FLASHING FLAG |
| OLDREFLL | L | 13AA | 1555 | ETA | FLASHING FLAG |
| OLDTVCON | L | 13B0 | 1561 | ETA | FLASHING FLAG |
| OLDVPLIM | L | 13AC | 1557 | ETA | FLASHING FLAG |
| OLDVSTAT | L | 13AF | 1560 | ETA | FLASHING FLAG |
| OLRATE | R | 12E4 | 4179 | EPSILON | COMPUTED VARIABLE |
| OLRATMAX | R | 1214 | 3075 | DELTA | KEYBOARD-ENTERED CONSTANT |
| OPCSP | L | 1182 | 1003 | ALPHA | CONTACT INPUT |
| OPCOVSPD | L | 1199 | 1026 | ALPHA | CONTACT INPUT |
| OPCOVSPX | L | 1365 | 1486 | ZETA | LOGICAL STATE |
| OPCSPEED | R | 11E6 | 4052 | GAMMA | ANALOG INPUT |
| OPCTEST | L | 119A | 1027 | ALPHA | CONTACT INPUT |
| OPCTF | L | 1181 | 1002 | ALPHA | CONTACT INPUT |
| OPENPB | L | 13DB | 1604 | THETA | OPERATORS PANEL BUTTON STATE |
| OPRT | L | 1198 | 1028 | ALPHA | CONTACT INPUT |
| OPRTX | L | 135B | 1476 | ZETA | LOGICAL STATE |
| PERCCI | R | 1298 | 3141 | DELTA | KEYBOARD-ENTERED CONSTANT |
| PERSCAN | L | 137F | 1512 | ZETA | LOGICAL STATE |
| PERSCANX | L | 1380 | 1513 | ZETA | LOGICAL STATE |
| PI | R | 11E2 | 4050 | GAMMA | ANALOG INPUT |
| PISP | R | 1304 | 4195 | EPSILON | COMPUTED VARIABLE |
| PLANTCCI | | 0120 | | SI INTERRUPT | SCAN PLANT CCI SUBROUTINE |
| PO | R | 11E4 | 4051 | GAMMA | ANALOG INPUT |
| POINT(1) | R | 1444 | 3355 | LAMBDA | KEYBOARD-ENTERED CONSTANT |
| POINT(2) | R | 1446 | 3356 | LAMBDA | KEYBOARD-ENTERED CONSTANT |
| POINT(3) | R | 1448 | 3357 | LAMBDA | KEYBOARD-ENTERED CONSTANT |
| POREF | R | 1254 | 3107 | DELTA | KEYBOARD-ENTERED CONSTANT |
| POS(1) | R | 13EC | 3311 | IOTA | KEYBOARD-ENTERED CONSTANT |

| NAME | TYPE | CORE LOC. | KEYBOARD ADR. | AREA | FUNCTION |
|---|---|---|---|---|---|
| POS(2) | R | 13EE | 3312 | IOTA | KEYBOARD-ENTERED CONSTANT |
| POS(3) | R | 13F0 | 3313 | IOTA | KEYBOARD-ENTERED CONSTANT |
| POS(4) | R | 13F2 | 3314 | IOTA | KEYBOARD-ENTERED CONSTANT |
| POS(5) | R | 13F4 | 3315 | IOTA | KEYBOARD-ENTERED CONSTANT |
| POS(6) | R | 13F6 | 3316 | IOTA | KEYBOARD-ENTERED CONSTANT |
| POSP | R | 123E | 3096 | DELTA | KEYBOARD-ENTERED CONSTANT |
| PRESET | | 26B0 | | CONTROL TASK | PI CONTROLLER SUBROUTINE |
| PRINT(1) | R | 145A | 3366 | LAMBDA | KEYBOARD-ENTERED CONSTANT |
| PRINT(2) | R | 145C | 3367 | LAMBDA | KEYBOARD-ENTERED CONSTANT |
| PRINT(3) | R | 145E | 3368 | LAMBDA | KEYBOARD-ENTERED CONSTANT |
| PRINT(4) | R | 1460 | 3369 | LAMBDA | KEYBOARD-ENTERED CONSTANT |
| PRINT(5) | R | 1462 | 3370 | LAMBDA | KEYBOARD-ENTERED CONSTANT |
| PRINT(6) | R | 1464 | 3371 | LAMBDA | KEYBOARD-ENTERED CONSTANT |
| PRINT(7) | R | 1466 | 3372 | LAMBDA | KEYBOARD-ENTERED CONSTANT |
| PRINT(8) | R | 1468 | 3373 | LAMBDA | KEYBOARD-ENTERED CONSTANT |
| PRINT(9) | R | 146A | 3374 | LAMBDA | KEYBOARD-ENTERED CONSTANT |
| PRINT(10) | R | 146C | 3375 | LAMBDA | KEYBOARD-ENTERED CONSTANT |
| PRINT(11) | R | 146E | 3376 | LAMBDA | KEYBOARD-ENTERED CONSTANT |
| | | | | | |
| RATE | R | 12F6 | 4188 | EPSILON | COMPUTED VARIABLE |
| RB | L | 1191 | 1018 | ALPHA | CONTACT INPUT |
| RBRATE | R | 127A | 3126 | DELTA | KEYBOARD-ENTERED CONSTANT |
| READY | L | 13A4 | 1549 | ETA | FLASHING FLAG |
| READYX | L | 13AE | 1559 | ETA | FLASHING FLAG |
| REI: | | 114B | | LIBRARY | INTEGER FUNCTION RETURN |
| REF | | 39EF | | LIBRARY | INITIATE FORMATTED READ |
| REF1 | R | 12FA | 4190 | EPSILON | COMPUTED VARIABLE |
| REF2 | R | 12FC | 4191 | EPSILON | COMPUTED VARIABLE |
| REFDMD | R | 12F8 | 4189 | EPSILON | COMPUTED VARIABLE |
| REFHLIM | L | 13A1 | 1546 | ETA | FLASHING FLAG |
| REFLLIM | L | 13A0 | 1545 | ETA | FLASHING FLAG |
| RER: | | 115A | | LIBRARY | REAL FUNCTION RETURN |
| RESMW | R | 1312 | 4202 | EPSILON | COMPUTED VARIABLE |
| RESMWX | R | 131E | 4208 | EPSILON | COMPUTED VARIABLE |
| RESPI | R | 1314 | 4203 | EPSILON | COMPUTED VARIABLE |
| RESPIX | R | 1320 | 4209 | EPSILON | COMPUTED VARIABLE |
| RESSPD | R | 1310 | 4201 | EPSILON | COMPUTED VARIABLE |
| RESSPDX | R | 1322 | 4210 | EPSILON | COMPUTED VARIABLE |
| RIB: | | 114C | | LIBRARY | INTEGER FUNCTION RETURN |
| RRB: | | 115B | | LIBRARY | REAL FUNCTION RETURN |
| RUNLOGIC | L | 1376 | 1503 | ZETA | LOGICAL STATE |
| RVPLL | L | 118F | 1016 | ALPHA | CONTACT INPUT |
| RVPLR | L | 118E | 1015 | ALPHA | CONTACT INPUT |
| | | | | | |
| PRINT(12) | R | 1470 | 3377 | LAMBDA | KEYBOARD-ENTERED CONSTANT |
| PRINT(13) | R | 1472 | 3378 | LAMBDA | KEYBOARD-ENTERED CONSTANT |
| PRINT(14) | R | 1474 | 3379 | LAMBDA | KEYBOARD-ENTERED CONSTANT |
| PRINT(15) | R | 1476 | 3380 | LAMBDA | KEYBOARD-ENTERED CONSTANT |
| PRINT(16) | R | 1478 | 3381 | LAMBDA | KEYBOARD-ENTERED CONSTANT |
| PRINT(17) | R | 147A | 3382 | LAMBDA | KEYBOARD-ENTERED CONSTANT |
| PRINT(18) | R | 147C | 3383 | LAMBDA | KEYBOARD-ENTERED CONSTANT |
| PRINT(19) | R | 147E | 3384 | LAMBDA | KEYBOARD-ENTERED CONSTANT |
| | | | | | |
| S11X | | 0F23 | | LIBRARY | FLOATING SUBTRACT FUNCTION |
| SAT: | | 10F1 | | LIBRARY | SUBPROGRAM ARGUMENT TRANSFER |
| SBT: | | 10F0 | | LIBRARY | SUBPROGRAM ARGUMENT TRANSFER |
| SEGPB | L | 13D1 | 1594 | THETA | OPERATORS PANEL BUTTON STATE |
| SFT: | | 110B | | LIBRARY | STATEMENT FUNCTION TRANSFER |
| SIMAX | R | 1294 | 3139 | DELTA | KEYBOARD-ENTERED CONSTANT |
| SIMMW | R | 1318 | 4205 | EPSILON | COMPUTED VARIABLE |
| SIMPI | R | 131A | 4206 | EPSILON | COMPUTED VARIABLE |
| SIMWS | R | 131C | 4207 | EPSILON | COMPUTED VARIABLE |
| SIO | L | 118A | 1011 | ALPHA | CONTACT INPUT |
| SLLLBP | L | 1388 | 1521 | ZETA | LOGICAL STATE |
| SLOPE(1) | R | 12B8 | 3157 | DELTA | KEYBOARD-ENTERED CONSTANT |
| SLOPE(2) | R | 12BA | 3158 | DELTA | KEYBOARD-ENTERED CONSTANT |
| SLOPE(3) | R | 12BC | 3159 | DELTA | KEYBOARD-ENTERED CONSTANT |
| SLOPE(4) | R | 12BE | 3160 | DELTA | KEYBOARD-ENTERED CONSTANT |
| SLOPE(5) | R | 12C0 | 3161 | DELTA | KEYBOARD-ENTERED CONSTANT |

| NAME | TYPE | CORE LOC. | KEYBOARD ADR. | AREA | FUNCTION |
|---|---|---|---|---|---|
| SP(1) | R | 13E0 | 3305 | IOTA | KEYBOARD-ENTERED CONSTANT |
| SP(2) | R | 13E2 | 3306 | IOTA | KEYBOARD-ENTERED CONSTANT |
| SP(3) | R | 13E4 | 3307 | IOTA | KEYBOARD-ENTERED CONSTANT |
| SP(4) | R | 13E6 | 3308 | IOTA | KEYBOARD-ENTERED CONSTANT |
| SP(5) | R | 13E8 | 3309 | IOTA | KEYBOARD-ENTERED CONSTANT |
| SP(6) | R | 13EA | 3310 | IOTA | KEYBOARD-ENTERED CONSTANT |
| SPAN(1) | R | 144A | 3358 | LAMBDA | KEYBOARD-ENTERED CONSTANT |
| SPAN(2) | R | 144C | 3359 | LAMBDA | KEYBOARD-ENTERED CONSTANT |
| SPAN(3) | R | 144E | 3360 | LAMBDA | KEYBOARD-ENTERED CONSTANT |
| SPD | R | 130E | 4200 | EPSILON | COMPUTED VARIABLE |
| SPDB | R | 1280 | 3129 | DELTA | KEYBOARD-ENTERED CONSTANT |
| SPDLOOP | | 2FB0 | | CONTROL TASK | SPEED FEEDBACK LOOP SUBROUTINE |
| SPDSP | R | 12FE | 4192 | EPSILON | COMPUTED VARIABLE |
| SPI | L | 1373 | 1500 | ZETA | LOGICAL STATE |
| SPIPB | L | 13C5 | 1582 | THETA | OPERATORS PANEL BUTTON STATE |
| SPIX | L | 1374 | 1501 | ZETA | LOGICAL STATE |
| SPTF | L | 1375 | 1502 | ZETA | LOGICAL STATE |
| SPTFX | L | 135E | 1479 | ZETA | LOGICAL STATE |
| STBX | | 1052 | | LIBRARY | STORE BIT FUNCTION |
| STM | L | 1352 | 1467 | ZETA | LOGICAL STATE |
| STMX | L | 1353 | 1468 | ZETA | LOGICAL STATE |
| | | | | | |
| T1 | R | 1238 | 3093 | DELTA | KEYBOARD-ENTERED CONSTANT |
| T2 | R | 123A | 3094 | DELTA | KEYBOARD-ENTERED CONSTANT |
| T3 | R | 123C | 3095 | DELTA | KEYBOARD-ENTERED CONSTANT |
| T4 | R | 128C | 3135 | DELTA | KEYBOARD-ENTERED CONSTANT |
| TASDMD | R | 1326 | 4212 | EPSILON | COMPUTED VARIABLE |
| TASRATE | R | 1324 | 4211 | EPSILON | COMPUTED VARIABLE |
| TC | L | 1351 | 1466 | ZETA | LOGICAL STATE |
| TCLITE | L | 1383 | 1516 | ZETA | LOGICAL STATE |
| TCLITEX | L | 1384 | 1517 | ZETA | LOGICAL STATE |
| TESTAIMX | R | 12A2 | 3146 | DELTA | KEYBOARD-ENTERED CONSTANT |
| TESTAO | R | 1316 | 4204 | EPSILON | COMPUTED VARIABLE |
| THETA | | 13C0 | | THETA | LABELED COMMON |
| THI | L | 1192 | 1019 | ALPHA | CONTACT INPUT |
| TM | L | 1193 | 1020 | ALPHA | CONTACT INPUT |
| TMW | R | 125A | 3110 | DELTA | KEYBOARD-ENTERED CONSTANT |
| TMX | L | 139D | 1542 | ZETA | LOGICAL STATE |
| TPC | L | 1368 | 1489 | ZETA | LOGICAL STATE |
| TPCPB | L | 13C7 | 1584 | THETA | OPERATORS PANEL BUTTON STATE |
| TPCRATE | R | 127E | 3128 | DELTA | KEYBOARD-ENTERED CONSTANT |
| TPCX | L | 1369 | 1490 | ZETA | LOGICAL STATE |
| TPI | R | 125C | 3111 | DELTA | KEYBOARD-ENTERED CONSTANT |
| TPLIM | L | 139A | 1539 | ZETA | LOGICAL STATE |
| TPLIMX | L | 139B | 1540 | ZETA | LOGICAL STATE |
| TPTF | L | 1180 | 1001 | ALPHA | CONTACT INPUT |
| TRCOM | L | 1385 | 1518 | ZETA | LOGICAL STATE |
| TRCOMX | L | 1386 | 1519 | ZETA | LOGICAL STATE |
| TRPB | L | 13C0 | 1577 | ETA | FLASHING FLAG |
| TRTVGV | L | 139E | 1543 | ZETA | LOGICAL STATE |
| TRTVGVX | L | 139F | 1544 | ZETA | LOGICAL STATE |
| TSOFF | L | 1398 | 1537 | ZETA | LOGICAL STATE |
| | | | | | |
| VIDAROS | L | 136A | 1491 | ZETA | LOGICAL STATE |
| VIDAROSX | L | 1393 | 1532 | ZETA | LOGICAL STATE |
| VPLIM | L | 13A2 | 1547 | ETA | FLASHING FLAG |
| VPLLPB | L | 13D9 | 1602 | THETA | OPERATORS PANEL BUTTON STATE |
| VPLRPB | L | 13D8 | 1601 | THETA | OPERATORS PANEL BUTTON STATE |
| VPOSL | R | 12EA | 4182 | EPSILON | COMPUTED VARIABLE |
| VPOSLINC | R | 124C | 3103 | DELTA | KEYBOARD-ENTERED CONSTANT |
| VPOSLMAX | R | 121A | 3078 | DELTA | KEYBOARD-ENTERED CONSTANT |
| VSP | R | 1306 | 4196 | EPSILON | COMPUTED VARIABLE |
| VSTATCON | L | 13A5 | 1550 | ETA | FLASHING FLAG |
| VSTATUS | L | 13CD | 1590 | THETA | OPERATORS PANEL BUTTON STATE |
| VTESTINC | R | 1250 | 3105 | DELTA | KEYBOARD-ENTERED CONSTANT |
| VTESTPB | L | 13D2 | 1595 | THETA | OPERATORS PANEL BUTTON STATE |

| NAME | TYPE | CORE LOC. | KEYBOARD ADR. | AREA | FUNCTION |
|------|------|-----------|---------------|------|----------|
| TSOFFX | L | 1399 | 1538 | ZETA | LOGICAL STATE |
| TURHSPOF | L | 13D4 | 1597 | THETA | OPERATORS PANEL BUTTON STATE |
| TV | L | 13CF | 1592 | THETA | OPERATORS PANEL BUTTON STATE |
| TVBIAS | R | 1308 | 4197 | EPSILON | COMPUTED VARIABLE |
| TVCONT | L | 13A6 | 1551 | ETA | FLASHING FLAG |
| TVDB | R | 1276 | 3124 | DELTA | KEYBOARD-ENTERED CONSTANT |
| TVMAX | L | 1378 | 1505 | ZETA | LOGICAL STATE |
| TVMIN | L | 1382 | 1515 | ZETA | LOGICAL STATE |
| TWS | R | 1258 | 3109 | DELTA | KEYBOARD-ENTERED CONSTANT |
| X | R | 1300 | 4193 | EPSILON | COMPUTED VARIABLE |
| XIT: | | 1127 | | LIBRARY | INTEGER ARITHMETIC EXIT |
| XPERIOD | R | 1458 | 3365 | LAMBDA | KEYBOARD-ENTERED CONSTANT |
| XPRINT | R | 1456 | 3364 | LAMBDA | KEYBOARD-ENTERED CONSTANT |
| XTD: | | 1139 | | LIBRARY | REAL ARITHMETIC EXIT |
| XTIME | R | 1440 | 3353 | LAMBDA | KEYBOARD-ENTERED CONSTANT |
| XUPDATE | R | 1442 | 3354 | LAMBDA | KEYBOARD-ENTERED CONSTANT |
| WR | R | 1224 | 3083 | DELTA | KEYBOARD-ENTERED CONSTANT |
| WRF | | 39FE | | LIBRARY | INITIATE FORMATTED WRITE |
| WS | R | 1334 | 4219 | EPSILON | COMPUTED VARIABLE |
| WSCOURSE | R | 1330 | 4217 | EPSILON | COMPUTED VARIABLE |
| WSDIG | R | 132E | 4216 | EPSILON | COMPUTED VARIABLE |
| WSDIP | R | 1248 | 3101 | DELTA | KEYBOARD-ENTERED CONSTANT |
| WSERROR | R | 1236 | 3092 | DELTA | KEYBOARD-ENTERED CONSTANT |
| WSFINE | R | 1332 | 4218 | EPSILON | COMPUTED VARIABLE |
| WSHPSI | R | 11E8 | 4053 | GAMMA | ANALOG INPUT |
| WSMAX | R | 1284 | 3131 | DELTA | KEYBOARD-ENTERED CONSTANT |
| WSMAXAI | R | 12A4 | 3147 | DELTA | KEYBOARD-ENTERED CONSTANT |
| WSMIN | R | 1282 | 3130 | DELTA | KEYBOARD-ENTERED CONSTANT |
| WSREFMIN | R | 1296 | 3140 | DELTA | KEYBOARD-ENTERED CONSTANT |
| WSTRANS | R | 132C | 4215 | EPSILON | COMPUTED VARIABLE |
| WSWITCH | R | 1256 | 3108 | DELTA | KEYBOARD-ENTERED CONSTANT |
| ZETA | | 1350 | | ZETA | LABELED COMMON |
| Y | R | 1302 | 4194 | EPSILON | COMPUTED VARIABLE -- |

We claim:

1. An electric power generating system comprising:
   a. a steam turbine system;
   b. a steam generator for providing steam to said steam turbine system;
   c. an electric generator rotated by said turbine system and adapted to be connected to an electric load;
   d. means for digitally computing and processing, having a central processor unit and a memory interconnected with said central processor unit;
   e. means for converting input signals to digital data, said input converting means being connected to said digital computing means;
   f. means for converting digital data to output signals, said digital to output converting means being connected to said digital computing means;
   g. means for sensing the value of at least one predetermined generating system operating parameter, and for generating input signals representative of said parameter, said sensing means being connected to said input converting means;
   h. means for developing a signal representative of the desired condition of said generating system operating parameter, said means for developing being connected to said input converting means;
   i. means for controlling the steam flow to said turbine;
   j. means for connecting said output signal converting means to said steam flow control means;
   k. said digital computer means being characterized in that it is programmed to perform a plurality of respective functions in accordance with a predetermined priority, said functions including
      i. developing a difference signal representative of the differential between the desired and the present conditions of said generating system operating parameter, and
      ii. translating said difference into control signals for said output converting means, said translating function including integrating the difference signals and limiting the integrated difference signals to a specified range corresponding to extreme conditions of said steam control means, and
   l. said control signals being converted to output signals by said output converting means for controlling said steam flow control means as a function of said sensed parameters so as to control steam flow as an intermediate variable, and to control turbine and generator speed and load as end operating variables.

2. The system as described in claim 1, wherein said translating function in said digital computer control means includes
- a. numerically integrating successive differences from said means for developing; and
- b. limiting the integration total to a range between specified upper and lower limits.

3. A system as described in claim 1, wherein said translating function in said digital computer means defines the function of proportional plus integral feedback controller, said limited integrated difference signals being combined with a signal proportional to said difference signals to form a composite representation of said control signals.

4. A system as described in claim 3, wherein said parameter constitutes turbine speed and said proportional plus integral feedback controller forms a portion of a speed control loop.

5. A system as described in claim 3, wherein said parameter constitutes electric load, and said proportional plus integral feedback controller forms a portion of a load control loop.

6. An electric power generating system comprising:
- a. a steam turbine system;
- b. a steam generator for providing steam to said steam turbine system;
- c. an electric generator rotated by said turbine system and adapted to be connected to an electric load;
- d. means for digitally computing and processing, having a central processor unit and a memory interconnected with said central processor unit;
- e. means for converting input signals to digital data, said input converting means being connected to said digital computing means;
- f. means for converting digital data to output signals, said digital to output converting means being connected to said digital computing means;
- g. means for sensing the value of at least one predetermined generating system operating parameter, and for generating input signals representative of said parameter, said sensing means being connected to said input converting means;
- h. means for developing a signal representative of the desired condition of said parameter, said means for developing being connected to said input converting means;
- i. means for controlling the steam flow to said turbine; and
- j. means for connecting said output signal converting means to said steam flow control means;
- k. said digital computer means being programmed to perform the functions of
  - i. developing a difference signal representative of the differential between desired and present conditions of at least one turbine operating parameter,
  - ii. integrating said difference signal,
  - iii. limiting said integrated difference signal to a specified range corresponding to extreme conditions of said steam control means, and
  - iv. generating control signals in response to said limited integrated signal;
- l. said control signals being converted to output signals by said output converting means for controlling said steam flow control means as a function of said parameter so as to control steam flow as an intermediate variable, and to control turbine and generator speed and load as end operating variables.

7. A system as described in claim 6, wherein said digital computer means is further programmed to perform the functions of
- i. multiplying said difference signal by a predetermined factor, and
- ii. combining said multiplied signal with said limited integrated signal,
- iii. said generating function being responsive to said combined signal.

8. A system as described in claim 7, wherein said combined signals are fed back and further combined with subsequent difference signals prior to said multiplying and integrating functions.

9. A system as described in claim 8, wherein said parameter constitutes speed, and said digital computer functions form a portion of a speed control loop.

10. A system as described in claim 8, wherein said parameter constitutes load, and said digital computer functions form a portion of a load control loop.

11. Apparatus for monitoring an electric power generating system, said system having a steam turbine system, a steam generator for providing steam to said steam turbine system, and an electric generator rotated by said turbine system and adapted to be connected to an electric load, comprising:
- a. control means for developing signals representative of the difference between desired and actual conditions of at least on specified generating system operating parameter;
- b. digital computer means for translating said difference signals into control signals, said computer means having a proportional plus integral feedback controller including an integrater, means for limiting the output signals of said integrator to a specified range, means for combining said limited integration signals with signals proportional to said difference signals, and feedback means further for comparing the combined signals with said difference signals; and
- c. means responsive to said control signals for varying steam flow in said turbine system, whereby turbine and generator speed and load are controlled as end operating variables.

12. Apparatus as described in claim 11, wherein said parameter constitutes turbine speed, and said computer means forms a portion of a speed control loop.

13. Apparatus as described in claim 11, wherein said parameter constitutes generator load, and said computer means forms a portion of a load control loop.

14. A steam turbine system comprising:
- a. a steam turbine; and
- b. digital computer means for developing a difference signal between desired and present conditions of at least one specified turbine operating parameter, for numerically integrating said difference signal, for limiting the integrated difference signals to a specified range, and for developing control signals for said/generator/turbine in response to the limited integrated difference signal, said digital computer means further comprising feedback control means for generating representations of said control signals in response to the combination of a proportional multiple of said difference signals with said limited integrated difference signals, and wherein said representations are fed back and combined with said difference signals prior to multiplication or integration.

15. A system as described in claim 14, wherein said digital computer means comprises feedback control means for generating representations of said control signals in response to the combination of a proportional multiple of said difference signals with said limited integrated difference signals, and wherein said representations are fed back and combined with said difference signals prior to multiplication or integration.

16. A steam turbine system comprising:
 a. a steam turbine adapted to receive steam from a steam generator; and
 b. means for controlling steam flow to said steam turbine, said controlling means including digital computer means programmed to perform the functions of
   i. developing a difference signal representative of the differential between desired and actual conditions of at least one turbine operating parameter,
   ii. numerically integrating said difference signal,
   iii. limiting said integrated signal to a specified range; /and/
   iv. /generating control signals in response to said limited integrated signal/multiplying said difference signal by a predetermined factor, and combining said multiplied signal with said integrated signal; and
   v. generating a control signal in response to said combined signal.

17. A system as described in claim 16 wherein said control signals are fed back and combined with said difference signals prior to said multiplying and integrating functions.

18. A system as described in claim 17, wherein said parameter constitutes speed, and said digital computer functions form a portion of a speed control loop.

19. A system as described in claim 17, wherein said parameter constitutes load, and said digital computer functions form a portion of a load control loop.

20. In an electric power generating system having a steam turbine, a steam generator for providing steam to said turbine, an electric generator rotated by said turbine to drive an electric load, and a digital computer for controlling said generating system, the control method comprising the steps of:
 a. sensing periodically the actual value of at least one specified generating system operating parameter;
 b. providing periodically corresponding desired values for said parameter;
 c. evaluating the difference between associated actual and desired values of said parameter;
 d. integrating numerically in said digital computer the differences from said evaluating step;
 e. limiting said integrated differences to a predetermined range corresponding to select steam flow conditions between said steam generator and said turbine;
 f. generating control signals for said steam flow conditions, to control said parameter toward its desired value; and
 g. manipulating said steam flow conditions in response to said control signals.

21. A method as described in claim 20, wherein said integrating and said limiting steps form a portion of a proportional plus feedback controller function which further includes producing a signal proportional to the differences from said evaluating step and combining the proportional signal with the limited integrated differences from said limiting step, and combining the signal from said last named combining step with a prior difference signal from said evaluating step, prior to the next integrating and producing steps.

22. A method as described in claim 21, wherein said parameter comprises turbine speed, and said controller function is embedded in a speed control loop for said generator system.

23. A method as described in claim 21, wherein said parameter comprises elective load, and said controller function is embedded in a load control loop for said generator system.

24. A method for controlling a steam turbine system comprising the steps of:
 a. developing a signal representative of the difference between desired and actual conditions of at least one specified system operating parameter;
 b. periodically translating in a digital computer said difference signal into a control/signals/signal for said turbine, said translating step including numerically integrating/, in a digital computer/said difference signal/,/ and limiting the integrated/signals/signal to a specified range corresponding to extreme steam flow conditions in said turbine generating a signal proportional to said difference signal and combining said limited integration signal with said proportional signal, and subtracting said combined signal in feedback relation from the next difference signal prior to the next subsequent performance of said translating step; and
 c. varying steam flow in said turbine system as a function of said control signal/said steam flow condition to control steam flow as an intermediate variable and turbine speed and load as an end variable/.

25. A method as described in claim 24, wherein said parameter comprises turbine speed, and said controller function is embedded in a speed control loop for said generator system.

26. A method as described in claim 24, wherein said parameter comprises electric load, and said controller function is embedded in a load control loop for said generator system.

* * * * *